US011958006B2

United States Patent
Tour et al.

(10) Patent No.: US 11,958,006 B2
(45) Date of Patent: Apr. 16, 2024

(54) LASER-INDUCED GRAPHENE FILTERS AND METHODS OF MAKING AND USING SAME

(71) Applicants: WILLIAM MARSH RICE UNIVERSITY, Houston, TX (US); B.G. NEGEV TECHNOLOGIES and APPLICATIONS LTD., at Ben-Gurion University, Beer Sheva, IL (US)

(72) Inventors: James M. Tour, Bellaire, TX (US); Michael G. Stanford, Houston, TX (US); John Li, Houston, TX (US); Yieu Chyan, Houston, TX (US); Christopher John Arnusch, Midreshet Ben-Gurion (IL); Steven E. Presutti, Houston, TX (US)

(73) Assignees: William Marsh Rice University, Houston, TX (US); B.G. Negev Technologies and Applications Ltd., at Ben-Gurion University, Beer Sheva (IL)

( * ) Notice: Subject to any disclaimer, the term of this patent is extended or adjusted under 35 U.S.C. 154(b) by 643 days.

(21) Appl. No.: 16/969,131

(22) PCT Filed: Aug. 10, 2020

(86) PCT No.: PCT/US2020/045680
§ 371 (c)(1),
(2) Date: Aug. 11, 2020

(87) PCT Pub. No.: WO2021/030300
PCT Pub. Date: Feb. 18, 2021

(65) Prior Publication Data
US 2023/0173419 A1 Jun. 8, 2023

Related U.S. Application Data

(60) Provisional application No. 62/884,758, filed on Aug. 9, 2019.

(51) Int. Cl.
*B01D 39/20* (2006.01)
*B01D 46/00* (2022.01)
(Continued)

(52) U.S. Cl.
CPC ..... *B01D 39/2055* (2013.01); *B01D 46/0001* (2013.01); *B01D 46/48* (2013.01);
(Continued)

(58) Field of Classification Search
None
See application file for complete search history.

(56) References Cited

U.S. PATENT DOCUMENTS 4,856,509 A * 8/1989 Lemelson ............ A62B 23/025
128/206.16
2009/0299250 A1* 12/2009 Nguyen ............... D06M 15/267
602/43

FOREIGN PATENT DOCUMENTS

CN 106232520 A 12/2016
WO WO-2016133571 A2 * 8/2016 ........... C01B 32/184
(Continued)

OTHER PUBLICATIONS

Tian et al. ((2017). Electrochemical fabrication of high quality graphene in mixed electrolyte for ultrafast electrothermal heater. Chemistry of Materials, 29(15), 6214-6219) (Year: 2017).*
(Continued)

*Primary Examiner* — Gabriel E Gitman
(74) *Attorney, Agent, or Firm* — Dickinson Wright PLLC; Ross Spencer Garsson

(57) ABSTRACT

Virus and microbe-killing, self-sterilizing resistive heated air filters and methods of making and using same methods. The air filter is includes laser-induced graphene (LIG), a porous conductive graphene foam formed through photothermal conversion of a polyimide film (or another source or
(Continued)

source of polymer or other LIG precursor material) by a laser source. The LIG in the air filter can capture particulates and bacteria. The bacteria cannot proliferate even when submerged in culture medium. Through a periodic Joule-heating mechanism, the filter easily reaches greater than 300° C. This destroys any microorganisms including bacteria, along with molecules that can cause adverse biological reactions and diseases such as viruses, pyrogens, allergens, exotoxins, endotoxins, teichoic acids, mycotoxins, nucleic acids, and prions.

30 Claims, 40 Drawing Sheets

(51) Int. Cl.
B01D 46/48 (2006.01)
B01D 46/66 (2022.01)
B01D 46/84 (2022.01)
C01B 32/184 (2017.01)
(52) U.S. Cl.
CPC .......... *B01D 46/785* (2022.01); *B01D 46/84* (2022.01); *B01D 2201/088* (2013.01); *B01D 2221/10* (2013.01); *B01D 2279/65* (2013.01); *C01B 32/184* (2017.08)

(56) References Cited

FOREIGN PATENT DOCUMENTS

| WO | WO-2017199247 A1 * | 11/2017 | ............ B01D 63/10 |
|---|---|---|---|
| WO | 2018085789 A1 | 5/2018 | |
| WO | 2021030300 A3 | 2/2021 | |

OTHER PUBLICATIONS

Moats ((1971). Kinetics of thermal death of bacteria. Journal of Bacteriology, 105(1), 165-171) (Year: 1971).*
Wang et al. ((2018). Iron oxide nanowire-based filter for inactivation of airborne bacteria. Environmental Science: Nano, 5(5), 1096-1106) (Year: 2018).*
Ye et al. ((2018). Laser-induced graphene. Accounts of chemical research, 51(7), 1609-1620) (Year: 2018).*
International Searching Authority, International Preliminary Report on Patentability; PCT/US2020/045680; dated Feb. 17, 2022; 13 pages.
Aggarwal, P., et al., "The effect of chemical modification on starch studied using thermal analysis, " Thermochimica Acta 1998, 324, 1-8, doi:https://doi.org/10.1016/S0040-6031(98)00517-6 ("Aggarwal 1998").
Augustowska, M., et al., "Variability Of Airborne Microflora In A Hospital Ward Within A Period Of One Year," Ann. Agric. Environ. Med. 2006, 13, 99-106 ("Augustowska 2006").
Bolashikov, Z., et al., "Methods for air cleaning and protection of building occupants from airborne pathogens," Build. Environ., 2009, 44, 1378-1385, doi:https://doi.org/10.1016/j.buildenv.2008.09.001 ("Bolashikov 2009").
Carvalho, A., et al., "Laser-Induced Graphene Strain Sensors Produced by Ultraviolet Irradiation of Polyimide," Adv. Funct. Mater. 2018, 28, 1805271, doi:10.1002/adfm.201805271 ("Carvalho 2018").
CDC, 2017 National and State Healthcare-Associated Infections Progress Report, CDC National Center for Emerging and Zoonotic Infectious Diseases and Division of Healthcare Quality Promotion 2017 ("CDC 2017").
Chyan, Y., et al., "Laser-Induced Graphene by Multiple Lasing: Toward Electronics on Cloth, Paper, and Food," ACS Nano 2018, 12, 2176-2183, doi: 10.1021/acsnano.7b08539 ("Chyan 2018").
Da Roza, R., "Particle size for greatest penetration of HEPA filters—and their true efficiency," Report No. UCRL-53311; Other: On: DE83008439 United States 10.2172/6241348 Other: On: DE83008439 NTIS, PC A02/MF A01; 1. LLNL English, Medium: ED; Size: pp. 17 (Lawrence Livermore National Lab., CA (USA)), 1982 ("da Roza 1982").
Danner, R., et al., "Endotoxemia in Human Septic Shock," Chest 1991, 99, 169-175, doi:https://doi.org/10.1378/ chest.99.1.169 ("Danner 1991").
Dimiev, A., et al., "Chemical Mass Production of Graphene Nanoplatelets in ~100% Yield" ACS Nano 2016, 10, 274-279, doi: 10.1021/acsnano.5b06840 ("Dimiev 2016").
Duy, L., et al., "Laser-induced graphene fibers," Carbon 2018, 126, 472-479, doi:https://doi.org/10.1016/j.carbon 2017.10.036 ("Duy 2018").
Eickhoff, T., "Airborne Nosocomial Infection: A Contemporary Perspective," Infect. Control and Hosp. Epidemiol. 1994, 15, 663-672, doi: 10.2307/30145278 ("Eickhoff 1994").
Hadidane, R., et al., "Correlation between Alimentary Mycotoxin Contamination and Specific Diseases," Hum. Toxicol. 1985, 4, 491-501, doi:10.1177/096032718500400505 ("Hadidane 1985").
Hedayati, M., et al., "Aspergillus flavus: human pathogen, allergen and mycotoxin producer," Microbiology 2007, 153, 1677-1692, doi:doi:10.1099/mic.0.2007/007641-0 ("Hedayati 2007").
Jenneman, G., et al. "Effect of Sterilization by Dry Heat or Autoclaving on Bacterial Penetration through Berea Sandstone," Appl. Environ. Microbiol. 1986, 51, 39-43 ("Jenneman 1986").
Joe, Y., et al., "Methodology for Modeling the Microbial Contamination of Air Filters," PloS ONE, 2014, 9, e88514, doi:10.1371/journal.pone.0088514 ("Joe 2014").
Kowalski, W., "Hospital airborne infection control," CRC Press, 2012 ("Kowalski 2012").
Kowalski, W., et al., "Filtration of airborne microorganisms: Modeling and prediction," American Society of Heating, Refrigerating and Air-Conditioning Engineers, Inc., Atlanta, GA (US); Pennsylvania State Univ., University Park, PA (US), 1999 ("Kowalski 1999").
Kowalski, W., et al., "Mathematical Modeling of Ultraviolet Germicidal Irradiation for Air Disinfection," Quant. Microbiol. 2000, 2, 249-270, doi:10.1023/a:1013951313398 ("Kowalski 2000").
Li, L., et al., "High-Performance Pseudocapacitive Microsupercapacitors from Laser-Induced Graphene," Adv. Mater. 2016, 28, 838-845, doi: 10.1002/adma.201503333 ("Li 2016").
Lin, J., et al., "Laser-induced porous graphene films from commercial polymers," Nat. Commun. 2014, 5, 5714, doi:10.1038/ncomms6714 ("Lin 2014").
Liu, X., et al., "Thermal Decomposition of Corn Starch with Different Amylose/ Amylopectin Ratios in Open and Sealed Systems," Cereal Chem. 2009, 86, 383-385, doi: 10.1094/cchem-86-4-0383 ("Liu 2009").
Luong, D., et al., "Laminated Object Manufacturing of 3D-Printed Laser-Induced Graphene Foams," Adv. Mater. 2018, 30, 1707416, doi: 10.1002/adma.201707416 ("Luong 2018").
Luong, D., et al., "Laser-Induced Graphene Composites as Multifunctional Surfaces," ACS Nano 2019, 13, 2579-2586, doi:10.1021/acsnano.8b09626 ("Luong 2019").
Magill, S., et al., "Changes in Prevalence of Health Care-Associated Infections in U.S. Hospitals," N. Engl. J. of Med. 2018, 379, 1732-1744, doi: 10.1056/NEJMoa1801550 ("Magill 2018").
Peng, Z., et al., "Flexible and Stackable Laser-Induced Graphene Supercapacitors," ACS Appl. Mater. Interfaces 2015, 7, 3414-3419, doi: 10.1021/am509065d ("Peng 2015").
Prusiner, S., et al., "Prion Protein Biology," Cell 1998, 93, 337-348, doi:10.1016/S0092-8674(00)81163-0 ("Prusiner 1998").
Raetz, C. R., et al., "Lipopolysaccharide Endotoxins," 2002, 71, 635-700, doi:10.1146/annurev.biochem.71.110601.135414 ("Raetz 2002").
Reed, N., "The History of Ultraviolet Germicidal Irradiation for Air Disinfection," Public Health Rep., 2010, 125, 15-27, doi:10.1177/003335491012500105 ("Reed 2010").
Rietschel, E., et al., "Bacterial endotoxin: molecular relationships of structure to activity and function," The FASEB Journal 1994, 8, 217-225, doi: 10.1096/fasebj.8.2.8119492 ("Rietschel 1994").

(56) References Cited

OTHER PUBLICATIONS

Rudnik, E., et al., "Thermal Stability and Degradation of Starch Derivatives," J. Therm. Anal. Calorim. 2006, 85, 267 "Rudnik 2006").
Schlievert, P., et al., "Identification and Characterization of an Exotoxin from *Staphylococcus aureus* Associated with Toxic-Shock Syndrome," J. Infect. Dis. 1981, 143, 509-516, doi:10.1093/infdis/143.4.509 ("Schlievert 1981").
Sehulster, L. M., in Sterilisation of Biomaterials and Medical Devices, (eds: S. Lerouge & A. Simmons), Woodhead Publishing, 2012, 261 ("Sehulster 2012").
Sehulster, L., et al., "Guidelines for Environmental Infection Control in Health-Care Facilities," U.S. Department of Health and Human Services Centers for Disease Control and Prevention; American Society for Healthcare Engineering/American Hospital Association, Chicago IL,2019 ("Sehulster 2019").
Singh, S., et al., "Laser-Induced Graphene Layers and Electrodes Prevents Microbial Fouling and Exerts Antimicrobial Action," ACS Appl. Mater. Interfaces 2017, 9, 18238-18247, doi:10.1021/acsami.7b04863 ("Singh 2017").
Stanford, M., et al., "Laser-Induced Graphene for Flexible and Embeddable Gas Sensors," ACS Nano 2019, 13, 3474-3482, doi:10.1021/acsnano.8b09622 ("Stanford I 2019").
Stanford, M., et al., "Laser-Induced Graphene Triboelectric Nanogenerators," ACS Nano 2019, doi: 10.1021/acsnano.9b02596 ("Stanford II 2019").
Sublett, J., et al., "Air filters and air cleaners: Rostrum by the American Academy of Allergy, Asthma & Immunology Indoor Allergen Committee," Journal of Allergy and Clinical Immunology 2010, 125, 32-38, doi:https://doi.org/10.1016/j.jaci.2009.08.036 ("Sublett 2010").
Sun, B., et al., "Gas-Permeable, Multifunctional On-Skin Electronics Based on Laser-Induced Porous Graphene and Sugar-Templated Elastomer Sponges," Adv. Mater. 2018, 30, 1804327, doi: 10.1002/adma.201804327 ("Sun 2018").
Thakur, A., et al., "Graphene oxide on laser-induced graphene filters for antifouling, electrically conductive ultrafiltration membranes", Journal of Membrane Science, Elsevier BV, NL, vol. 591, Jul. 30, 2019 (Jul. 30, 2019), XP085764674, ISSB: 0376-7388, DOI: 10.1016 (Thakur 2019).
Tsuji, K., et al., "Dry-heat destruction of lipopolysaccharide: dry-heat destruction kinetics," Appl. Environ. Microbiol. 1978, 36, 710714 ("Tsuji I 1978").
Tsuji, K., et al., "Dry-heat destruction of lipopolysaccharide: mathematical approach to process evaluation," Appl. Environ. Microbiol. 1978, 36, 715-719 ("Tsuji II 1978").
Von Wintersdorff, C., et al., "Dissemination of Antimicrobial Resistance in Microbial Ecosystems through Horizontal Gene Transfer," Front. in Microbiol. 2016, 7 doi:10.3389/fmich.2016.00173 ("von Wintersdorff 2016").
WHO, "WHO infection control guidelines for transmissible spongiform encephalopathies," World Health Organization, Geneva, Switzerland 1999 ("WHO 1999").
Ye, R., et al., "Laser-Induced Graphene Formation on Wood," Advanced Materials 2017, 29, 1702211, doi: 10.1002/adma.201702211 ("Ye 2017").
Ye, R., et al., "Laser-Induced Graphene," Acc. Chem. Res. 2018, 51, 1609-1620, doi: 10.1021/acs.accounts.8b00084 ("Ye 2018").
Ye, R., et al., "Laser-Induced Graphene: From Discovery to Translation," Adv. Mater. 2019, 31, 1803621, doi:10.1002/adma.201803621 ("Ye 2019").
Yoon, D., et al., "Negative Thermal Expansion Coefficient of Graphene Measured by Raman Spectroscopy," Nano Lett. 2011, 11, 3227-3231, doi: 10.1021/nl201488g ("Yoon 2011").
Zhang, J., et al., "In Situ Synthesis of Efficient Water Oxidation Catalysts in Laser-Induced Graphene," ACS Energy Lett. 2018, 3, 677-683, doi: 10.1021/acsenergylett.8b00042 ("Zhang I 2018").
Zhang, J., et al., "Oxidized Laser-Induced Graphene for Efficient Oxygen Electrocatalysis," Adv. Mater. 2018, 30, 1707319, doi: 10.1002/adma.201707319 ("Zhang II 2018").
International Searching Authority, International Search Report and Written Optition; PCT/US2020/045680; dated Mar. 5, 2021; 22 pages.

* cited by examiner

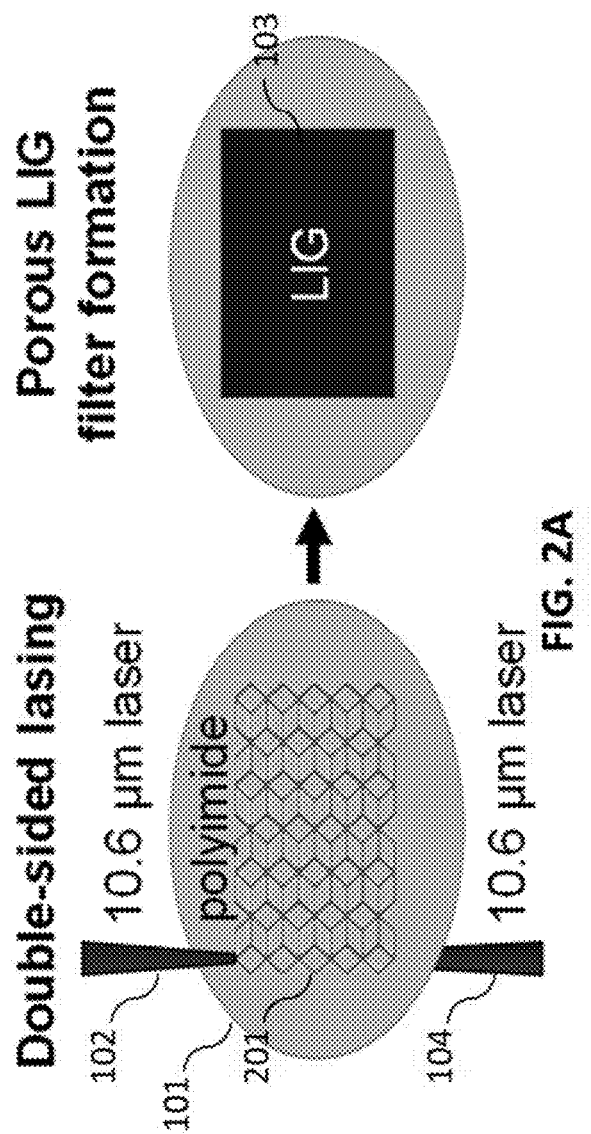
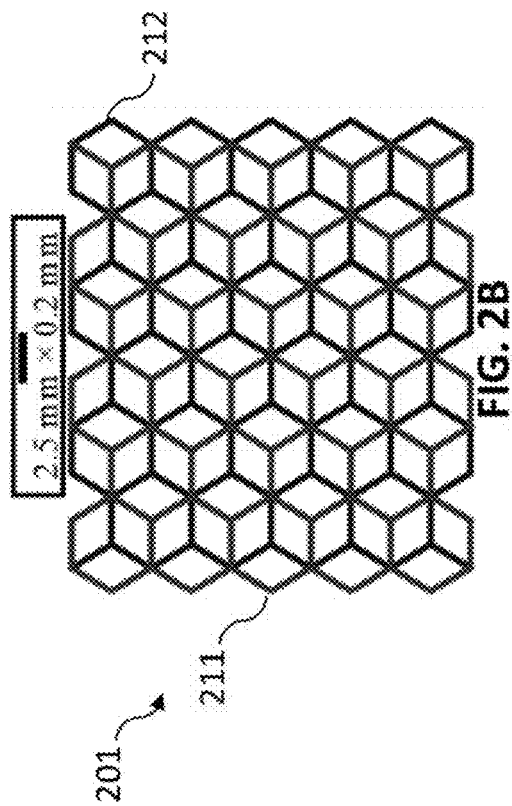
FIG. 2A
FIG. 2B

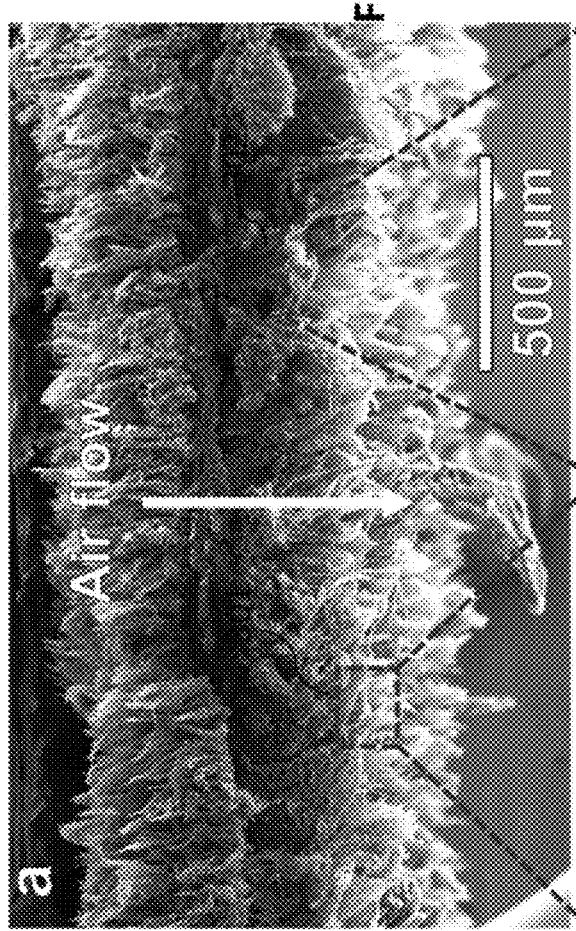
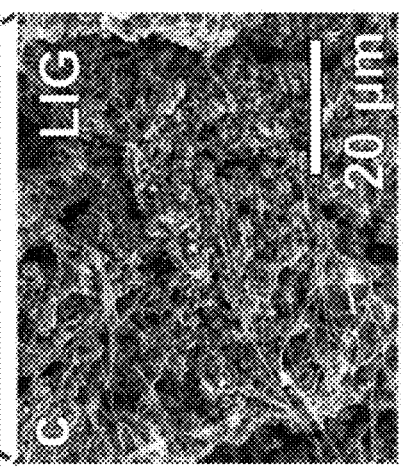
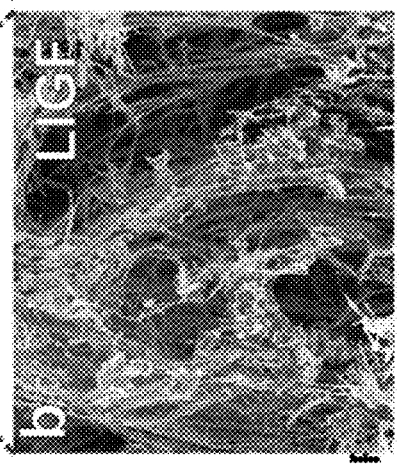
FIG. 3A
FIG. 3B
FIG. 3C

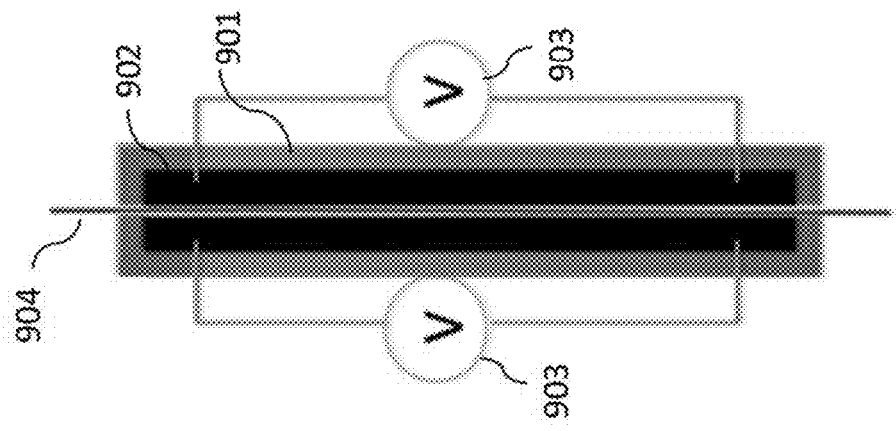
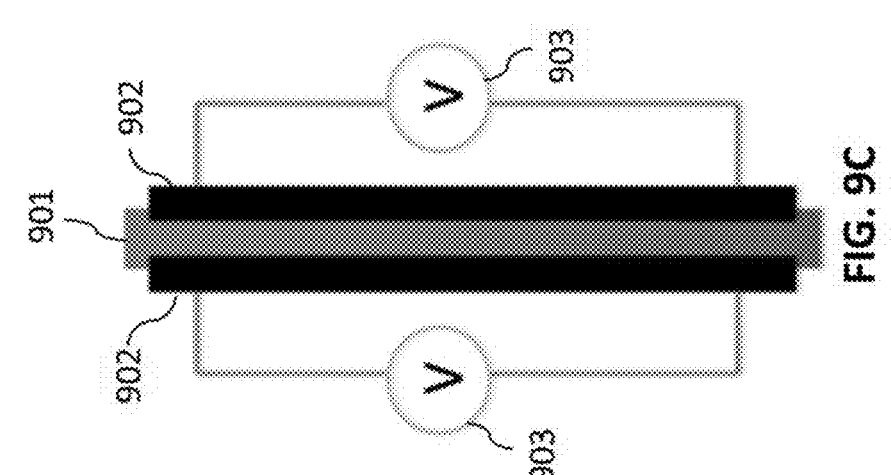
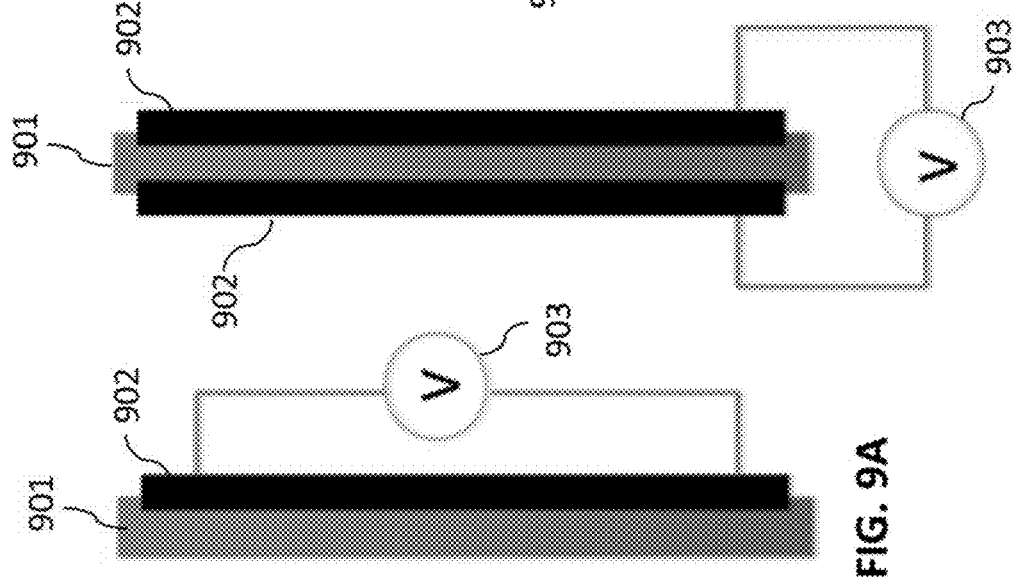
FIG. 9A  FIG. 9B  FIG. 9C  FIG. 9D

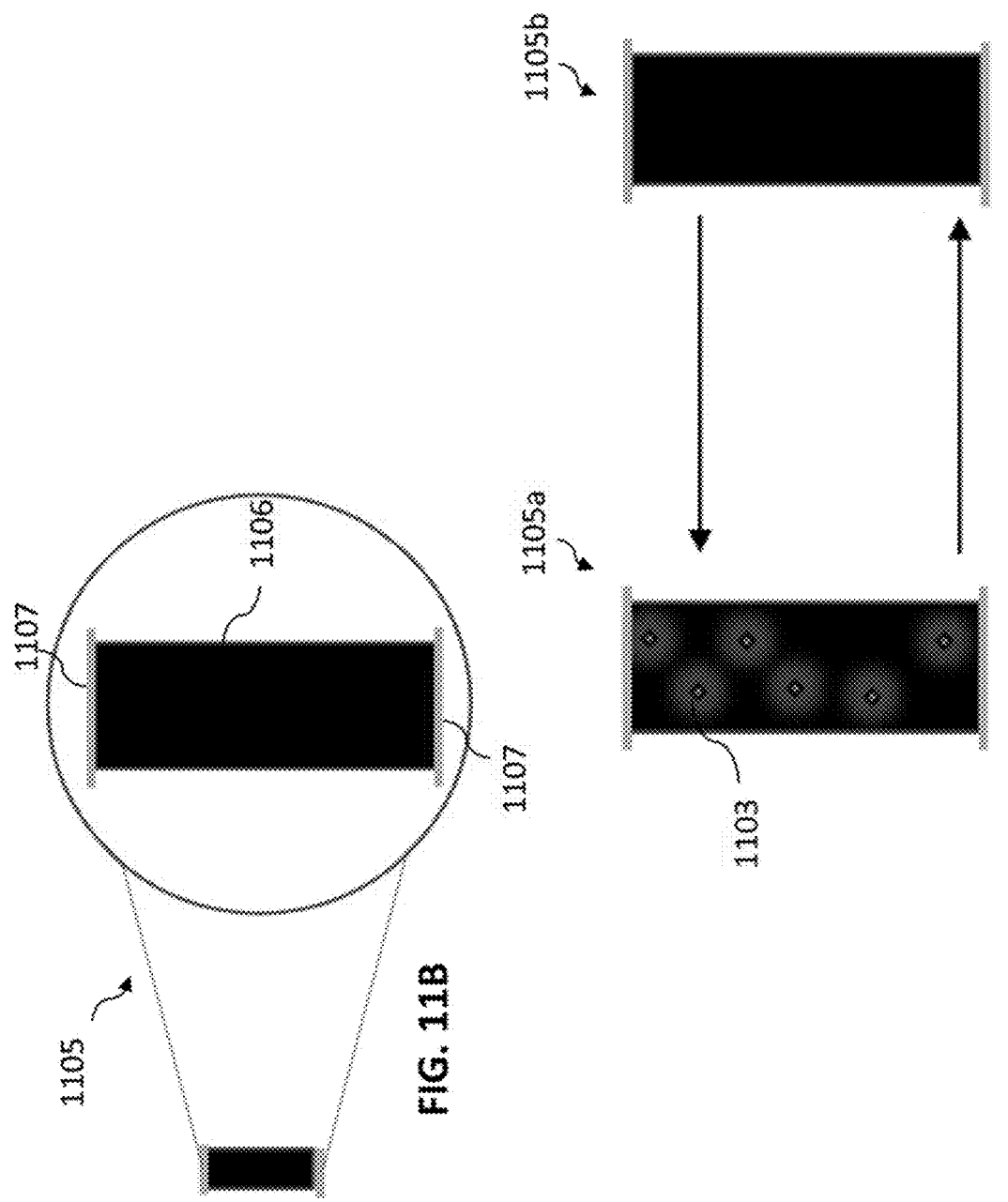

LASER-INDUCED GRAPHENE FILTERS AND METHODS OF MAKING AND USING SAME

CROSS-REFERENCE TO RELATED PATENT APPLICATIONS

This application is a 35 U.S.C § 371 national application of PCT Application No. PCT/US20/45680, filed on Aug. 102, 2020, entitled "Laser-Induced Graphene Filters And Methods Of Making And Using Same", which claims priority to U.S. Patent Appl. Ser. No. 62/884,758, filed Aug. 9, 2019 entitled "Laser-Induced Graphene Filters And Methods of Making And Using Same," which patent applications are commonly owned by the owner of the present invention. These patent applications (including Appendices 1-3 of the provisional application) are hereby incorporated herein in their entirety.

GOVERNMENT INTEREST

This invention was made with government support under Grant No. FA9550-14-1-0111, awarded by the United States Department of Defense/Air Force Office of Scientific Research. The United States government has certain rights in the invention.

TECHNICAL FIELD

The present invention relates to laser-induced graphene (LIG) filters and methods of making and using same. More particularly, virus and microbe-killing, self-sterilizing resistive heated air filters made from LIG and methods of making and using same methods.

BACKGROUND

According to the Centers for Disease Control and Prevention (CDC), the probability of a U.S. patient contracting at least one healthcare-associated infection (HAI) is one out of 31, and 3% of hospitalized patients have one or more HAI. [CDC 2017; Magill 2018]. These numbers can be underreported due to hospital liabilities. Approximately 10-20% of nosocomial infections are airborne. [Eickhoff 1994; Beggs 2003]. These include bacteria, bacteria-derived products and viruses. An additional fraction of nosocomial infections are due to fomites, such as contaminated surfaces and objects, which result from deposition of airborne bacteria, fungi, spores, and various other pathogens that are carried by droplets, aerosols, and particulate matter. [Beggs 2003; Kowalski 2012].

Current strategies to prevent transmission of airborne pathogens include dilution ventilation, pressurization, directional airflow, disinfection, and filtration. [Sehulster 2019; Kowalski 1999]. Dilution ventilation decreases the concentration of infectious agents by exchanging inside air with outside air. Pressurization and directional airflow prevent the spread of infective agents by controlling the path of air transfer, and disinfection is the inactivation of infective agents. Filtration is the removal of infective agents from circulation. Pressurization and directional airflow do not remove nor destroy infectious agents in the air and are usually applied in conjunction with filtration and disinfection methods, which are integrated into air circulation systems. [Kowalski 2012]

Current methods of filtration typically use a tortuous medium comprised of layers of interwoven fibers. [Brown 1993]. Particle capture relies on diffusion, electrostatic attraction, interception by adhesion, inertial impaction, and size-exclusion sieving. [da Roza 1982]. However, during operation, contaminants accumulate and captured microorganisms can proliferate in the filter, leading to decreased filtration efficiency, increased energy cost, lower flow rate, penetration of smaller particles, impaired performance, and downstream airborne pathogen contamination. [Sehulster 2019; Joe 2014; Bonnevie Perrier 2008]. Thus, air filters need to be regularly replaced, which adds to the maintenance cost of filtration equipment and systems.

The most common method of air disinfection is UV-C radiation. [Reed 2010]. However, UV-C requires a critical dosage of irradiation to kill bacteria or inactivate viruses. Some microorganisms can survive by repairing the damage, and pathogens adhered to particles and embodied in larger droplets are shielded from irradiation. [Kowalski 2000]. And light-based filter systems, like UV-C, among others, are "line-of-sight" systems, meaning that if light is not directly exposed upon the target of interest (the target might be behind or within a tortuous filter structure), then the target is unaffected by the light. Thus, UV-C sterilization systems are usually used in series with filtration systems. Ozone, photocatalytic oxidation, and ion generation are alternative marketed methods of disinfection. [Bolashikov 2009]. Compared to UV-C, these methods often have lower energetic efficiencies, are more expensive, and are less effective. Thus, UV germicidal irradiation remains the current state of the art technology for air disinfection. [Sehulster 2019].

Current methods of disinfection do not destroy biological toxins and byproducts of microorganism death. Endotoxins, exotoxins, teichoic acids, and mycotoxins cause adverse responses in humans, such as high fevers, septic shock, lung injury, autoimmune diseases, and death. [Brigham 1986; Danner 1991; Hadidane 1985; Hedayati 2007; Schlievert 1981]. These compounds are difficult to remove, have high thermal stability up to 250° C., and are incredibly potent even at picomolar concentrations or nanogram per kilogram dosages. [Raetz 2002; Sehulster 2012; Tsuji I 1978; Tsuji II 1978]. Thus, although disinfection kills the microorganisms and destroys virus capsids, the toxic products accumulate as persistent contaminants, and biological byproducts of microorganism death can directly provide nutrients for microorganism proliferation. [Augustowska 2006]. Additionally, current methods of disinfection provide very little protection from highly stable, persistent, and difficult to detect proteinaceous infectious particles (prions). [Sehulster 2012; WHO 1999; Prusiner 1998]. Although often ignored, other biological fragments that are not directly toxic to humans have the capability to pose significant risks, such as fragments of genetic material, which may contribute to acquisition of antibiotic resistance and virulence factors by competent bacteria. [von Wintersdorff 2016]. Thus, with varying degrees of success, disinfection strategies are generally used in conjunction with filtration.

Typical depyrogenation of objects involves dry heating at a minimum of 250° C. for extended periods of time. [Sehulster 2012]. Endotoxin decomposition during dry heating is proposed to occur by radical oxidation at lower temperatures, and molecular decomposition at higher temperatures. Decomposition at higher temperatures is usually indiscriminate and does not require any form of catalyst, as nearly all biological molecules will rapidly decompose at temperatures above 300° C. Based on kinetic studies, the time constant at 250° C. for a $\log_{10}$ reduction in endotoxin concentration is approximately 300 s, which is commonly denoted as the $D^1_{250°\ C.}$ time. The $D^1_{300°\ C.}$ time is approximately 30 s, and the $D^1_{350°\ C.}$ time is approximately 3 s. [Tsuji I 1978; Tsuji II 1978].

SUMMARY OF THE INVENTION

The present invention is directed to graphene (LIG) filters and methods of making and using same, and more particularly, virus deactivation and microbe-killing, self-sterilizing resistive heated air filters made from LIG and methods of making and using same methods.

The present invention is a self-cleaning filter that includes laser-induced graphene (LIG), a micro-porous conductive graphene foam formed by direct photothermal conversion of a carbon precursor by a commercial $CO_2$ laser cutter. [Ye 2019]. During the formation of LIG, photothermal heating of a carbon precursor drives the out-gassing of non-carbon elements and promotes $sp^2$-hybridization. [Chyan 2018]. To date, LIG has shown promise for a variety of applications such as micro-supercapacitors [Li 2016; Peng 2015"; Lin 2014"], wearable and embeddable sensors [Stanford I 2019; Carvalho 2018; Sun 2018], triboelectric nanogenerators [Stanford II 2019], and electrocatalysis [Zhang I 2018; Zhang II 2018], to name a few. LIG can also be easily doped, chemically functionalized [Ye 2019; Ye 2018], and composited [Luong 2019].

The conversion of PI to LIG is compatible with roll-to-roll processing and laminated object manufacturing, thus showing possibilities for commercial applications. [Luong 2018]. The direct-write capability allows for a variety of geometries and configurations to be formed, which enables the formation of mechanically robust, free-standing LIG membranes. The micro-porous filter enables simultaneous application of contaminant removal and disinfection strategies.

The free-standing LIG membrane can capture bacteria, particles-containing viruses, and particulates. It has further been shown that LIG prevents proliferation of filtered bacteria, even when submerged in culture medium. Through a periodic Joule heating mechanism (in which the filter easily reaches greater than 300° C.), the filter destroys bacteria and viruses that are captured, and exceeds temperatures that decompose compounds that may sustain life, along with molecules that may cause adverse biological reactions and diseases such as virus capsids, pyrogens, pollutants, allergens, exotoxins, teichoic acids, endotoxins, mycotoxins, nucleic acids, and prions. The Joule heating of the LIG causes this destruction and decomposition through carbonization of the virus capsids, bacteria and molecular materials.

Traditional filters rely on a physical cleaning processes or replacement once the particulates saturate the filter. For the filter, of the present invention, the Joule heating results in self-cleaning by simply applying an electrical potential across the LIG-based filter. This methodology can be particularly good in hospital settings where microorganisms, such as sepsis-spawning microorganisms, persist and easily transfer from room to room through the air handling system. They also work very well removal of droplets containing viruses from indoor occupancy spaces, thereby minimizing the chances of person-to-person transfer.

In general, in one embodiment, the invention features a method of making a filter comprising LIG. The method includes the step of exposing a first side of a sheet including a polymer to a first laser source. The exposing on the first side results in formation of laser-induced graphene (LIG) on the first side of the sheet. The LIG is derived from the polymer. The method further includes the step of treating the second side of the sheet. The second side of the sheet is on the opposite side of the first side of the sheet. The LIG on the first side of the sheet and the step of treating on the second side provide a porosity to the sheet such that the sheet is capable of flowing air through the LIG from the first side to the second side. At least some of the polymer on the first side of the sheet is not formed into LIG and is operable to support the LIG formed on the first side.

Implementations of the invention can include one or more of the following features:

The step of treating the second side of the sheet is a treatment of the second side can be selected from a group consisting of: (a) exposing the second side of the sheet to the first laser source to form LIG on the second side of the sheet, in which wherein at least some of the polymer on the second side of the sheet is not formed into LIG and is operable to support the LIG formed on the second side; (b) exposing the second side of the sheet to a second laser source to form LIG on the second side of the sheet, in which at least some of the polymer on the second side of the sheet is not formed into LIG and is operable to support the LIG formed on the second side; (c) exposing the first side of the sheet to the first laser source for a time sufficient to lase the polymer on the second side of the sheet, in which at least some of the polymer on the second side of the sheet is not formed into LIG and is operable to support the LIG formed on the second side; (d) cutting a mesh in the sheet to provide the porosity to the sheet such that the sheet is capable of flowing air through the LIG from the first side to the second side; and (e) combinations thereof.

The treatment of the second side can include exposing the second side of the sheet to the first laser source to form LIG on the second side of the sheet. At least some of the polymer on the second side of the sheet can be not formed into LIG and can be operable to support the LIG formed on the second side.

The sheet can be positioned on a laser-reflective surface appropriate for the wavelength being used to generate LIG (e.g., aluminum for a 10.6 µm laser). During the step of exposing the first side of the sheet to the first laser source, the first laser source can be reflected by the reflective surface to lase the second side of the sheet.

The treatment of the second side can include exposing the second side of the sheet to a second laser source to form LIG on the second side of the sheet. At least some of the polymer on the second side of the sheet can remain unconverted into LIG and can be operable to support the LIG formed on the second side.

The treatment on the second side can expose the first side of the sheet to the first laser source for a time sufficient to lase the polymer on the second side of the sheet. At least some of the polymer on the second side of the sheet can be not formed into LIG and can be operable to support the LIG formed on the second side.

The sheet can be a thin sheet that is capable of being lased on the second side of the sheet when lased by the first laser source on the first side.

The treatment can include cutting a mesh in the sheet to provide the porosity to the sheet such that the sheet is capable of flowing air through the LIG from the first side to the second side.

The filter can be operable for capturing particles or molecules selected from a group consisting of: airborne microorganisms, byproducts of microorganisms, microorganism-associated toxins, viruses, virus capsids, droplets of virus capsids, and combinations thereof.

The method can further include decomposing the captured particles or molecules via Joule heating.

The LIG precursor material can be selected from a group consisting of polymers, carbon-based precursors that comprise amorphous carbon, and compounds that are precursors to porous amorphous carbons.

The compounds that are precursors to porous amorphous carbons can include an intumescent materials.

The LIG precursor material can be a polymer.

The polymer can be polyimide (PI).

The sheet can be a sheet of the polymer.

The sheet can be a fibrous polymer sheet.

The polymer can be a LIG precursor polymer.

The LIG precursor polymer can be selected from a group consisting homopolymers, vinyl polymers, step-growth polymers, condensation polymers, polymers made through living polymer reactions, chain-growth polymers, block co-polymers, carbonized polymers, aromatic polymers, cyclic polymers, polyimide (PI), polyetherimide (PEI), polyether ether ketone (PEEK), polysulfones, elastomers, rubbers, recycle plastics, poly(ethylene terephthalate), polytetrafluoroethylene, polyethylene, polypropylene, low density polyethylene (LPE), linear low density polyethylene (LLDPE), high density polyethylene (HDPE), polybutadiene, poly(styrene butadiene), polystyrene, polycarbonates, polyamides, polyimides, polyurethanes, thermoplastics, thermosets, and combinations thereof.

The step of exposing the first side can expose the first laser source by a first pattern on the first side.

The step of treating the second side can include exposing the second side of the sheet to a second laser source to form LIG on the second side of the sheet. The second laser source can be the same or a different laser source than the first laser source. The exposing the second side to the second laser source can expose the second laser source by a second pattern on the second side. The first pattern can be offset from the second pattern.

The two patterns can be different lattices.

The first pattern can be a hexagonal pattern and the second pattern can be a stacked hexagonal pattern.

Each of the first pattern and the second pattern can be selected from a group consisting of hexagons and triangles, squares, and parallelograms.

The first pattern and the second pattern can provide a 3-dimensional lattice for reinforcement and geometrical strengthening.

The filter can be operable to generate heat when a voltage is applied across the filter.

The heat can be capable of killing or decomposing the captured particles.

The filter can be operable as an electrostatic filter when voltage is applied across the filter.

If the sheet is made of a fibrous polymer, then lasing only on one side can be sufficient since the fibrous polymer source is already penetrable to airflow.

In general, in another embodiment, the invention features a LIG filter that includes LIG and a polymer that is operable to support the LIG on the first side of the LIG filter. The LIG is on at least the first side of the LIG filter. The LIG filter sheet has a porosity such that the LIG filter is capable of flowing air through the LIG on the first side to a second side of the LIG filter. The LIG filter is operable for capturing particles selected from a group consisting of airborne microorganisms, byproducts of the microorganisms, microorganism-associated toxins, viruses, virus capsids, droplets thereof and combinations thereof.

Implementations of the invention can include one or more of the following features:

The LIG can be on the second side of the LIG filter. The LIG filter sheet can have a porosity such that the LIG filter is capable of flowing air through the LIG from the first side to the second side of the LIG filter.

The LIG filter can be a filter that includes LIG made by at least one of the above-described methods.

The LIG filter can be operable to generate heat when a voltage is applied across the filter.

The heat can be capable of killing or decomposing the captured particles.

The LIG precursor material can be selected from a group consisting of polymers, carbon-based precursors that comprise amorphous carbon, and compounds that are precursors to porous amorphous carbons.

The compounds that are precursors to porous amorphous carbons can include an intumescent material.

The LIG precursor material can be a polymer.

The polymer can be polyimide (PI).

In general, in another embodiment, the invention features a LIG film that includes LIG and a polymer. The LIG film is operable to for filtering air by capturing particles in the air. The captured particles are selected from a group consisting of airborne microorganisms, byproducts of microorganisms, microorganism-associated toxins, and combinations thereof. The LIG film is operable for generating heat when a voltage is applied across the LIG. The generated heat is operable for killing or decomposing the particles.

Implementations of the invention can include one or more of the following features:

The LIG film can be a filter that includes LIG made at least one of the above-described methods.

The LIG can be on both sides of the LIG film such that air is filtered through the two-sided LIG structure.

The LIG film can include a support array made from an un-lased polymer material.

The un-lased polymer material can be in an AB-stacked hexagonal array pattern.

The un-lased polymer material can be a stack having at least two patterns.

Each of the at least two patterns can be selected from a group consisting of hexagons and triangles, squares, and parallelograms.

The stack having at least two patterns can provide a 3-dimensional lattice for reinforcement and geometrical strengthening.

The LIG can be made from polyimide.

The LIG can be made from polysulfone, paper, cotton, wood, or carbohydrate.

The polysulfone, paper, cotton, wood or carbohydrate can be flame retarded with an additive.

The LIG can be made from made from step-growth polymers, chain-growth polymers, living polymerization polymers, metathesis polymers, vinyl polymers, condensation polymers or mixtures therefrom.

The captured particles can be operable to cause hospital-acquired infections.

The captured particles can be sources of sepsis or viruses.

The viruses can be selected from a group consisting of Coronaviruses, SARS-CoV, MERS-CoV, SARS-CoV-1 and SARS-CoV-2.

The LIG film can be operable for generating heat when a voltage is applied across the LIG that is at least 70° C.

The LIG film can be operable for generating heat when a voltage is applied across the LIG that is at least 150° C.

The LIG film can be operable for generating heat when a voltage is applied across the LIG that is at least 250° C.

The LIG film can be operable for generating heat when a voltage is applied across the LIG that results in cleaning of a surface of the LIG by volatilizing decomposed adsorbates.

The LIG film can be operable for generating heat when the voltage is applied across the film continuously.

The LIG film can be operable for generating heat when the voltage is applied across the film periodically.

The periodicity can be selected from a group consisting of hours, minutes, seconds or fractions of a second.

The periodicity can be in the ranging from 1 millisecond to 24 hours.

The periodicity can be in the ranging from 5 seconds to 1 minute.

The captured particles can include microorganisms selected from a group consisting of bacteria, fungi, and combinations thereof.

The captured particles comprise toxins that can be endotoxins.

The captured particles comprise viruses that can be Coronaviruses, SARS-CoV, MERS-CoV, SARS-CoV-1 and SARS-CoV-2.

In general, in another embodiment, the invention features a method that includes the step of selecting a LIG film that includes LIG and a polymer support. The method further includes the step of utilizing the LIG film to capture particles in the air. The captured particles are selected from a group consisting of airborne microorganisms, byproducts of the microorganisms, microorganism-associated toxins, viruses, virus capsids, and combinations thereof. The method further includes the step of applying a voltage across the LIG to generating heat. The method further includes the step of utilizing the generated heat to kill or decompose the particles.

Implementations of the invention can include one or more of the following features:

The LIG film can be a filter that includes LIG made by at least one of the above-described methods.

The LIG film can be at least one of the above-described LIG filters.

The LIG film can be at least one of the above-described LIG films.

The LIG film can have LIG on one sides.

The LIG film can have LIG on one side of a fibrous or porous polymer film.

The LIG film can have LIG on both sides of a film such that air is filtered through the two-sided LIG structure.

The LIG film can include a support array made from an un-lased polymer material.

The un-lased polymer material can be in an AB-stacked hexagonal array pattern.

The un-lased polymer material can be a stack having at least two patterns.

Each of the at least two patterns can be selected from a group consisting of hexagons and triangles, squares, and parallelograms.

The stack having at least two patterns can provide a 3-dimensional lattice for reinforcement and geometrical strengthening.

The LIG can be made from polyimide.

The LIG can be made from polysulfone, paper, cotton, wood, or carbohydrate.

The polysulfone, paper, cotton, wood or carbohydrate can be flame retarded with an additive.

The LIG can be made from made from step-growth polymers, chain-growth polymers, living polymerization polymers, metathesis polymers, vinyl polymers, condensation polymers or mixtures therefrom.

The captured particles can be operable to cause hospital-acquired infections.

The captured particles can be sources of sepsis.

The captured particles can be viruses or sources of viruses including Coronaviruses which can further include SARS-CoV, MERS-CoV, SARS-CoV-1 and SARS-CoV-2.

The step of applying voltage across the LIG can generate heat that is at least 70° C.

The step of applying voltage across the LIG can generate heat that is at least 150° C.

The step of applying voltage across the LIG can generate heat that is at least 250° C.

The step of utilizing the heat can include cleaning a surface of the LIG surface by volatilizing decomposed adsorbates.

The captured particles can include microorganisms selected from a group consisting of bacteria, fungi, and combinations thereof.

The captured particles can include toxins that are endotoxins.

The captured particles can include viruses and/or droplets and/or aerosols containing viruses.

In general, in another embodiment, the invention features a method that includes the step of making a filter comprising LIG by lasing a porous air-permeable sheet which includes one or more LIG forming precursors. The method further includes the step of exposing a first side of the porous air-permeable sheet to a first laser source. The exposing on the first side results in formation of LIG on the first side of the sheet. The LIG is derived from a polymer or carbon-based LIG precursor.

Implementations of the invention can include one or more of the following features:

The method further can include the step of treating the second side of the porous air-permeable sheet to form the LIG. The second side of the porous air-permeable sheet can be on the opposite side of the first side of the sheet.

The porous air-permeable sheet can be lased such that unconverted portions of the porous air-permeable sheet are a support for the LIG.

The porous air-permeable precursor sheet can be selected from a group consisting of carbon fiber paper, woven carbon fiber fabrics, oxidized acrylic (OPAN) felt, activated carbon, carbonized polymers, and combinations thereof.

The porous air-permeable precursor sheet can be a porous structure that includes amorphous carbons.

The porous air-permeable precursor sheet can be a porous structure that includes amorphous carbons.

The porous structure that includes amorphous carbons can be a composite including a polymer The porous air-permeable precursor sheet can include polymer fibers.

The porous air-permeable precursor sheet can include a woven fabric or a non-woven felt. The woven fabric or the non-woven felt can include at least a portion of fibers suitable for conversion to LIG.

The porous air-permeable precursor sheet can include an air-permeable open-celled polymer foam.

The polymer can be selected from a group consisting of polyimide (PI), polyphenylene sulfide (PSS), polyaramide, cellulose fiber, polyacrylonitrile (PAN), polybenzoxazole (PBO), polyoxazoles, phenolic resins, homopolymers, vinyl polymers, polyethylene, polypropylene, linear low density polyethylene, high density polyethylene, step-growth polymers, condensation polymers, polymers made through living polymer reactions, chain-growth polymers, block co-polymers, aromatic polymers, cyclic polymers, polyetherimide (PEI), polyether ether ketone (PEEK), polysulfones, elastomers, rubbers, poly(styrene butadiene), crosslinked-polystyrene, polyamides, polyimides, thermoplastics, thermosets, and combinations thereof.

In general, in another embodiment, the invention features a method that includes selecting a porous material that is coated with one or more LIG forming precursors. The method further includes lasing the porous material coated with one or more LIG forming precursors to form a LIG filter that includes LIG and a porous support. The porous support has a porosity such that air is capable of flowing through a first side of the LIG filter to a second side of the LIG filter.

Implementations of the invention can include one or more of the following features:

The porous material that is coated with one or more LIG forming precursors can be selected from a group consisting of wire mesh, metal foams, porous ceramic plates, polymer foams, polymer filter media, and porous fiberglass sheets.

The one or more LIG-forming precursors can be selected from a group consisting of polymers, materials comprising amorphous carbon, and substances that form a porous amorphous carbon film upon exposure to heat.

The one or more LIG-forming precursors can include a substance that forms a porous amorphous carbon film upon exposure to heat that is an intumescent material.

The method can further include exposing a first side of a sheet of the porous material coated with the one or more LIG-forming precursor to a first laser source. The exposing on the first side of the sheet can form the LIG on the first side of the sheet. The LIG can be formed from the conversion of the one or more LIG-forming precursors coated on the porous material.

The porous support can include un-converted porous material.

The method can further include treating a second side of the sheet to form LIG on the second side, wherein the second side is opposite the first side.

The LIG filter can be operable as an electrostatic filter when voltage is applied to the filter. The voltage can be in plane of the LIG filter when the LIG filter is single-sided. The voltage can be across the LIG filter when the LIG filter is double-sided.

BRIEF DESCRIPTION OF THE DRAWINGS

FIGS. 2A-2E are filter synthesis schematics and basic characterization. FIG. 2A is a schematic of the double-sided lasing process, which leads to the formation of a porous LIG filter supported by a PI lattice. FIG. 2B is a schematic of the PI lattice that remains after lasing.

FIG. 2C is an optical image of the LIG filter demonstrating flexibility and mechanical robustness. FIG. 2D is an SEM image of the LIG filter, showing the carpet of LIG, along with the unlased PI. FIG. 2E is a Raman spectrum of the LIG filter at 532 nm.

FIGS. 3A-3C are cross-section SEM images of the LIG filter.

FIG. 6A is a schematic of air filtration with the LIG filter mounted on a vacuum filtration system with a backing PES test filter. FIG. 6B is a schematic of filtration followed by FIG. 6C sterilization and depyrogenation through Joule heating. FIG. 6D is a schematic of the Joule heating setup in which a potential is applied across the filter for Joule heating. FIG. 6E is an infrared image of a LIG filter that is Joule heated to 380° C.

FIG. 9A-9D illustrate different geometries for example systems with LIG filters that support the application of voltage for electrostatic filter.

FIG. 10A shows pressure drop across the LIG filter vs flow rate without Joule heating. FIG. 10B shows temperature of LIG filter vs power supplied at different air flow rates. FIG. 10C shows temperature vs pressure drop data for the LIG filter.

FIG. 10D shows Joule heating cycle stability of the LIG filter for 250 cycles at a constant potential of 15 V between room temperature and 255° C. FIG. 10E shows optical images of water from inside bubblers, through which particles from combustion of five cigarettes are flowed. FIG. 10A shows particle size distribution from dynamic light scattering (DLS), which supports the effectiveness of the filter at capturing particles from 0 to 800 nm.

FIG. 11B is an illustration showing a magnification of the filter utilized in the system shown in FIG. 11A.

FIG. 11C is an illustration showing the particulate matter on the filter shown in FIG. 11B before and after Joule heating.

FIG. 19A is a schematic of the experimental setup. FIG. 19B is a schematic of the culturing procedure. FIG. 19C is a graph of optical density of filter submerged cultured medium without sonication prior to culturing after 24 h of incubation. FIG. 19D is a graph of optical density results with 2 min of sonication to free bacteria from the LIG filter prior to culturing after 24 h of incubation. In FIGS. 19C-19D, the bars signify the standard deviation over 9 measurements.

DETAILED DESCRIPTION

Figure 1A:
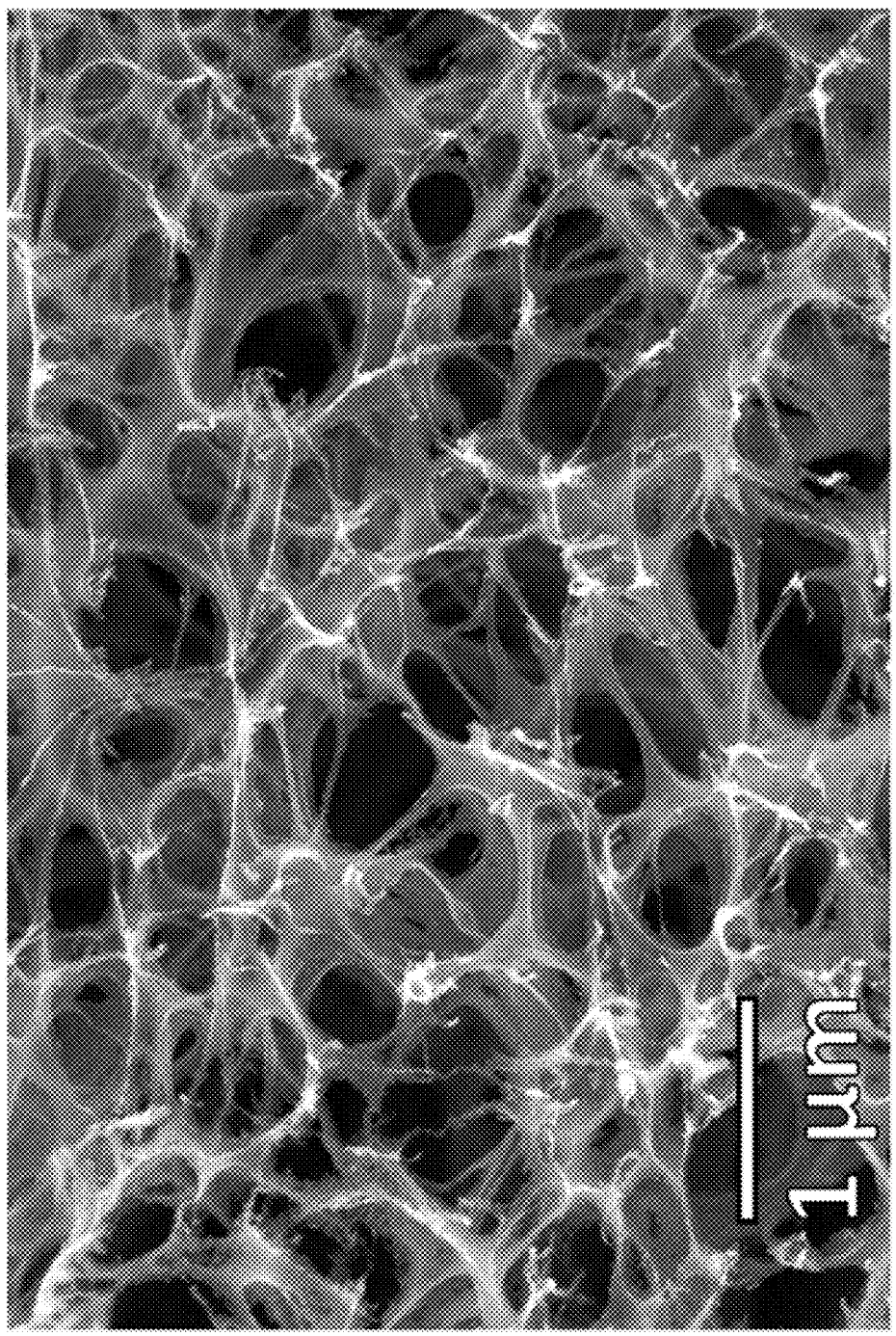
FIG. 1A is a SEM of LIG.

LIG has received much attention since it enables simple and rapid synthesis of a porous graphene film. LIG is synthesized by using a laser to irradiate a carbon source. The carbon source is photothermally converted to porous graphene. LIG exhibits pore sizes on the order of 2-10 nm in conjunction with larger micron-scale pores. [Lin 2014]. The micron-scale pores in LIG can be seen from the SEM image in FIG. 1A. Many of these pores are smaller than typical requirements of HEPA filters which is ~0.3 m in size. [ASME 2004]. Conveniently, fabrication of LIG can be carried out using a commercial laser cutter, which is found in most machine shops. This is easily translated into a roll-to-roll system for industrial manufacture. See, e.g., International PCT Application No. PCT/US2019/068933, filed Dec. 28, 2019, entitled "Laser-Induced Graphene Composites And Sensors and Methods of Use Thereof," (the "Tour '933 PCT Application") which is incorporated by reference herein.

Method of Fabricating LIG Filter Material

Figure 1B:
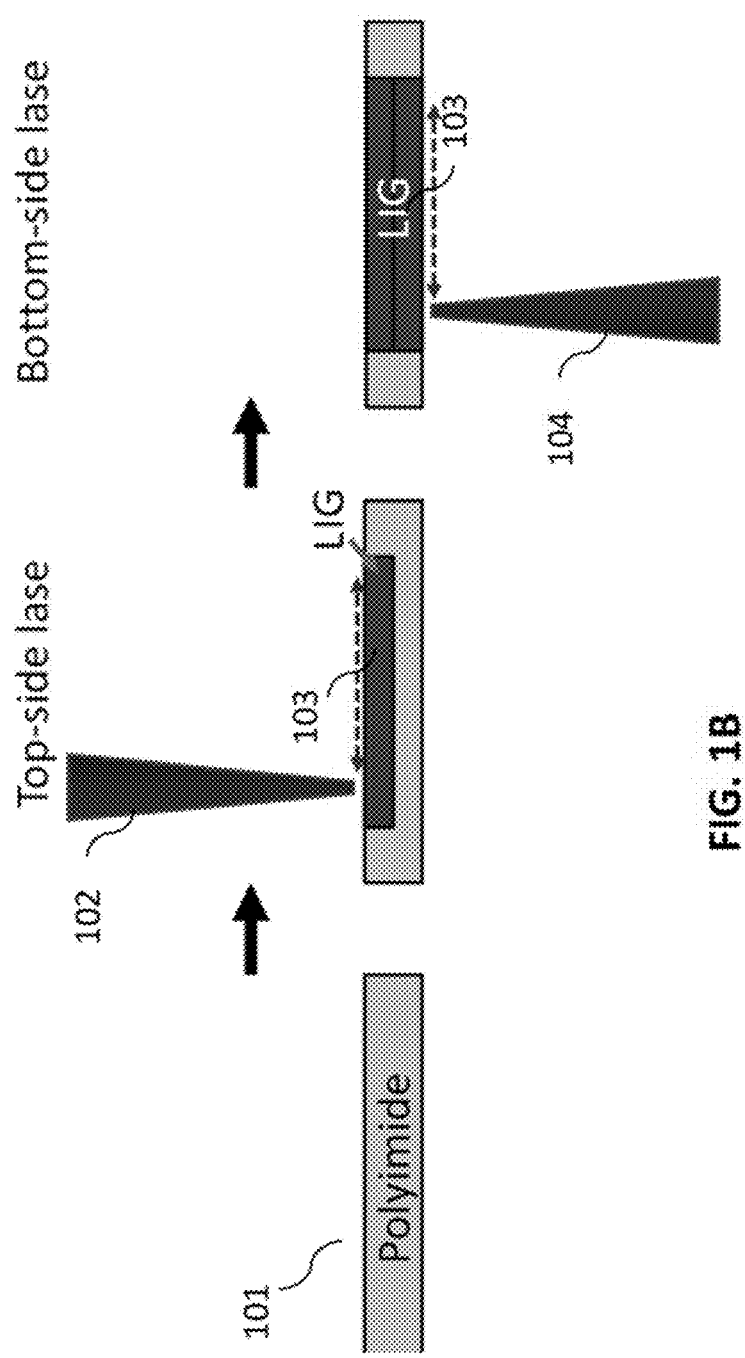
FIG. 1B is schematic of method used to lase a freestanding LIG filter out of a PI substrate.

In embodiments of the present invention, to create the LIG filter, a two-part lasing strategy can be used to convert polyimide (PI) film 101 to LIG 103. The PI film is lased on the top and bottom sides to make a freestanding film of LIG that allows air to flow through its pores. FIG. 1B shows a schematic of a schematic of process used to lase a freestanding LIG filter out of a PI substrate 101. The method uses top-side lasing 102 and bottom-side lasing 104 to convert the entire thickness of a PI film 101 to LIG 103.

LIG is synthesized by irradiation of McMaster-Carr Kapton PI 127 µm film with a 10.6 µm 75-Watt $CO_2$ pulsed laser mounted in a Universal Laser Systems XLS10MWH laser cutter at a scan rate of 30 cm/s, 15% duty cycle, and image density of 1000 PPI. As shown in FIG. 2A, a hexagonal pattern 201 is lased on both sides of the PI film 101 (hexagonal pattern 211 on the top and hexagonal pattern 212 on the bottom), thus leaving a supporting mesh of PI 101 that confers mechanical rigidity and strength to the filter, while still allowing for the LIG 103 to be continuous and conductive.

The PI 101 is fixed to the laser table during the lasing process through capillary adhesion. Since the filter is made through photothermal laser carbonization of PI 101 into LIG 103 at approximately 2900 K, an order of magnitude higher than necessary for sterilization and depyrogenation, the filters are sterile and nonpyrogenic by default prior to use. The lased area of the filter can be chosen to be 45 mm×45 mm. Since there is a slight offset at the edge of the filter due to the AB stacked hexagonal lased pattern that does not allow air flow at the edge of the filter, the dimensions of the filtration area was approximately identical to the area of the 42 mm×42 mm 0.22 µm polyethersulfone (PES) membrane filter inside the Corning™ 431097 filtration funnels that are used during testing.

Again, as shown in FIG. 2A, the PI is lased on both sides, with an alternating AB-stacked hexagonal pattern of PI left unlased (FIG. 2B). Thus, the filter is an intrinsic composite of LIG reinforced by an alternating hexagonal PI lattice that resembles the structure of Bernal bilayer graphene. The alternating hexagonal pattern yields excellent rigidity and mechanical strength, while preserving the continuity of the LIG that ensures high electrical conductivity. It should be noted, however, that other patterning geometries may be used as well, and in general, consist of two regular lattices, one pattern on each side, for the purpose of providing a 3-dimensional lattice that offers reinforcement and geometrical strengthening. Since the temperature of decomposition of LIG in air is approximately 575° C., which is greater than the 550° C. decomposition temperature in air of PI, the maximum Joule heating temperature of the filter is limited by the PI. But at the testing temperature of 380° C., the filter is far below its limit of stability.

Figure 2D:
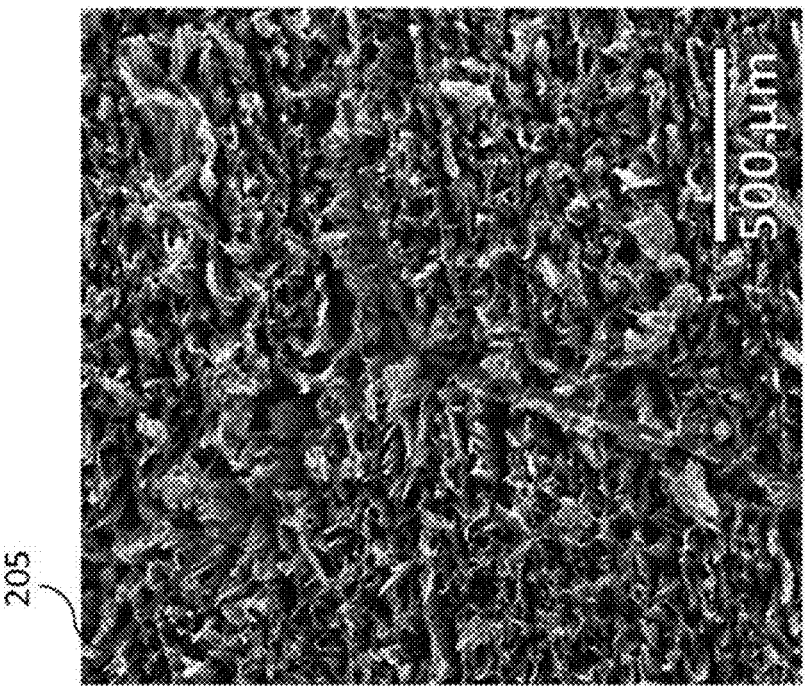
Figure 2C:
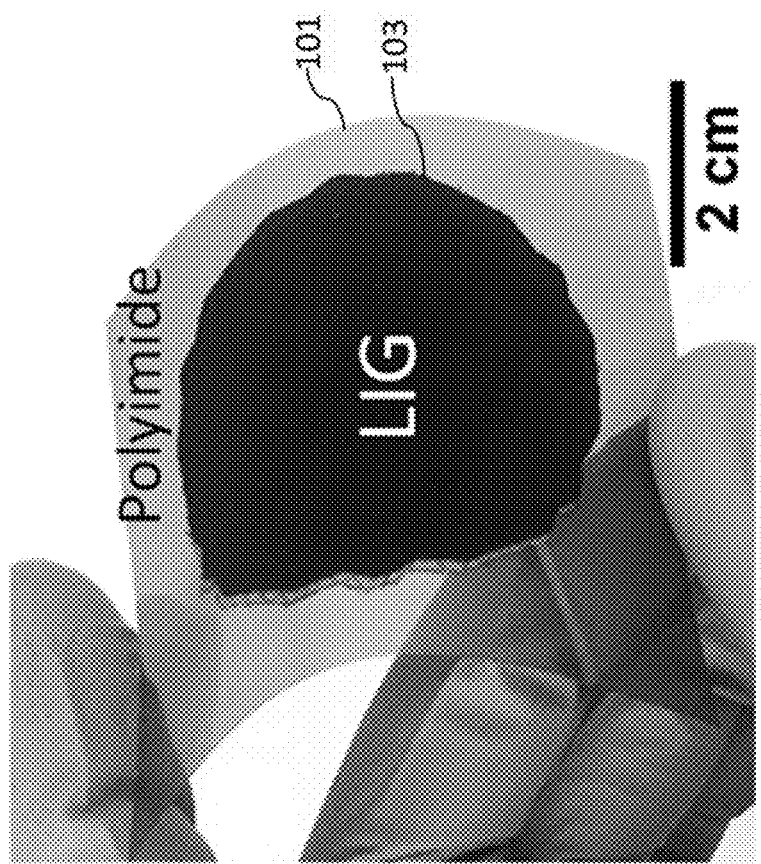
Figure 2E:
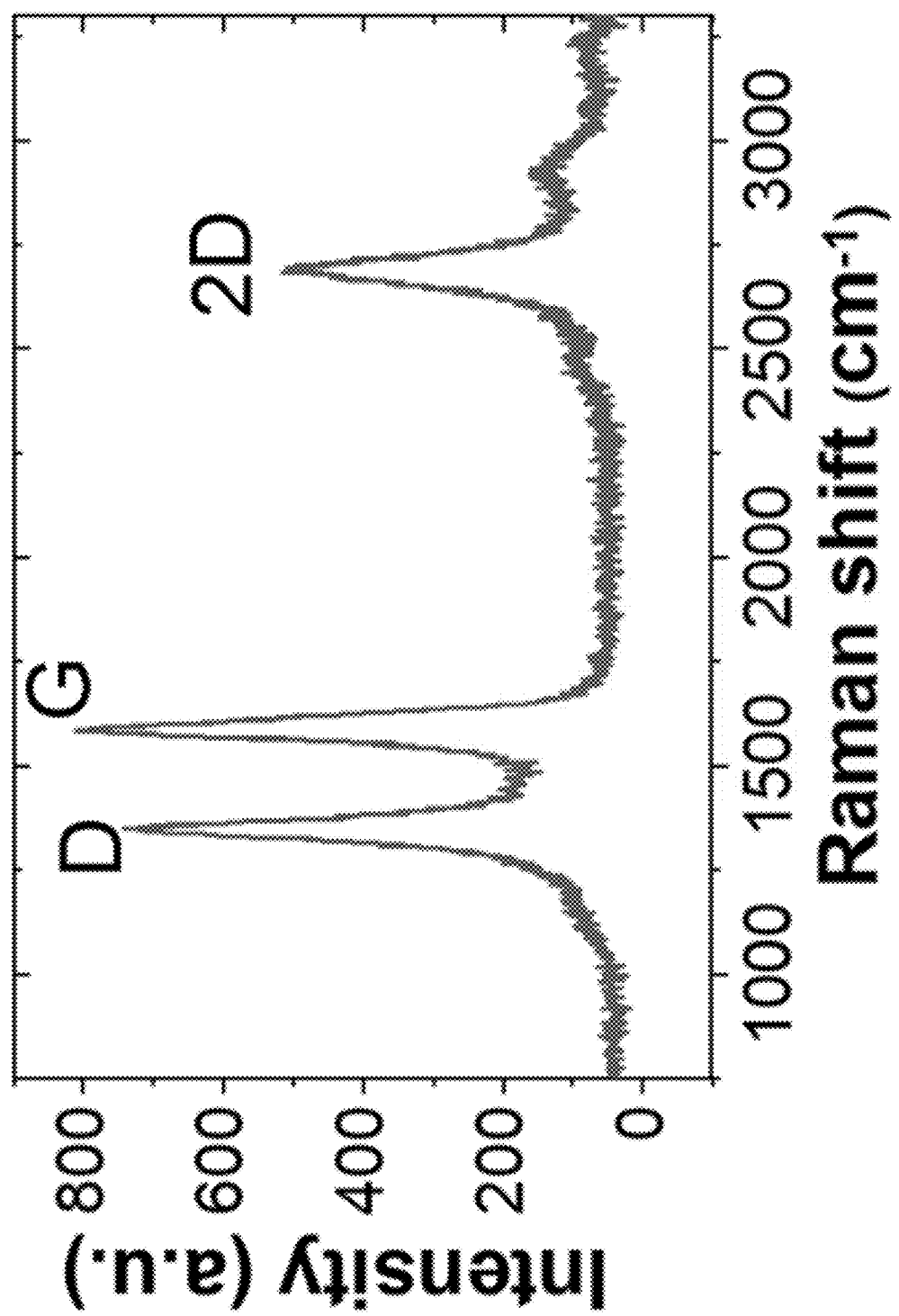

As shown in the optical image FIG. 2C, the filter can be flexed without damaging structural integrity. Since the laser scribing of LIG is a direct-write process, a variety of geometries and configurations that are easily adaptable to existing HVAC systems can be produced. The SEM image in FIG. 2D shows the surface morphology of the LIG, which is highly porous and fibrous. (FIG. 2D shows the carpet of LIG, along with the unlased PI that is marked by dashed line 205. The Raman spectrum in FIG. 2E clearly shows the presence of the D, G, and 2D peaks indicative of LIG formation. [Ye 2019]. The D band can arise from the bending of the graphene layers in the foam. [Dimiev 2016].

Cross-section images of the LIG filter are shown in FIGS. 3A-3C. FIG. 3A is a cross section image that shows the entire thickness of the filter, along with the intrinsic morphology gradient of the filter that enhances filtration efficiency. FIG. 3B is an SEM image of the outer portion of the LIG filter (magnified image of box 301 from FIG. 3A), exhibiting the LIG Fiber (LIGF) carpet that captures larger particles and aerosols. [Duy 2018]. FIG. 3C is an SEM image of a portion of the LIG filter that exhibits the structure of LIG (magnified image of box 302 from FIG. 3A), which has tortuous 2.86-8.94 nm pores that allow for the capture of bacteria and finer particles. [Lin 2014].

The varying morphologies of LIG are visible. The outer surface of the filter forms a carpet of LIG fiber (LIGF) that serves to capture larger particles and aerosols (FIG. 3B). The center of the filter is composed of porous LIG, which captures smaller contaminants and bacteria (FIG. 3C). Both of these morphologies can form during lasing of the PI and they have been characterized formerly. [Lin 2014; Duy 2018]. LIGF forms due to high laser power and spontaneous outgassing, but laser attenuation deeper within the PI results in the formation of a porous LIG. [Duy 2018]. The gradient of morphologies helps to extend the lifetime of the filter, since larger particles are removed before smaller particles, thus preventing the smaller pores from being obstructed. The submicron pores have a high degree of tortuosity and are suitable for capture of microorganisms.

Figure 4A:
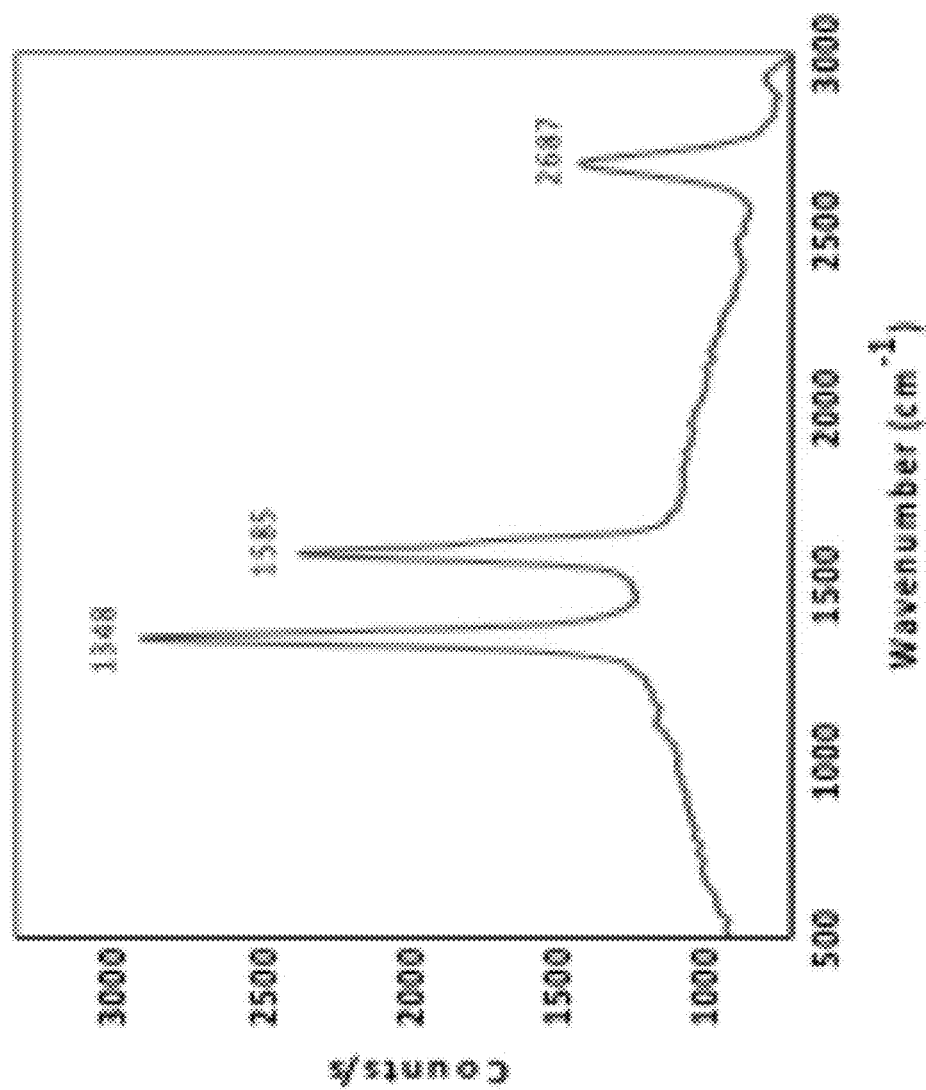
FIGS. 4A-4C are a Raman spectrum and SEM images of an LIG filter derived from a porous precursor support, namely non-woven material made of polyimide P84.
Figure 4B:
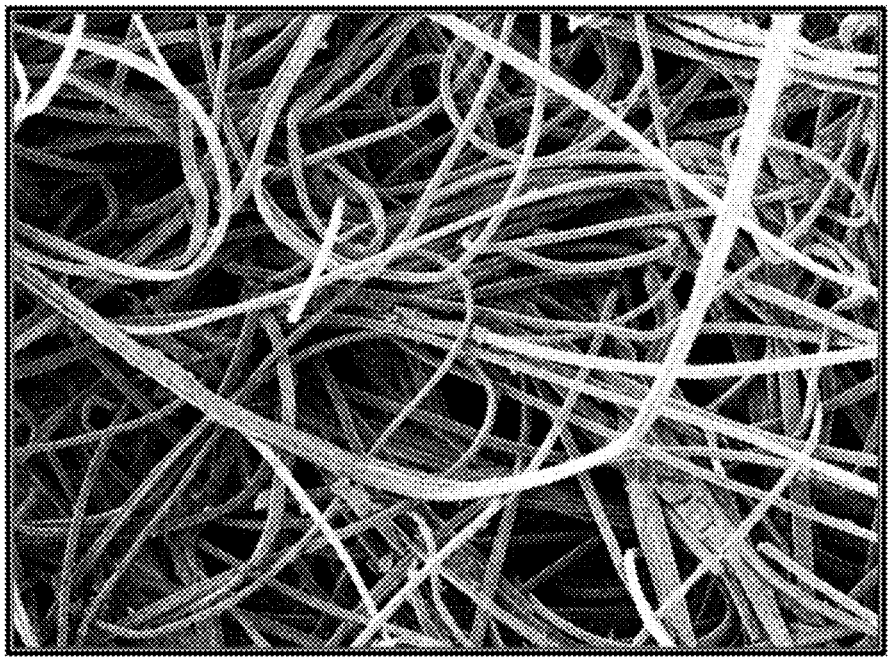
Figure 4C:
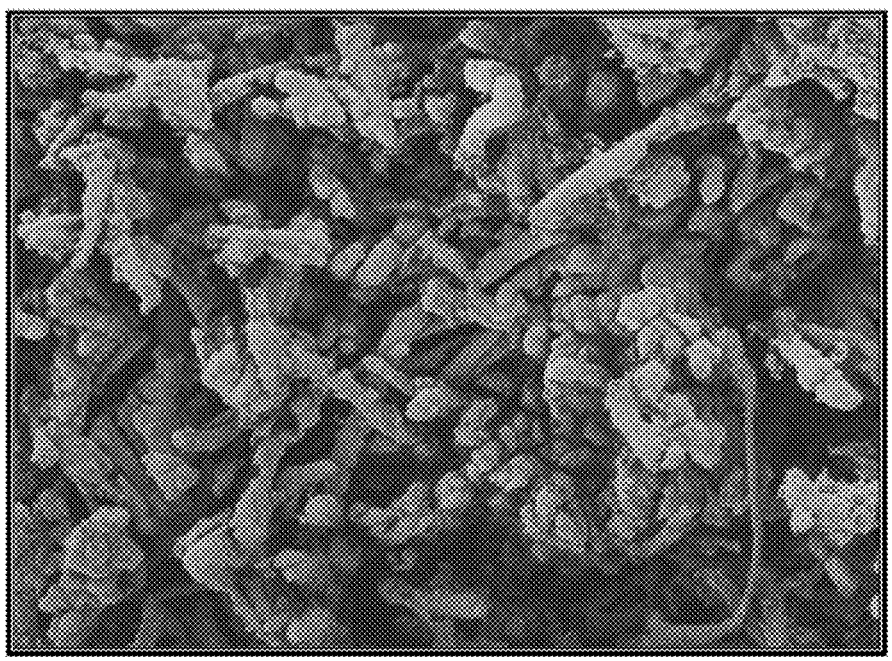
Figure 4D:
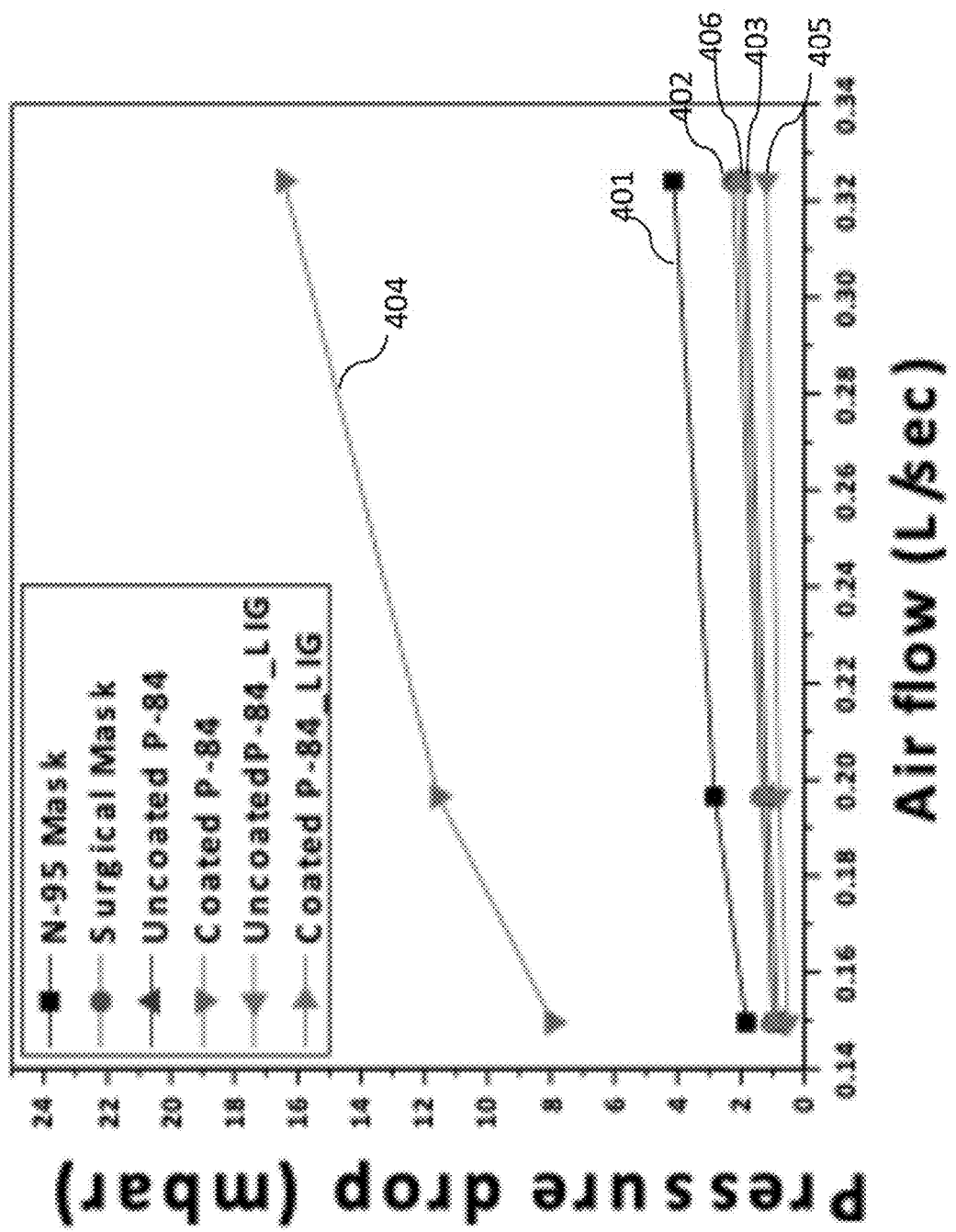
FIGS. 4D-4E are graphs showing the pressure drop of various LIG filters compared to other filters.
Figure 4E:
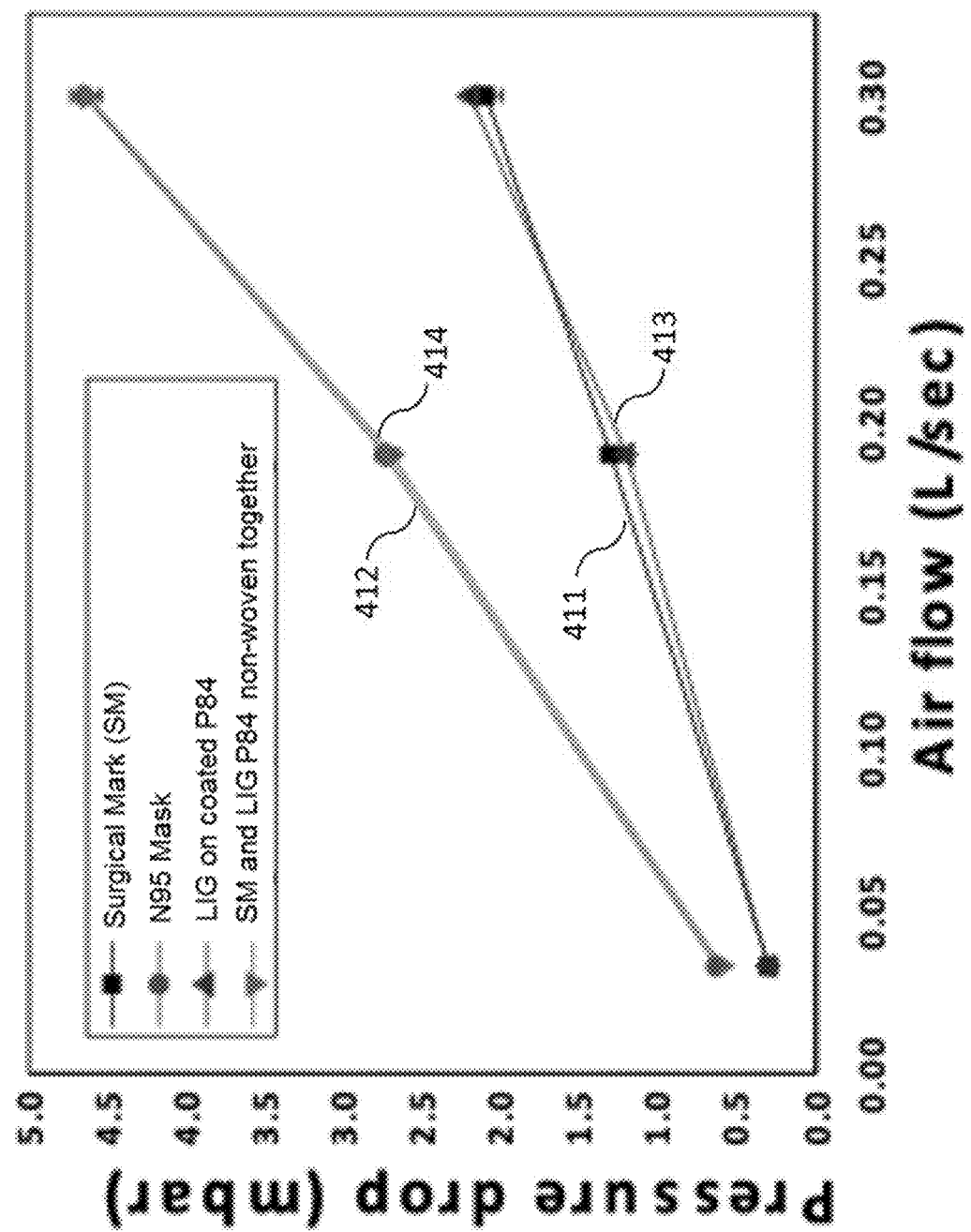

In another embodiment of the present invention, an air-permeable porous sheet containing a polymer or carbon-based LIG precursor converted to LIG. One example of a porous sheet of precursor material includes a non-woven felt consisting of P84@ polyimide fibers. Irradiation of the felt with a 10.6 µm 75-Watt CO2 pulsed laser with a duty cycle of up to 30% yielded laser induced graphene. FIG. 4A shows the Raman spectra of the lased polyimide felt clearly shows the D, G, and 2D peaks indicative of LIG formation. The SEM image in FIG. 4B shows the highly porous nature of the surface morphology of the LIG. Cross-sectional images of LIG filter (non-woven polyimide material before and after lasing) are shown in FIGS. 4B-4C. FIGS. 4D-4E show the pressure drop characterization of various P84 non-woven LIG filters in comparison to other filter materials. Plots 401-406 in FIG. 4D shows a N-95 mask, a surgical mask, uncoated P84, coated P84, uncoated P84 LIG, and coated P84 LIG. Plots 411-414 in FIG. 4E shows a surgical mask, a N-95 mask, LIG on coated P84, and surgical mask and LIG P84 non woven together.

Unlike embodiments using a solid sheet of polymer, a LIG air filter can be generated from a porous sheet by lasing only a single side without need for special patterning. By contrast, porosity would need to be generated on solid sheet by conversion of both sides to porous LIG or first cutting a mesh in the solid sheet. This further removes the need for alignment of patterns on either side of the sheet and allows for a continuous porous support to remain.

Due to these advantages, the method of making air filters by lasing a porous substrate can be utilized well in embodiments for automated manufacture of LIG air filter. Examples of automated manufacture include, but are not limited to, conveying porous sheets on a conveyor belt past a laser exposure area or using a roll-to-roll method of conveyance to do the same (FIGS. 5A-5B).

Figure 5A:
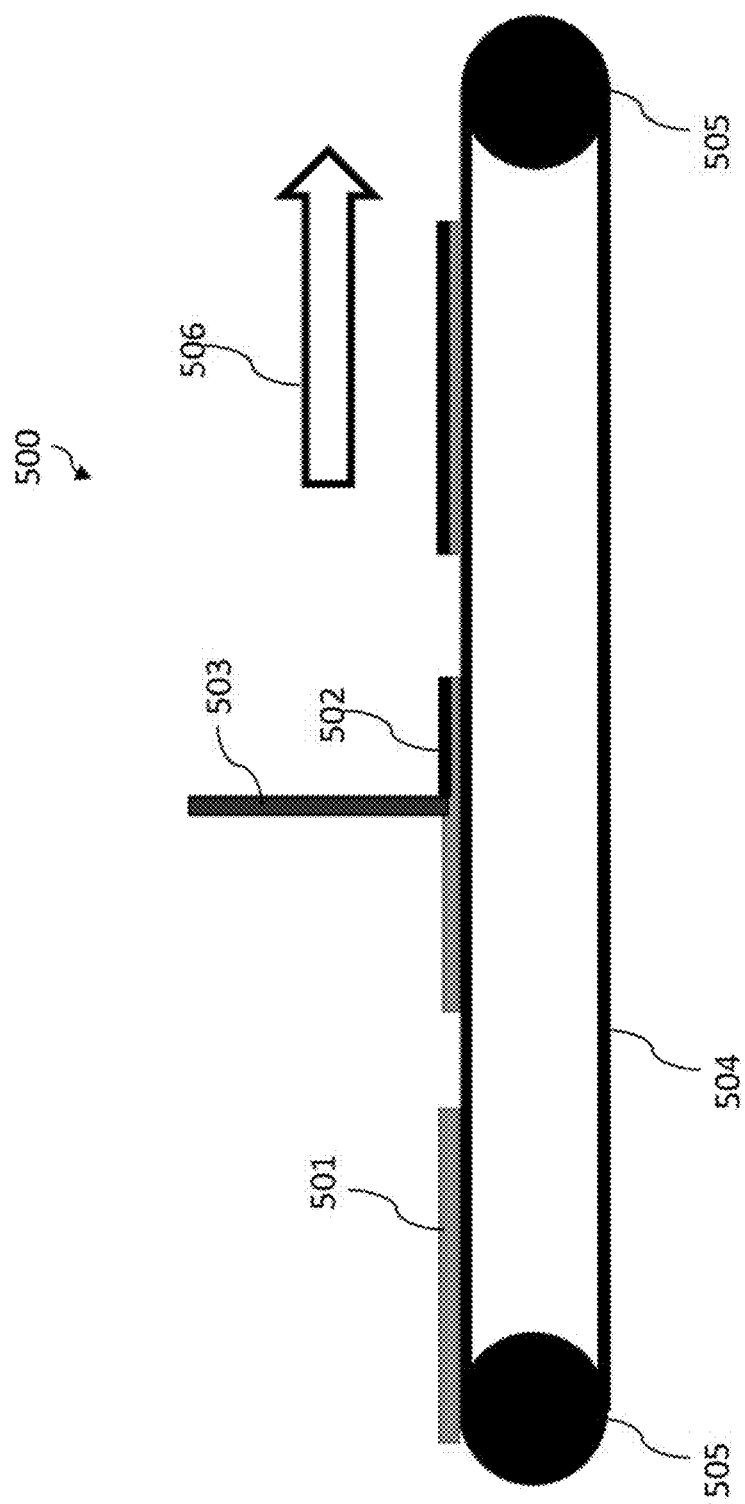
FIG. 5A illustrates a system utilizing a conveyor-based method of producing LIG air filters.

FIG. 5A shows a system 500 utilizing a conveyor-based method of producing LIG air filters. The conveyor belt 504 is moved with rollers 505 so that the conveyor belt is moving in the direction of arrow 506. A porous sheet of LIG precursor material 501 (such as made of a polymer like polyimide) is moved by the conveyor belt and then lased using laser 503 to form LIG 502 supported on the un-lased LIG precursor material 501.

Figure 5B:
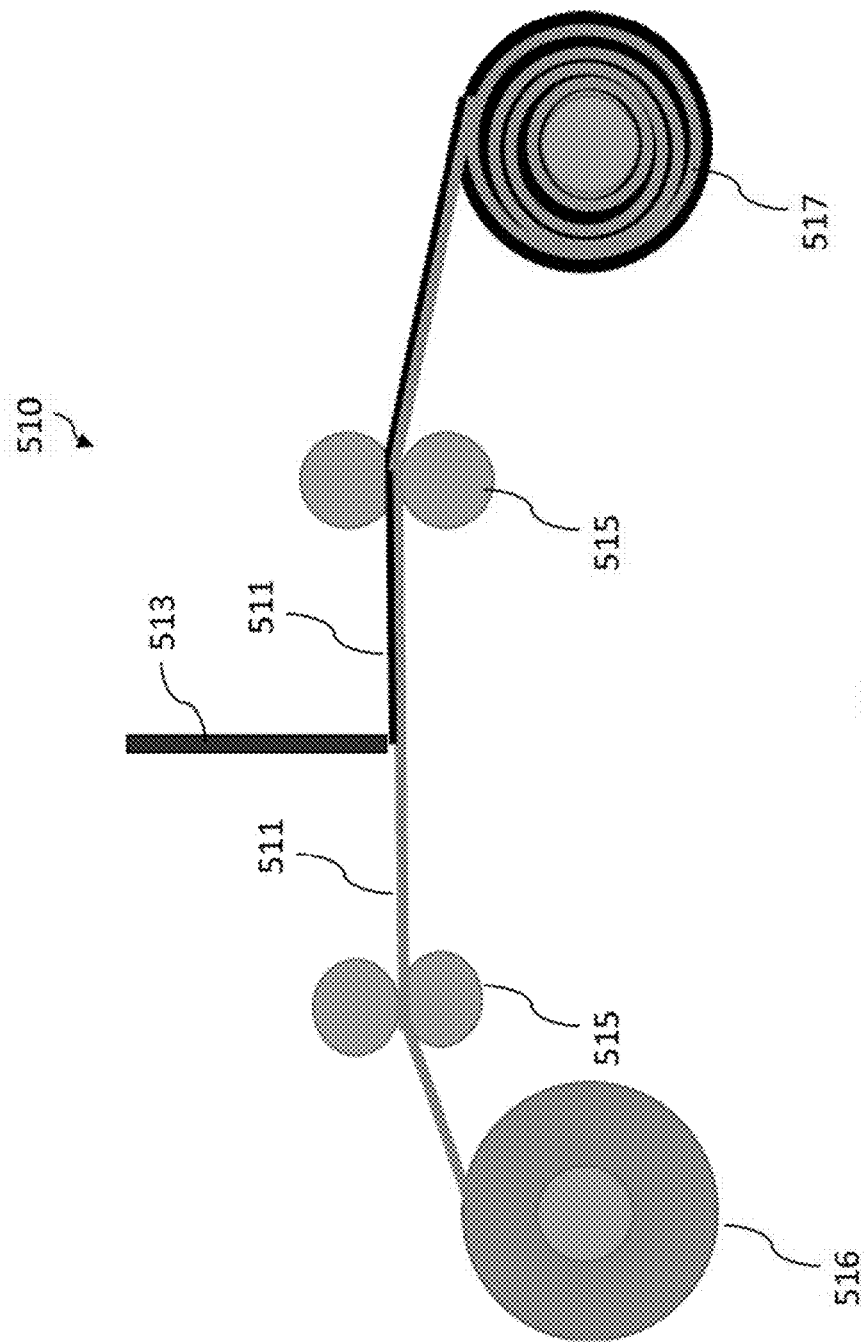
FIG. 5B illustrates a system utilizing a roll-to-roll method of producing LIG air filters.

FIG. 5B shows a system 510 utilizing a roll-to-roll method of producing LIG air filters. A roll 516 of LIG precursor material 511 (such as made of a polymer like polyimide) is unrolled and moved by rollers 515 so that LIG precursor material 511 can be lased using laser 513 to form LIG 512 supported on the un-lased LIG precursor material 511. The LIG 512 supported on the un-lased LIG precursor material 511 is then collected by rolling onto roll 517.

Filtration Systems Utilizing LIG

Figure 6A:
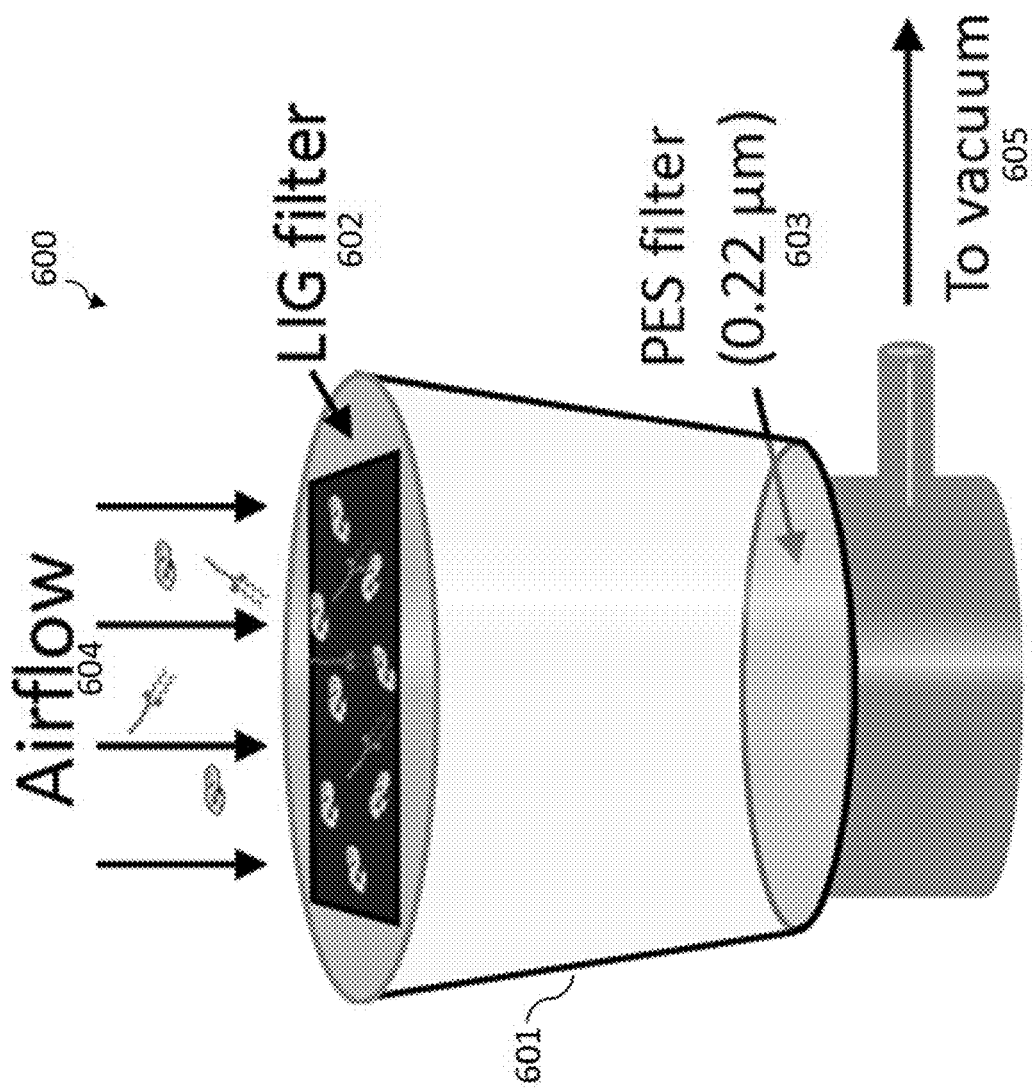
FIGS. 6A-6E are schematics of bacteria capture, along with subsequent sterilization and depyrogenation by Joule heating.
Figure 6B:
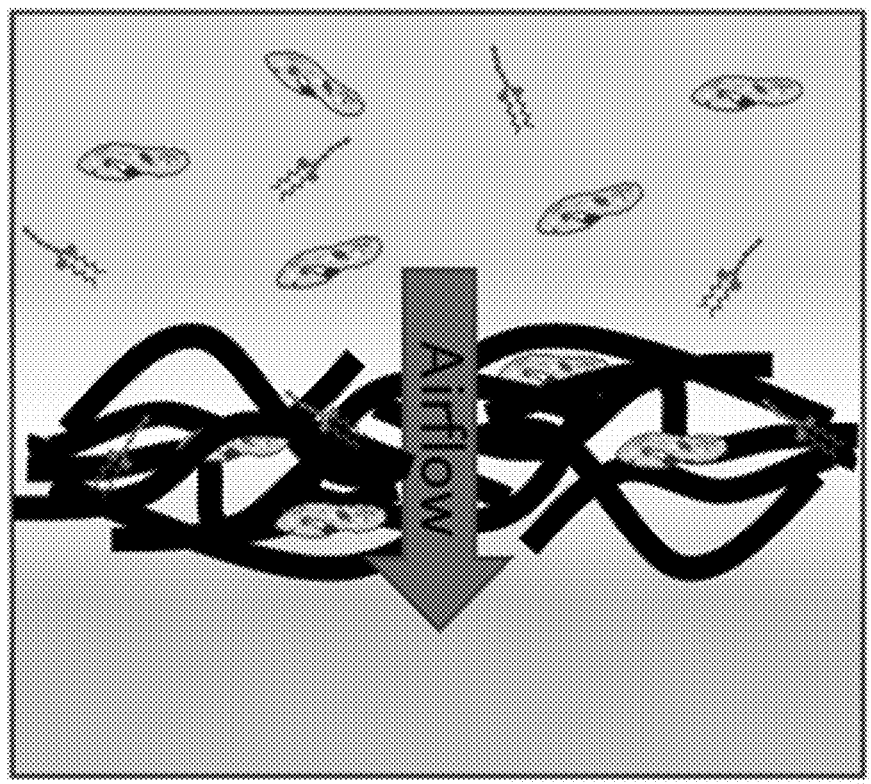
Figure 6C:
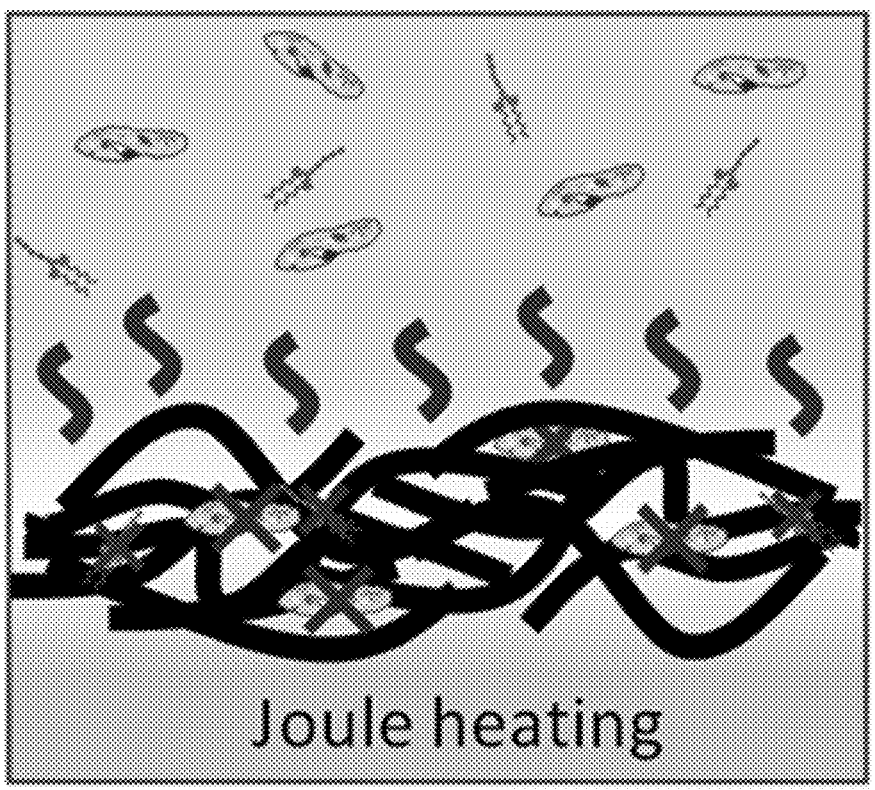

Unique to a LIG filter in comparison to typical fibrous filters, LIG exhibits a modest electrical conductivity that enables the filter to be Joule heated by electrical power dissipation. FIGS. 6A-6C show the working principle for self-sterilization of the LIG-based filter. The filter testing setup is shown in FIG. 6A, which vacuum filtration system 600 included an LIG filter 602 through which an airflow 604 can flow into a chamber 601 and out through a filter 603 (such as a PES filter 0.22 µm) to vacuum 605.

The LIG filter 602 was mounted on a vacuum filtration system 600 and was backed in series by a 0.22 µm pore test PES membrane 603. The PES membrane 603 captures contaminants that pass through the LIG filter 602 and provides a method to characterize the effectiveness of the LIG filter 602. When the LIG filter 602 is subjected to airflow, microorganisms and contaminants such as mold spores, bacteria, particulates and endotoxins become embedded in the LIG. See FIG. 6B. SEM imaging and Raman spectra reveal no signs of LIG particles that are freed from the filter and passed downstream to the PES membrane. The LIG filter can be subsequently Joule heated to temperatures that far exceed sterilization temperatures for pathogens (FIG. 6C).

Figure 6D:
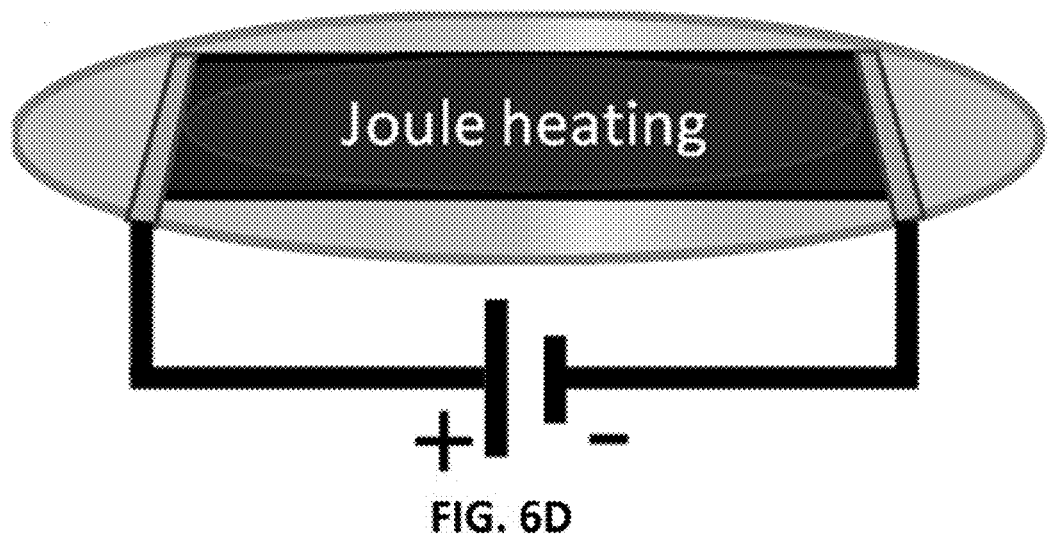
Figure 6E:
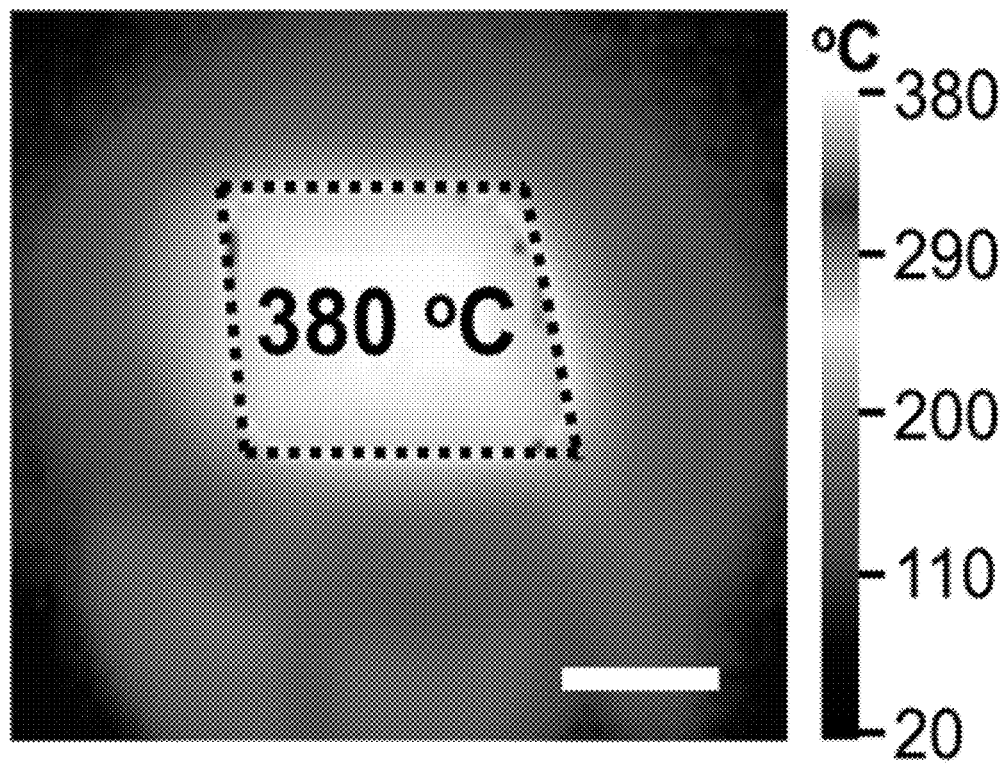

A schematic for the Joule heating process is shown in FIG. 6D. A DC power supply is used to apply a potential across the filter. Electrical power dissipation results in resistive heating. An infrared image showing the heat distribution on a LIG filter is shown in FIG. 6E. The filter can easily exceed 380° C. with largely uniform heat distribution.

Figure 7:
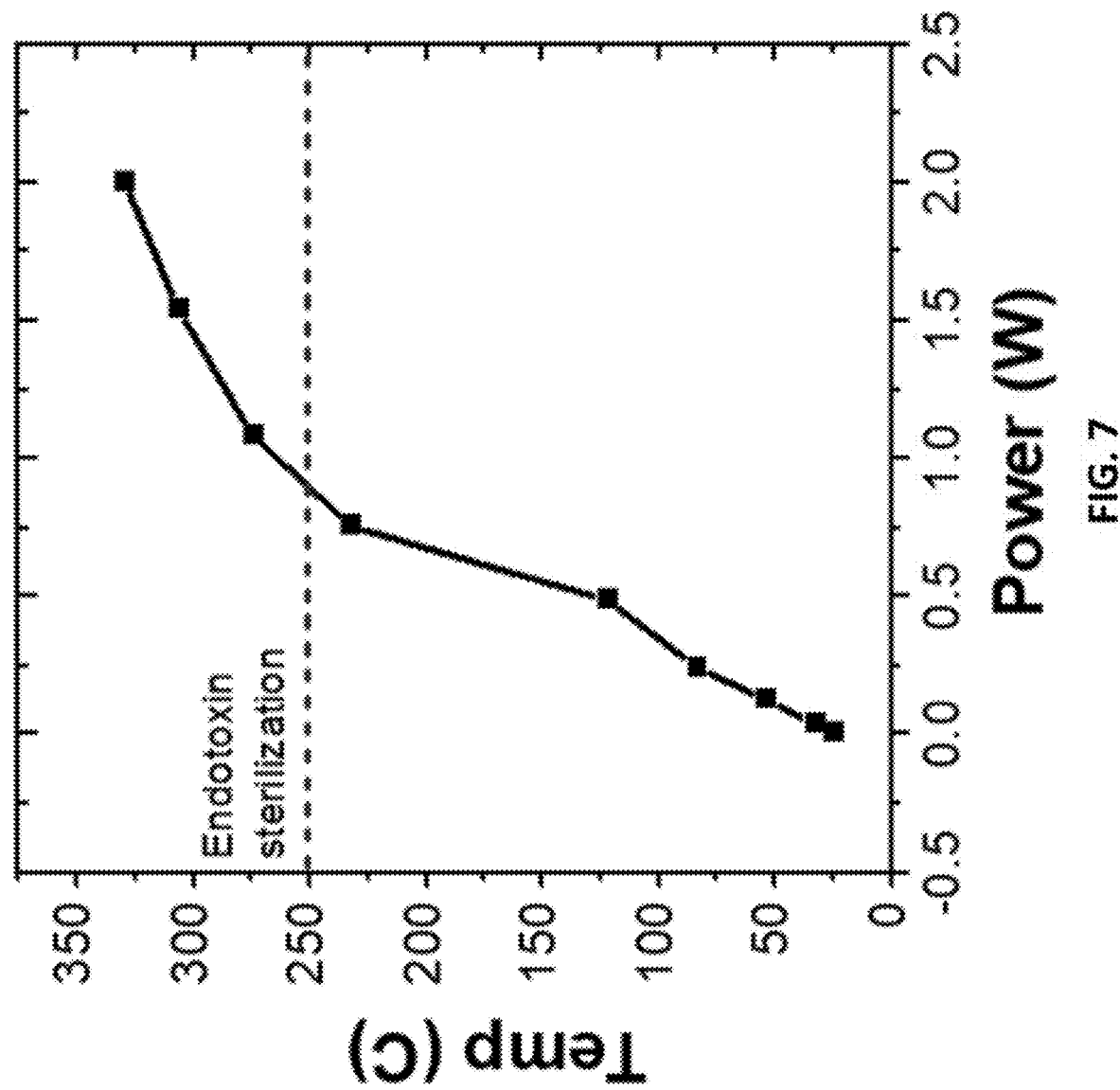
FIG. 7 is a graph showing temperature vs. power for a LIG-based filter which was heated by Joule heating.

Unique to this air filter, LIG is a conductive material. Sheet resistances of ~5 Ω/sq have been demonstrated. [Chyan 2018]. When a sufficient voltage is applied across the LIG filter, Joule heating rapidly raises the temperature of the filter, which can incinerate trapped particulates such as bacteria, endotoxins and viruses. Sterilization temperatures for bacteria and endotoxins in dry air are 150° C. and 250° C., respectively. [Jenneman 1986]. While temperature of virus capsid deactivation is much lower temperature, approximately less than 3 s at 150° C. The LIG material can be rapidly Joule heated to 250° C. in ~6 s with a DC power supply, using ~0.8 W/cm$^2$ of power consumption. FIG. 7 shows the temperature vs. applied power for a LIG-based filter. This enables rapid incineration of trapped particulates, and hence the LIG-based air filter is considered self-cleaning. Conveniently, the PI, which supports the freestanding LIG film, is stable in air up to 550° C. This is well below the sterilization temperatures needed, so the films will be exceedingly stable over time.

Figure 8:
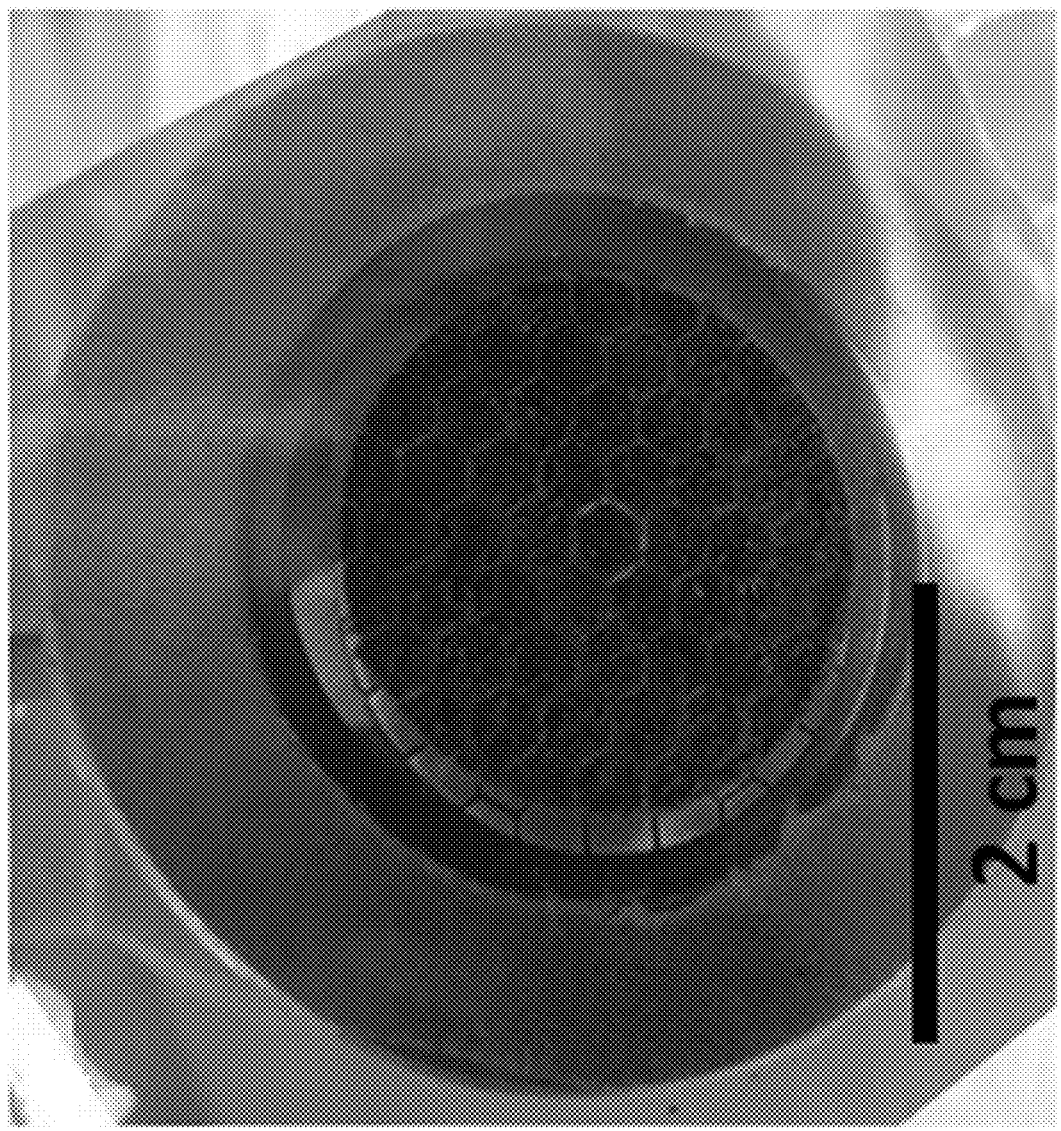
FIG. 8 is an optical image of a LIG air filter.

FIG. 8 shows an optical image of a LIG filter which was subjected to continuous airflow for 25 days.

Figure 9E:
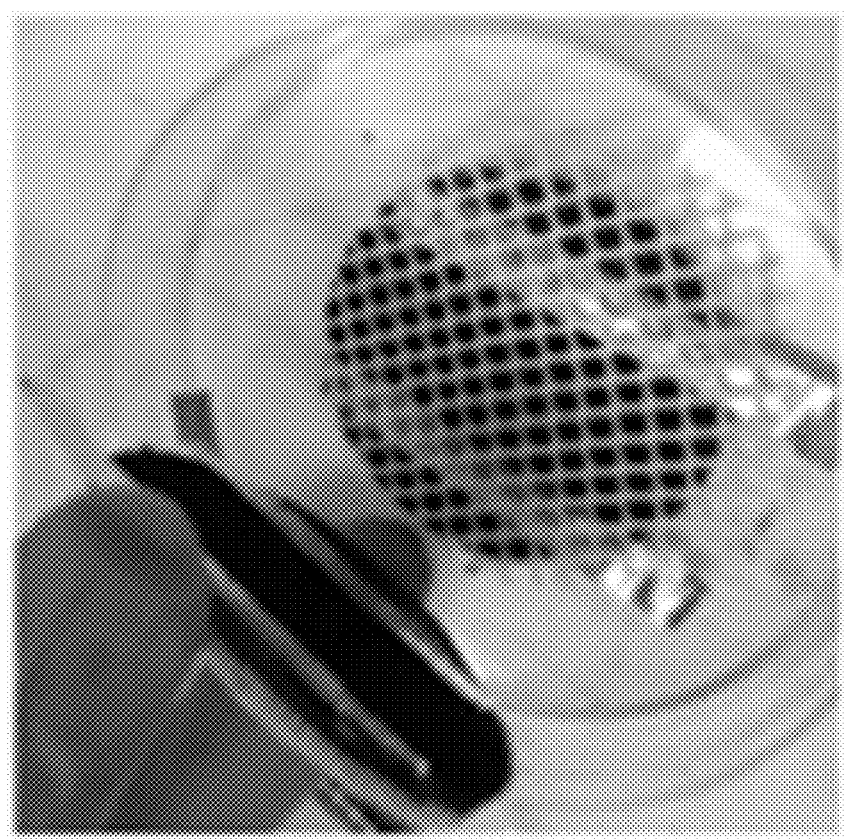
FIG. 9E is a photograph showing the parts of the system illustrated in FIG. 9D.

The electrical conductivity of the LIG air filter also allows for operation of the LIG filter in an electrostatic mode to enhance the capture of particles. Application of a potential across the LIG filter can capture charged particles. On a single-sided LIG air filter, a voltage may be applied in the plane of the filter sheet. On a double-sided LIG filter a voltage may be applied across the filter such that the first side of the of the LIG filter may be more positively or negatively charged compared with the second side of the LIG filter on the opposite face of the sheet. Application of an electric charge shows the reduction of penetration of bacterial particles through the filter. FIG. 9A-9D illustrate different geometries for example systems with LIG filters 902 that support the application of voltage 903 for electrostatic filter 901 (P84 polyimide fiber, Evonik Fibers GMBH, Lenzing, Austia). The system of FIG. 9C-9D includes a spacer 904. FIG. 9E is a photograph of showing the parts of the system illustrated in FIG. 9D.

TABLE I shows the reduction in colony forming units of *P. aeruginosa* as a function of applied potential across the geometries illustrated in FIG. 9A-9D as well as systems utilizing no LIG (both single and double thickness of the P84 polyimide fiber). In TABLE I, the bacterial passage (%), normalized to the system without any test filter at an air flow rate of 10 L/min.

TABLE I

|  | Bacterial passage (%) | | | |
| --- | --- | --- | --- | --- |
|  | 0 V | 2.5 V | 5 V | 10 V |
| P84 (No LIG) | 23.9 | — | — | — |
| 2 × P84 (No LIG) | 14.8 | — | — | — |
| FIG. 9A | 15.3 | 6.4 | 5.1 | 4.1 |
| FIG. 9B | 8.1 | NT | 11.3 | NT |
| FIG. 9C | 8.1 | 3.6 | 3.0 | 2.8 |
| FIG. 9D | 10.3 | NT | 2.5 | NT |

NT—not tested

Temperature, Power, Air Flow Rate, and Pressure Drop Relations

Among important parameters for filter characterization are the flow rate, pressure drop, and particle capture ability. The capable flow rate of a filter reflects the rate at which air can be passed through a filter for effective filtration. Pressure drop across the filter indicates the resistance of the filter to airflow and is correlated with the power consumption required to drive air through the filter. Air filter figure of merit (Q) is often defined as in Eq. 1

$$Q = -\ln(P)/\Delta p \tag{1}$$

where P is the particle penetration defined as concentration of downstream particles divided by concentration of upstream particles, and $\Delta p$ is the pressure drop across the filter. [Brown 1993]. It is desirable to have a low pressure drop and high particle capture efficiency at a given air flow rate.

Figure 10A:
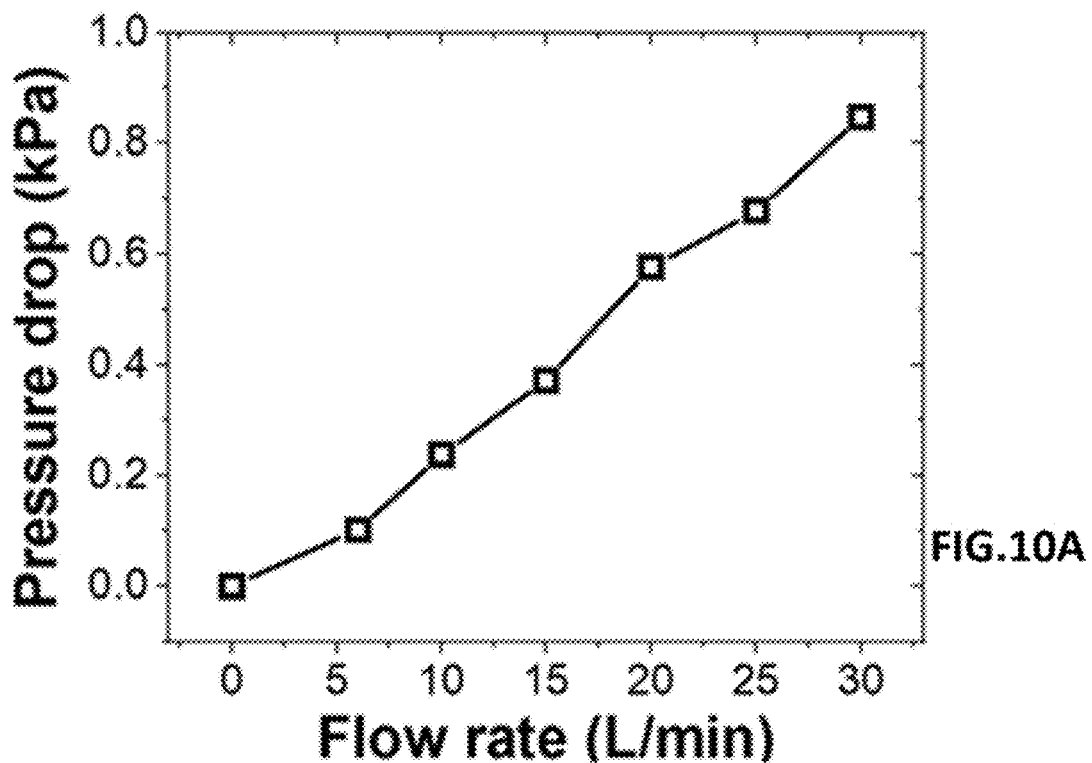
FIGS. 10A-10F are graphs showing temperature, power, pressure drop, flow rate, cycling stability, and particle capture plots.
Figure 10B:
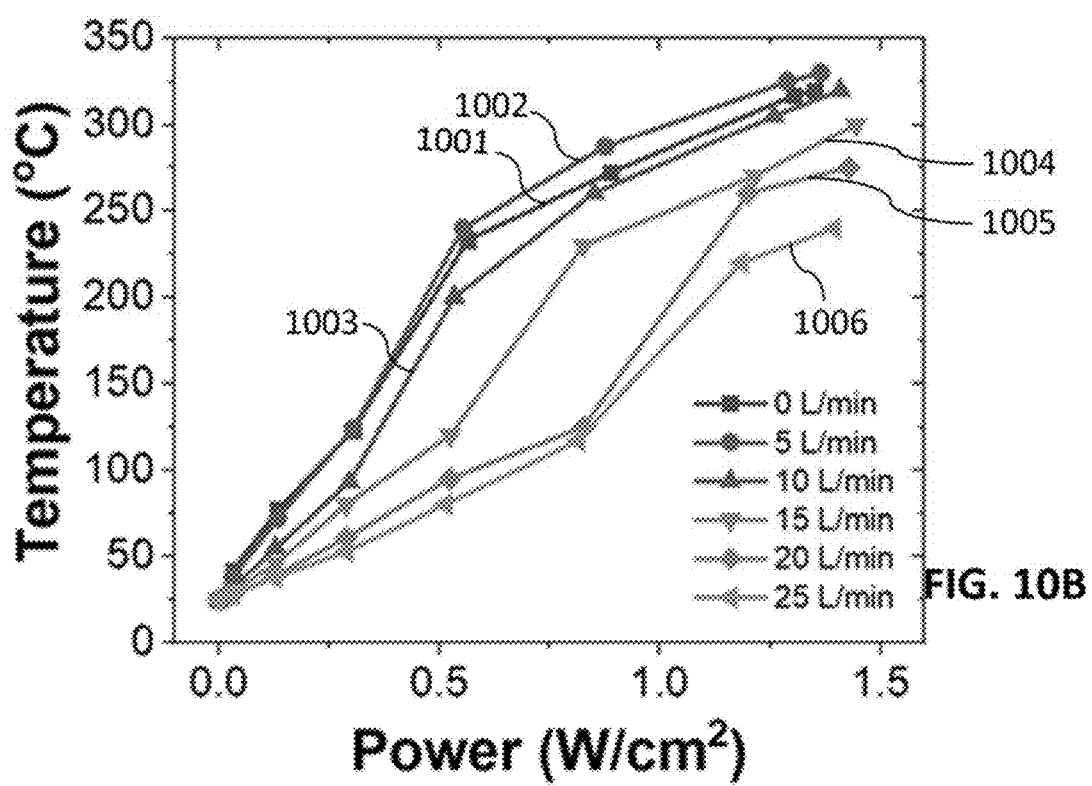

The pressure drop across the LIG filter as a function of air flow rate at room temperature is shown in FIG. 10A. The filter exhibited a pseudolinear relationship between airflow and pressure drop, which is common for particle capture air filters. The effects of airflow rate on the Joule heating capabilities of the LIG filter is characterized in FIG. 10B. Specifically, the temperature vs electrical power curves while the filters were subjected to simultaneous airflow of 0 to 25 L/min are reported (with plots 1001-1006 corresponding to 0, 5, 10, 15, 20, and 25 L/min, respectively).

At relatively low flow rates (0 and 5 L/min), no substantial impact on temperature as a function of power was observed, and reductions in temperature were observed for low supplied powers at high flow rates. However, the temperature-power plots exhibit sigmoid behavior at higher flow rates, indicating that increasing the power can partially compensate for the reduction in temperature even at relatively high flow rates.

Figure 10C:
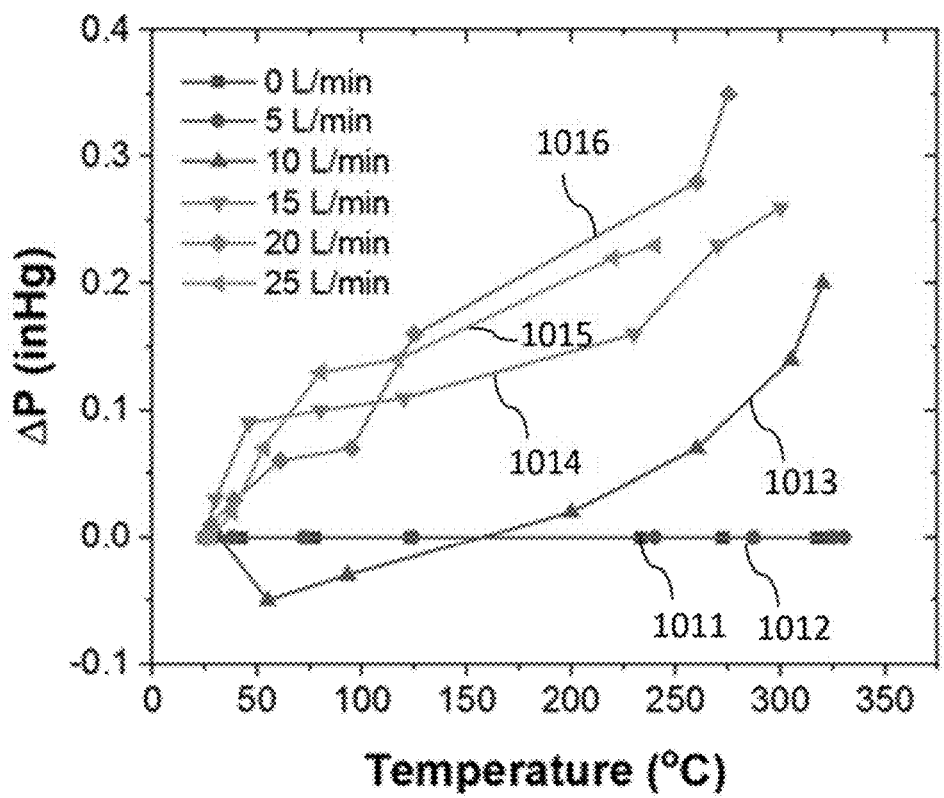

The pressure drop across the LIG filter as a function of filter temperature at various flow rates is shown in FIG. 10C (with plots 1011-1016 corresponding to 0, 5, 10, 15, 20, and 25 L/min, respectively). As expected, the pressure drop increased with increasing flow rate. It was also observed that the pressure drop increases as the temperature increases. This was due to the negative thermal coefficient of expansion of graphene. [Yoon 2011]. As the temperature increased, the LIG contracts and the pore size decreased, increasing resistance to air flow.

The contraction is beneficial for multiple reasons. The contraction enhances the ability of the LIG to trap and incinerate the captured contaminants as the filter is Joule heated. Likewise, contraction improves electrical contact within the LIG, and decreases the resistivity of the material, making heating increasingly facile as the temperature increases. The contraction decreases the air flow, which leads to less loss of energy during heating, and enables higher temperatures to be reached, thus leading to the sigmoid behavior observed in the temperature-power curves.

Thermal Cycling Stability

Figure 10D:
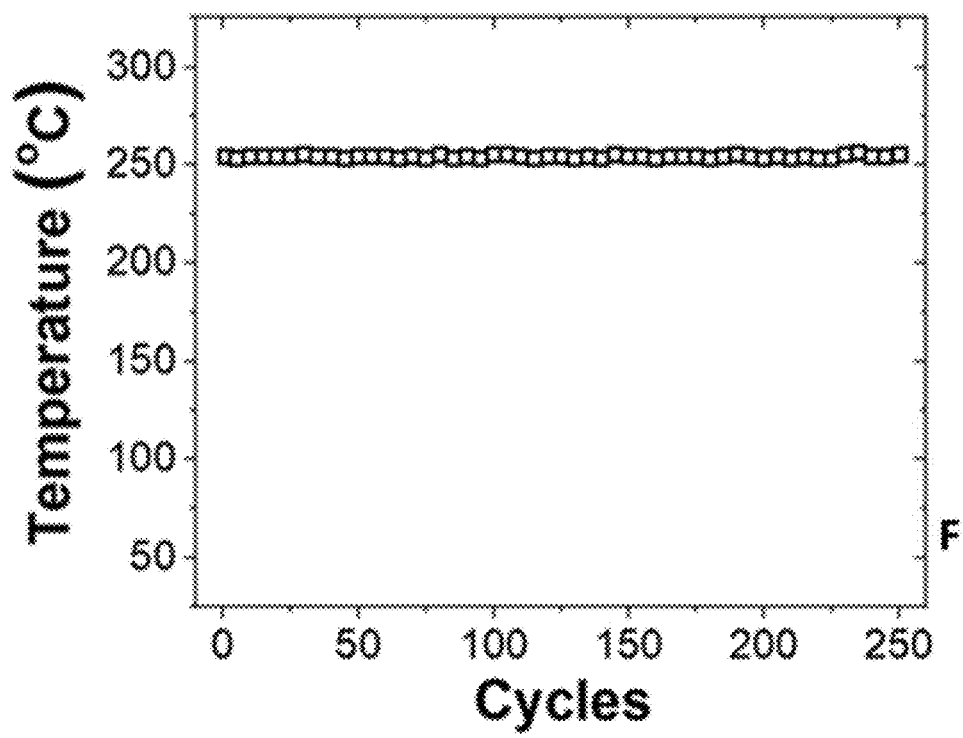

The results of LIG filter thermal cycling stability testing are shown in FIG. 10D. There was no observed decomposition over 250 cycles to 255° C., where a potential was supplied at a constant 15 V for 5 s, and then cut off for 5 s in order to allow the filter to cool to room temperature. Afterwards, the filter was heated for 30 min under the same conditions to test extended Joule heating thermal stability. The extended Joule heating of LIG filter samples demonstrated consistent thermal stability. Finally, the filter was subject to 1 h of heating at 380° C., and due to the remarkable thermal stabilities of LIG and PI, no signs of degradation are observed.

Since LIG has a low heat capacity, heating and cooling rates are rapid. The amount of time required to heat to 255° C. was ~5 s, and the amount of time required for the filter to cool to room temperature was ~5 s. The low heat capacity is essential to the efficiency of the filter, as the filter does not require a substantial amount of energy to heat up, thus facilitating the achievement of high temperatures in a short amount of time with low power consumption. Simultaneously, the amount of waste heat that was transferred to the air, eventually to be removed by air conditioning, was also reduced. As the temperature increased, the current increased ~4.5% since the conductivity of LIG increases with temperature, thus enabling real-time temperature monitoring by measurement of resistance. LIG decomposes in air at approximately 575° C., and has greater thermal stability in air than PI, which decomposes in air at approximately 550° C. As determined by TGA, the filter was stable below 560° C. Therefore, the peak temperature of operation for the Joule heating LIG filter should be limited to <500° C. to prevent thermal degradation.

Particle Pollutant Capture Test

Particles were generated by combustion of a cigarette and passed through the LIG filter to determine the efficiency at capturing sub-micron particles. The filtered air was bubbled through water to capture airborne particulates and analyzed via dynamic light scattering (DLS).

Figure 10E:
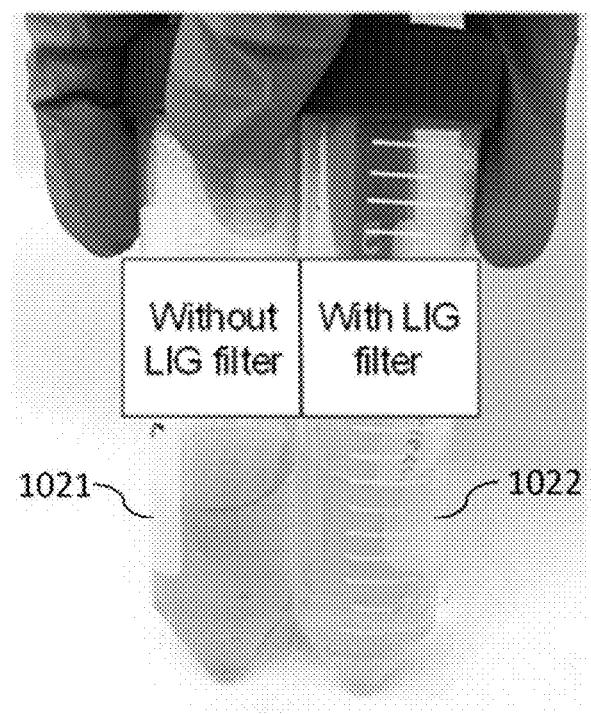
Figure 10F:
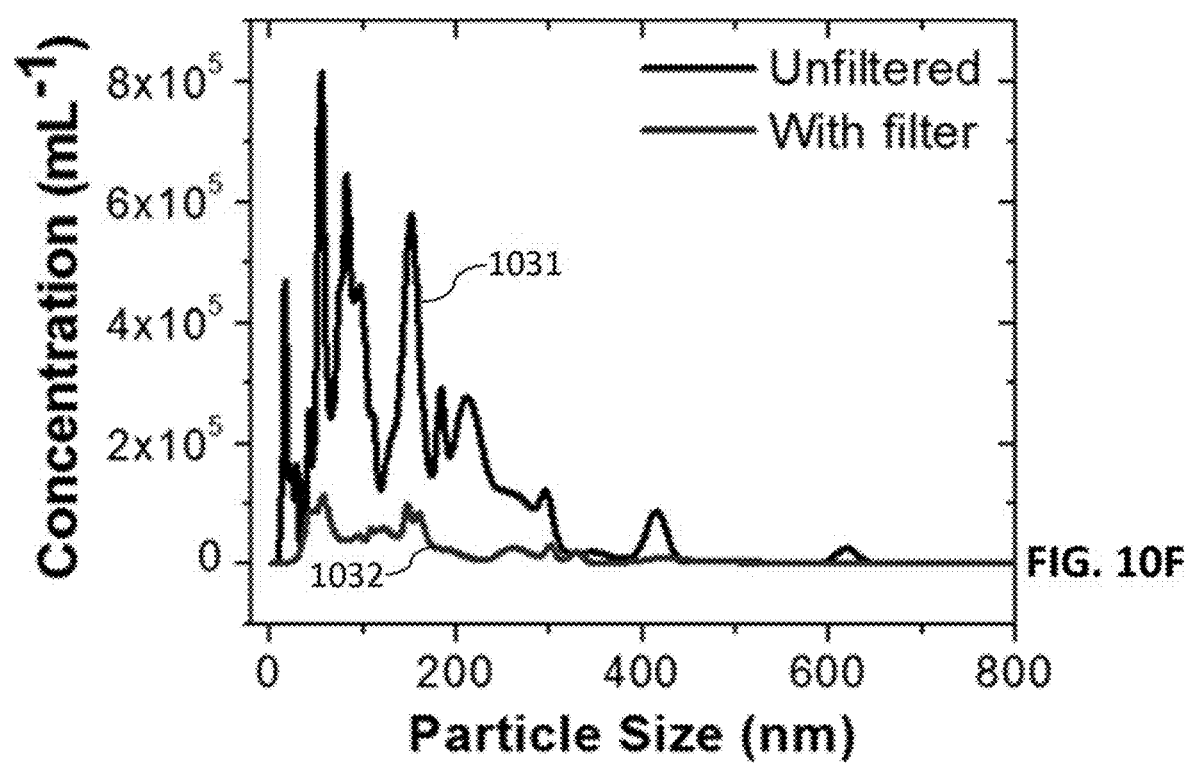

Optical images of the water used to capture the airborne particulates (FIG. 10E) revealed that the unfiltered air (in vessel 1021) contained many more particulates in comparison to the filtered air (in vessel 1022), as denoted by change in color of the solution. DLS was used to estimate the concentration of particles that were captured in the bubbler. See FIG. 10F, with plots 1031-1032 for unfiltered and with filter, respectively. At all particle size ranges, the filter stopped a substantial fraction of the particles (greater than 86% from 0-500 nm). Some smaller particles were able to penetrate the filter, although the size ranges observed were sufficiently small to penetrate high efficiency particulate air (HEPA) filters as well.

However, since most bacteria, fungi, aerosols, virus-containing aerosols, allergens, and particulates that carry pathogens are generally on the micron scale, finer filtration does not provide substantial improvement in protection for medical applications. [Kowalski 2012]. Filtration efficiency may be easily enhanced by increasing filtration layers, pleating the filter, or chemical functionalization, although the latter might make the operating temperature more limited. On the basis of size exclusion sieving alone, without consideration of any other capture mechanisms, the filter will be effective at stopping particles of pollen, spores, and dust, and, therefore, will be effective at eliminating common allergens. [Sublett 2010].

Reusability/Joule Heating

Figure 11A:
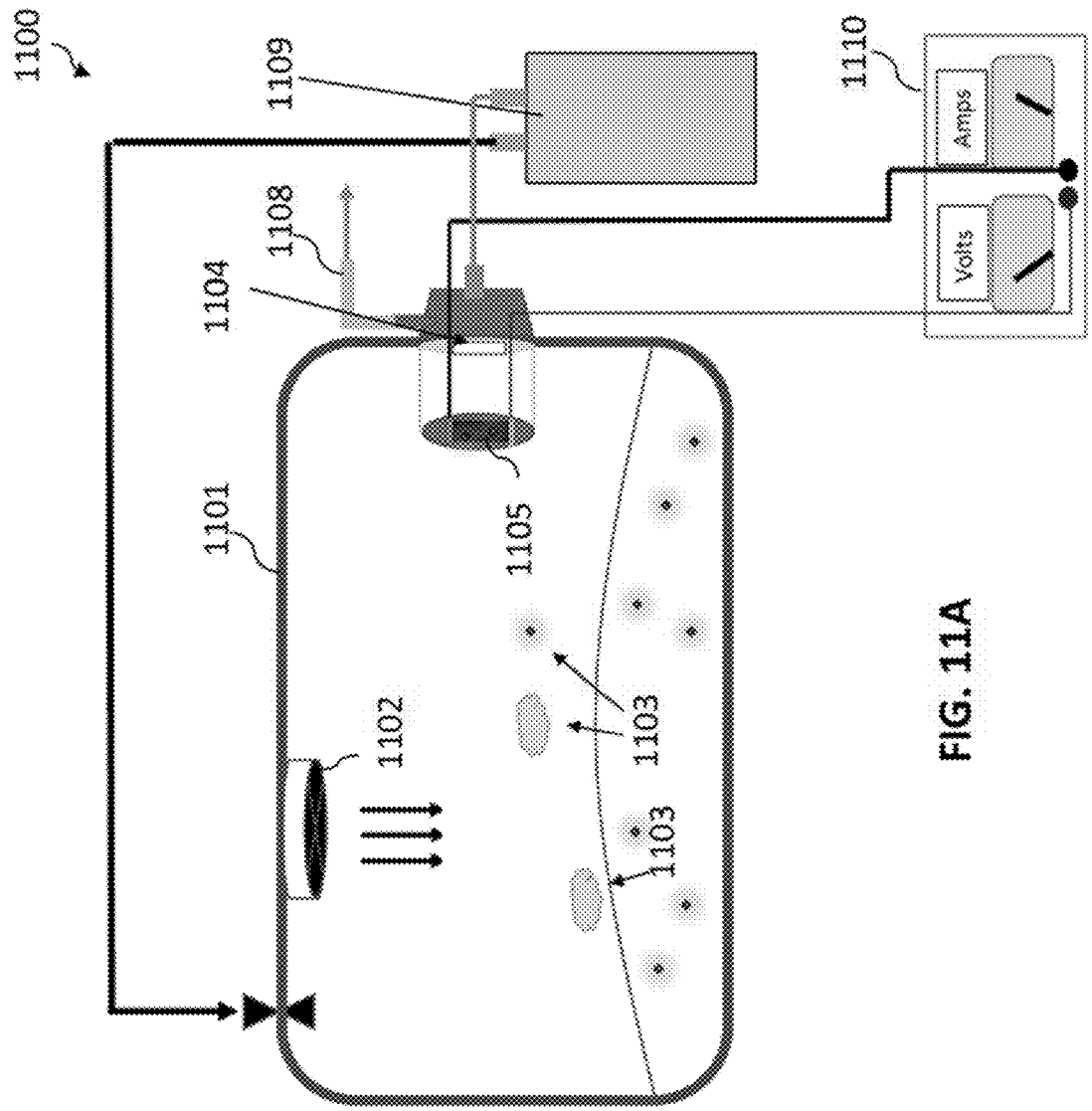
FIG. 11A is a schematic of an agitation box system that was utilized.

LIG filters were purposefully coated in different materials and Joule heated to test reusability. FIG. 11A shows an agitation box system 1100 that was utilized to coat the filters with the test media and the chart data showing the recovery of the filters. System 1100 includes an agitation box 1101 with a fan 1102 (such as 12 V fan) for manual particulate saturation of particles 1103 and a vacuum filtration system 1104 that includes an LIG filter 1105. Magnification of LIG filter 1105 is shown in FIG. 11B. LIG filter 1105 can be a non-corrugated, single sheet LIG 1106 with silver conductors 1107. Vacuum filtration system 1104 can flow air to vacuum using conduit 1108. System 1100 further includes a manometer H009 for air pressure reading, and a power supply 1110. FIG. 11C showing the particulate matter on LIG filter 1105 filter shown before Joule heating (LIG filter 1105a) and after Joule heating (LIG filter 1105b). No PES filter was required in system 1100.

MERV 8 Dust

The minimum Efficient Reporting Value (MERV) is designed to assist in the rating of filters. A MERV Rating Chart is found at http://www.mechreps.com/PDF/Merv_Rating_Chart.pdf and some various filters are rated as follows:

Spun fiberglass filters (MERV 1-4): Cheap and disposable, these filters will catch 80% of particles 50 microns and larger, and snag 25 percent of the particles in the 3 to 10 micron range. Many manufacturers recommend these filters as minimum protection just from dust and dirt building on fan motors, heat exchangers, and other surfaces. They filter out large particles to protect the furnace components, provide maximum airflow but don't filter the tiny harmful contaminants that affect your health.

Disposable pleated paper or polyester filters (5 to 8 MERV): These median-sized filters trap 80 to 95 percent of the particles 5 microns and larger. They cost four times more than the spun fiberglass filters but do a better filtering job.

Electrostatic filters (2 to 10 MERV): These use self-charging fibers to attract particulates out of the air. Disposable pleated versions run about $10 in standard sizes (example: 16"×25"×1"). Washable versions (rated 4 to 10 MERV, usually not pleated) sound like a great way to save money but quality varies with cost. Better quality ones can last up to 8 years. These filters must dry completely after washing in order to avoid mildew or mold growth so a handy trick is to buy two and rotate them out for cleaning.

Disposable pleated high MERV filters (11 to 13 MERV): High-efficiency filters can trap 0.3 micron particles like bacteria and some viruses. Two to five inch thick versions of these filters fit in box-like housings mounted onto the air handler and can last up to one year. Periodic changes to the filter design can add to the price.

High-efficiency particulate arrestance (HEPA) filters: These are the true high end of filtration and are able to filter out 0.3 micron particles. HEPA filters drastically restrict airflow and should only be matched to a compatible system.

For a MERV 8 rated filter, the dust spot efficiency is 30-35, and the arrestance is greater than 90%. The typical controlled contaminant for a MERV 8 rated filter is 3.0 to 10.0 μm particle size. The typical application and limitation for MERV 8 rated filters is commercial buildings. The typical air filter/cleaner type for MERV 8 filters are pleated filters, which are generally disposable, extend surface area, thick with cotton-polyester blend media, and cardboard frame.

Figure 12:
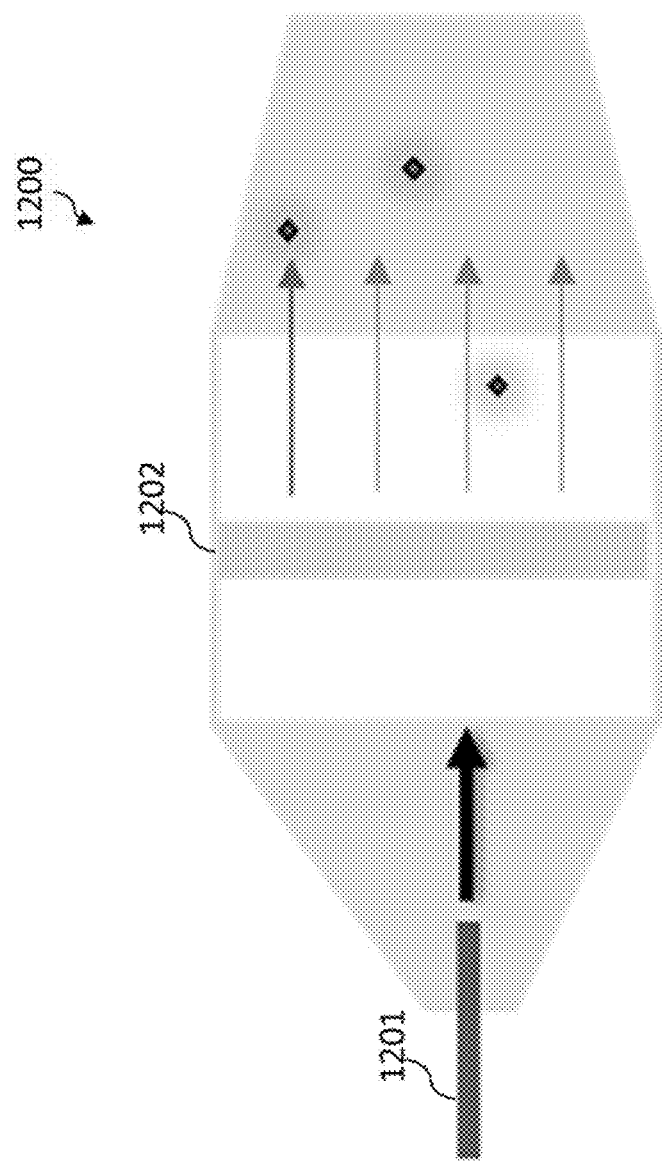
FIG. 12 is a schematic of a dust guide for Minimum Efficiency Reporting Value (MERV) 8 filtration.

FIG. 12 shows dust guide 1200 for MERV 8 filtration. Dust guide 1200 is a force air cone system in which air containing dust is blown into the cone through conduit 1201. The air is then filtered utilizing a MERV 8 filter 1202, will offer filtration for mold spores, pollen, pet dander, and dust mite debris. By this system, particles can be trapped in filter 1202.

Dust from an outdoor source was trapped on filter 1202 using dust guide 1200. Filter 1202 was then cut into a square and loaded reverse into box system 1100. Clean air (lab quality) was then used to blew the particles trapped in the MERV filter (referred to as MERV 8 dust) onto LIG filter 1105.

Figure 13:
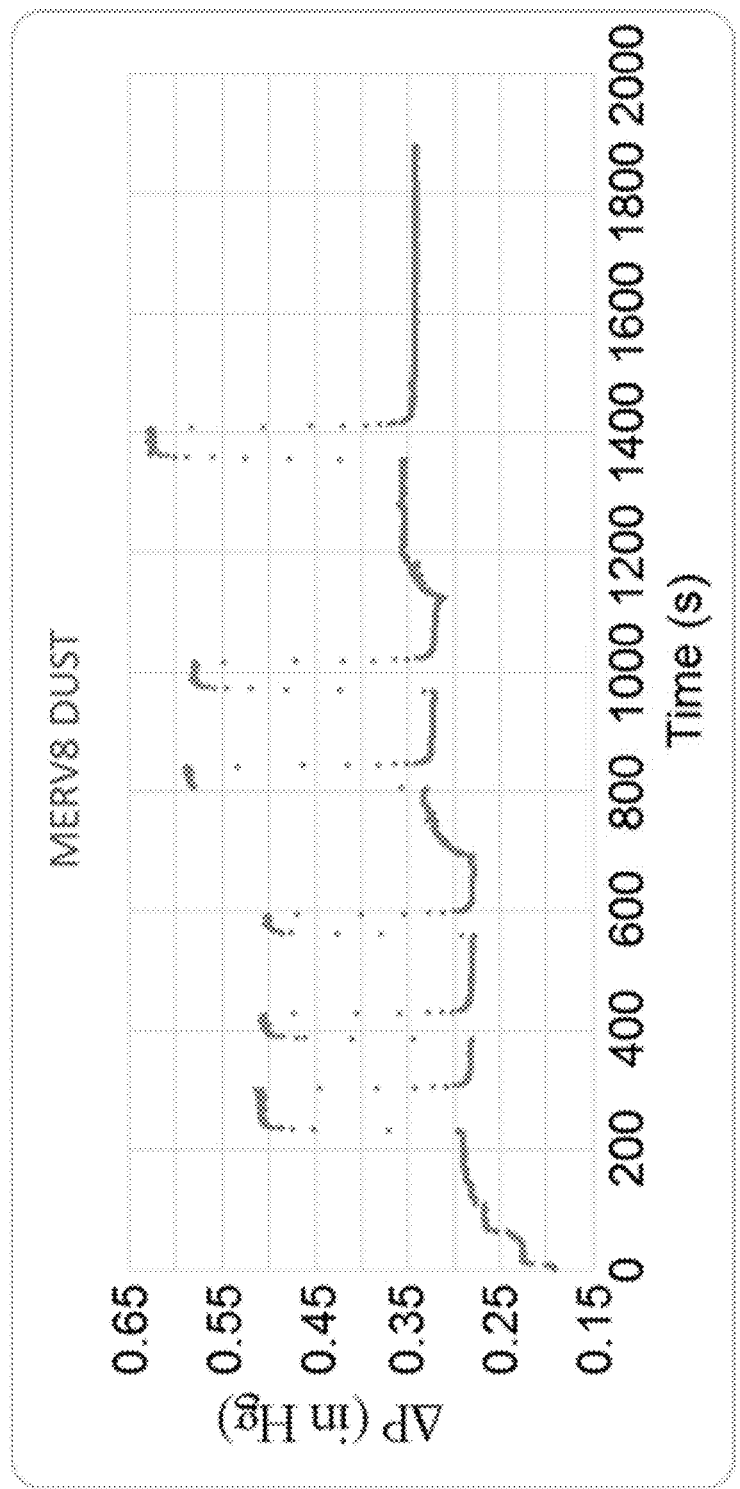
FIG. 13 is a graph showing agitation, annealing, and recovery of a LIG filter with MERV8 dust.
Figure 14C:
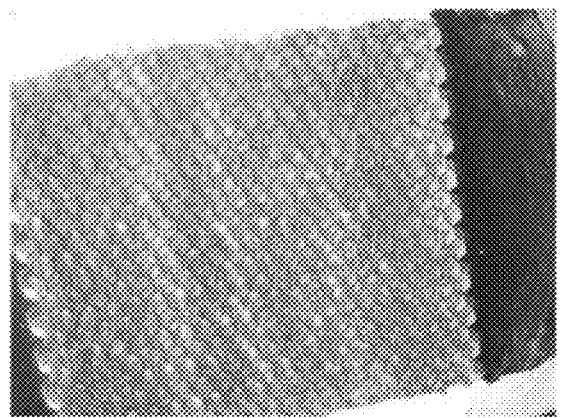
FIGS. 14A-14C are, respectively, photographs of the LIG filter utilized in the process shown in FIG. 13 (a) before accumulation of MERV 8 dust, (b) after a first round of saturation of MERV 8 dust, and (c) after first round of Joule heating.
Figure 14B:
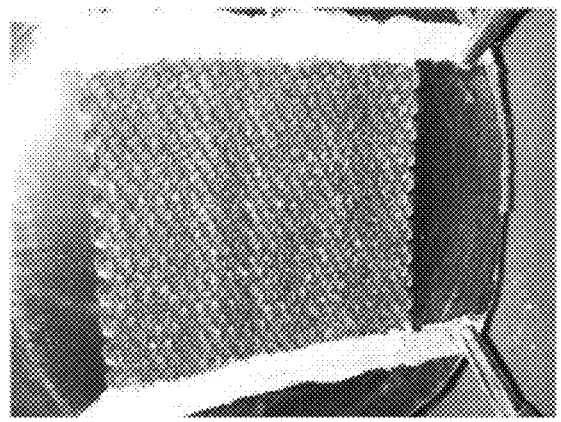
Figure 14A:
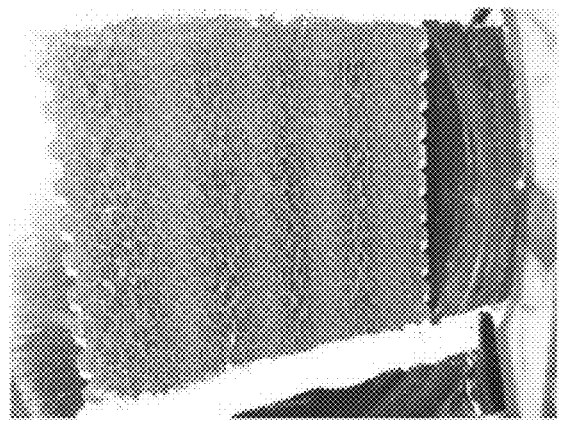

FIG. 13 shows the agitation, annealing, and recovery of LIG filter 1105 with MERV8 dust over a series of cycles. FIGS. 14A-14C show LIG filter 1105 before accumulation of MERV 8 dust, after a first round of saturation of MERV 8 dust, and after first round of Joule heating. FIG. 13 shows a significant increase in air pressure after agitation of the medium with a significant recovery although not back to initial levels. The recovery is prevented from reaching original levels as airborne materials that are not combustible remain clogged in the filter.

Bee Pollen

Joule heating is effective at reducing clogging from organic materials, such as bee pollen. The chemical composition of one of the most known apitherapeutics, bee pollen, depends strongly on the plant source and geographic origin, together with other factors such as climatic conditions, soil type, and bees race and activities. In the composition of the bee pollen, there are about 250 substances including amino acids, lipids (triglycerides, phospholipids), vitamins, macro- and micronutrients, and flavonoids.

Figure 15:
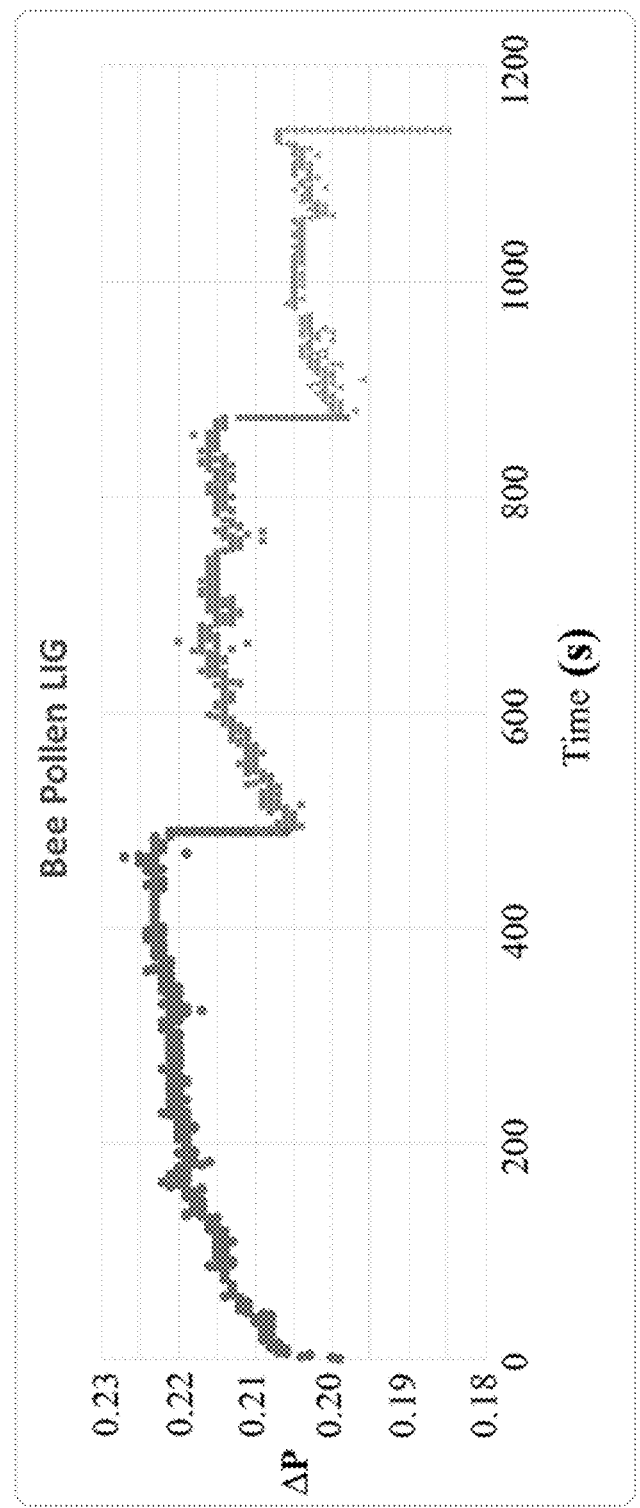
FIG. 15 is a graph showing agitation, annealing, and recovery of a LIG filter with bee pollen.
Figure 16B:
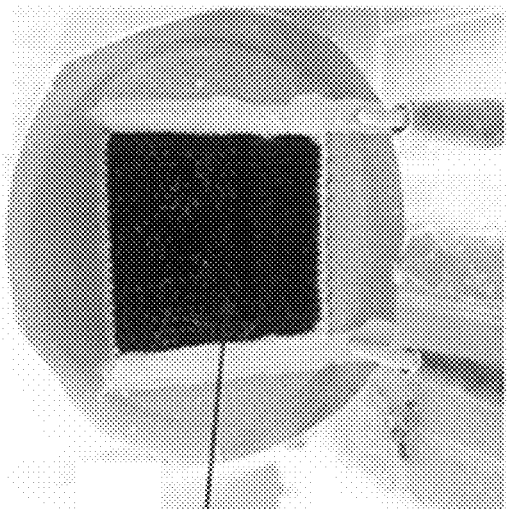
FIGS. 16A-16B are photographs showing, respectively, a LIG filter clogged before and unclogged after Joule heating at 300° C. that were taken after the first round of Joule heating of in the process shown in FIG. 15.
Figure 16A:
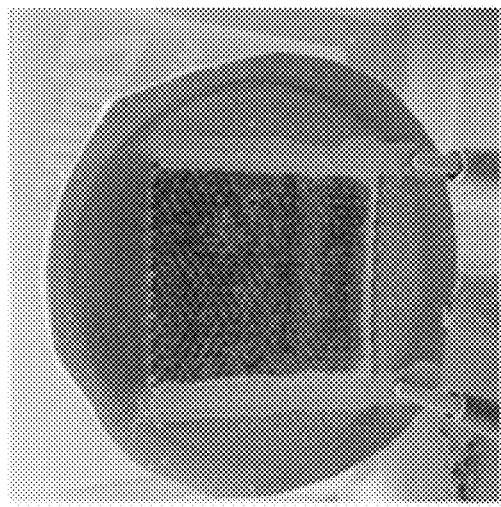
Figure 16D:
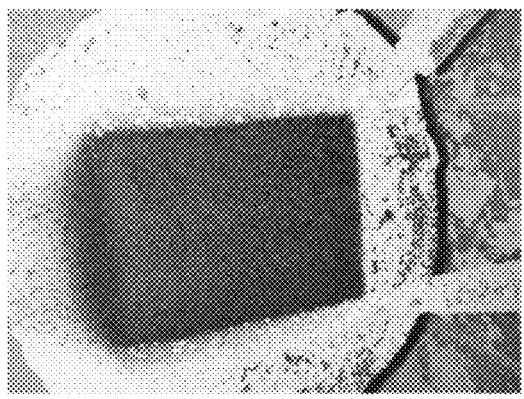
FIGS. 16C-16F are, respectively, photographs of the LIG filter utilized in the process shown in FIG. 15 (c) after the first round of Joule heating, (d) after the second round of Joule heating, (e) after four rounds of agitation, and (f) after agitating a fourth time.
Figure 16F:
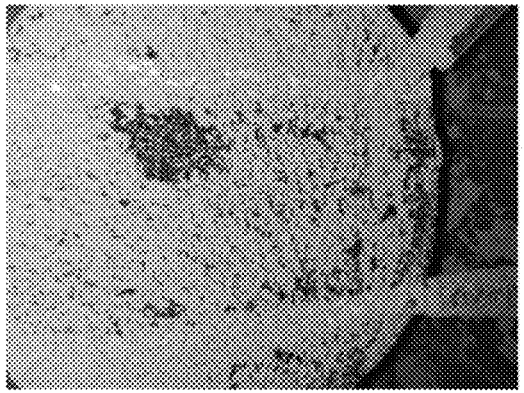
Figure 16C:
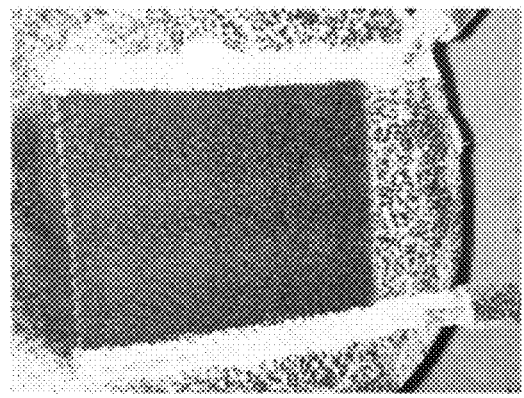
Figure 16E:
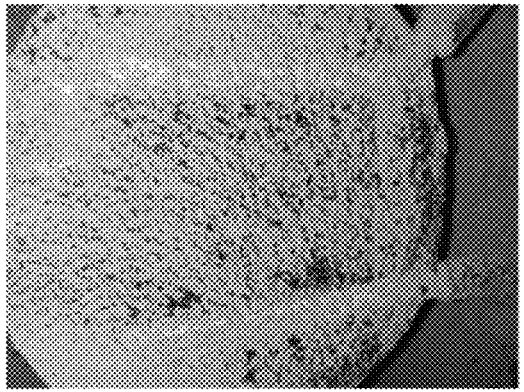

FIG. 15 shows agitation, annealing, and recovery of a LIG filter material that is rapidly aged with bee pollen. (Agitation involved two 12 volt fans circulating the air in an enclosed box with the media piled inside. In the case of bee pollen, it was required to bang the box against a surface or shake the box to enable the fans to blow the bee pollen around. The density of bee pollen was (~0.68 g/cm$^3$)). FIGS. 16A-16B show, respectively, a filter clogged before and unclogged after Joule heating at 300° C. that were taken after the first round of Joule heating. FIGS. 16C-16F show, respectively, the LIG filter after the first round of Joule heating, after the second round of Joule heating (with the foam sheet of bee pollen is visible and forming), after four rounds of agitation, and after agitating a fourth time (with bee pollen seen falling off the filter).

Filter clogging causes an increase in pressure drop across filter and higher energy consumption. Joule heating incinerates trapped particulates and reduces pressure drop to "regenerate" filter (i.e., unclog the filter). Such regenerating of the filter can lead to energy saving over the life-cycle of the filter.

After three rounds of over saturation/agitation/annealing, recovery was clear but damage eventually developed as the graphene seemed to mildly adhere to the annealed bee pollen which started to thermal sheet and peel away from the filter causing damage to the filter and showing more recovery than initial pressure values.

House Dust

Dust collected from a bag from a standard vacuum cleaner was also filtered utilizing a LIG filter. This dust (referred to as "house dust") was agitated directly into the LIG filter by hand squeezing the dust through a hole in the bag to allow the dust particles out.

Figure 17:
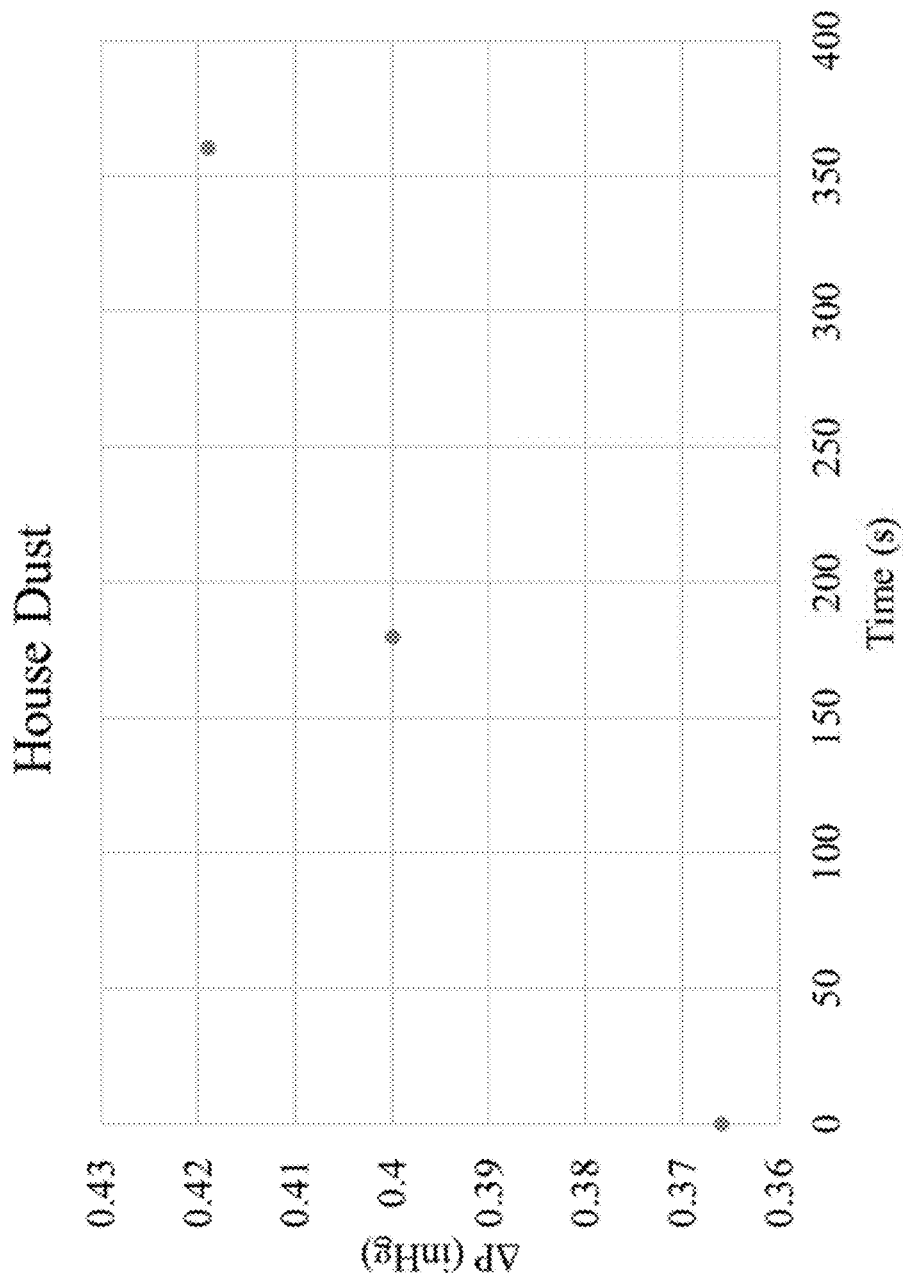
FIG. 17 is a graph showing agitation, annealing, and recovery of a LIG filter with dust collected in a vacuum bag.
Figure 18C:
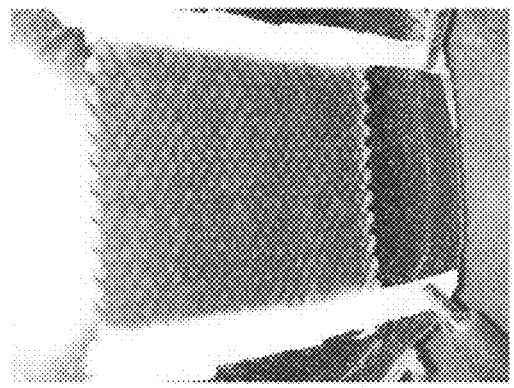
FIGS. 18A-18C are, respectively, photographs of the LIG filter utilized in the process shown in FIG. 17 (a) before agitation second round, (b) after agitation, and (c) after Joule heating.
Figure 18B:
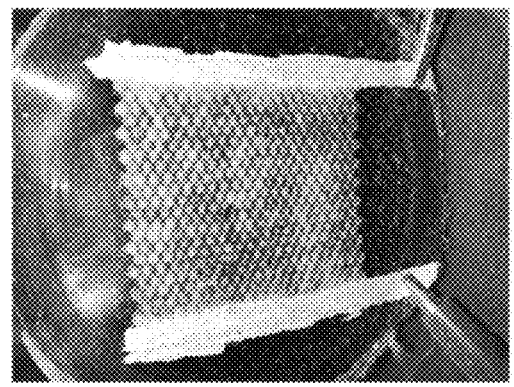
Figure 18A:
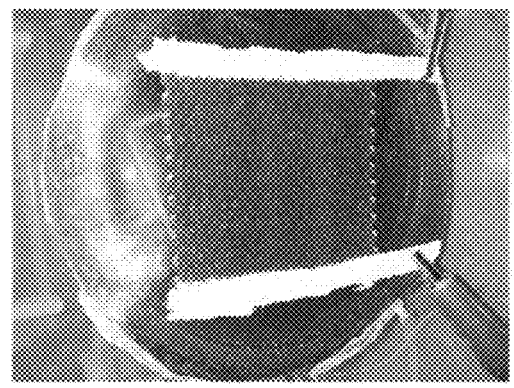

FIG. 17 shows agitation, annealing, and recovery of a LIG filter with house dust. No recovery was found after annealing the house dust particles from the vacuum bag. The material picked up by the vacuum was high in glass or silica, which does not anneal at the range of temperature used by Joule heating ~350° C. FIGS. 18A-18C are, respectively, photographs of the LIG filter utilized in the process shown in FIG. 17 (a) before agitation second round, (b) after agitation, and (c) after Joule heating.

Bacteria Capture and Culturing Results

Figure 19A:
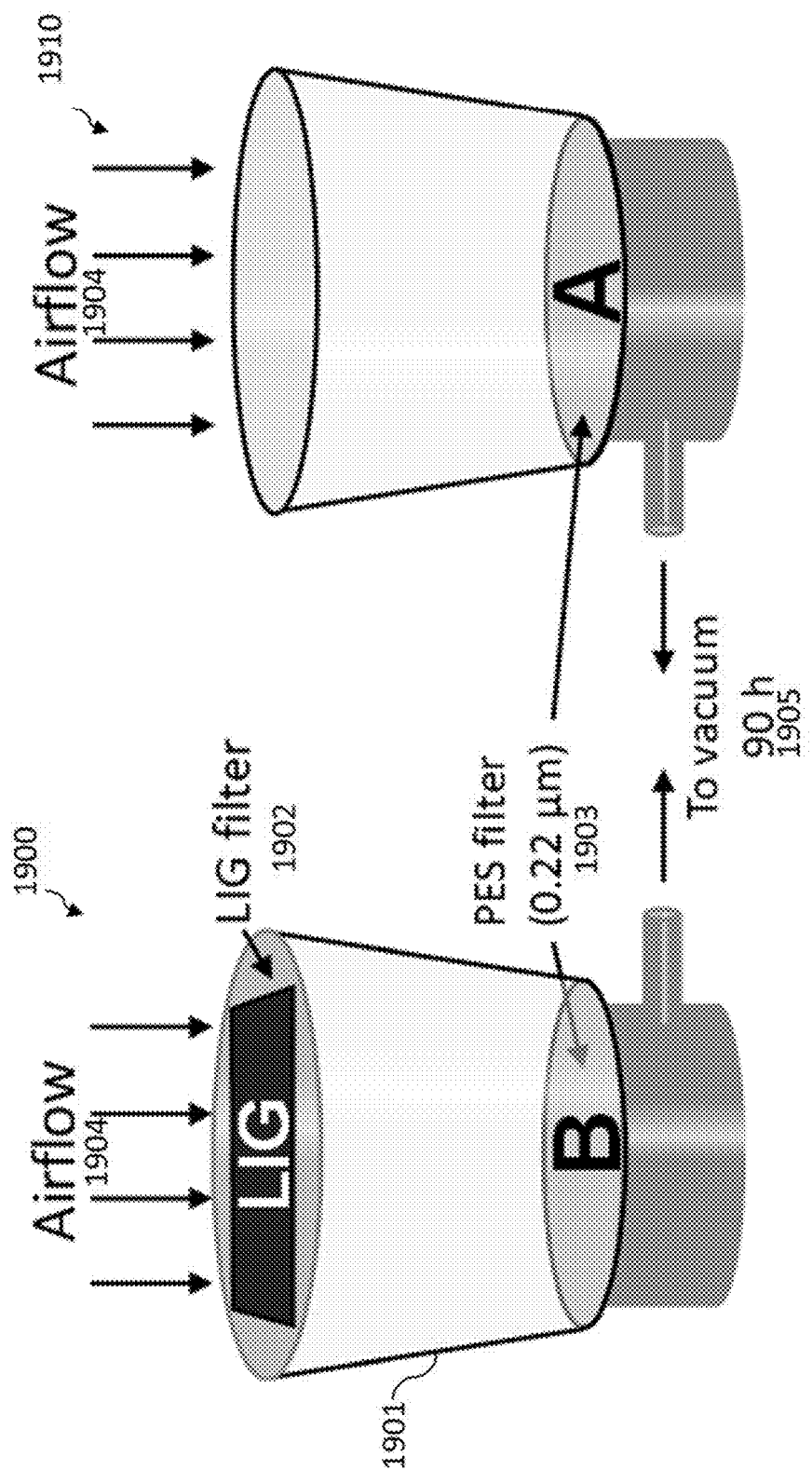
FIGS. 19A-19D are schematic and results of air filtration followed by culturing.

FIG. 19A shows the experimental setup for determining the efficacy for the LIG filter at capturing and killing airborne bacteria. The vacuum filtration system 1900 included an LIG filter 1902 through which an airflow 1904 can flow into a chamber 1901 and out through a filter 1903 (such as a PES filter 0.22 μm) to vacuum 1905. A control filtration system 1910 is also shown in FIG. 19A, which has a similar setup, except that it does not include the LIG filter 1902.

The LIG filter 1902 was mounted on a commercial vacuum filtration system and subjected to airflow 1904 at a rate of 10 L/min for 90 h. Time-dependent incubation of the airborne bacteria captured by the filters revealed that the bacteria underwent the lag, exponential, and stationary phases within 24 h of incubation time. Therefore, incubation after 24 h was used to determine if the filters were exposed to or captured bacteria.

Air was pulled through the LIG filter at equal flow rate and duration as the control filtration funnel. The control 0.22 μm PES filtration membrane (in is labeled PES A in control filtration system 1910). The PES membrane that is labeled PES B (vacuum filtration system 1900) is in series with the LIG filter, and subsequent culturing of PES B indicates whether bacteria passed through the LIG filter during operation.

Figure 19B:
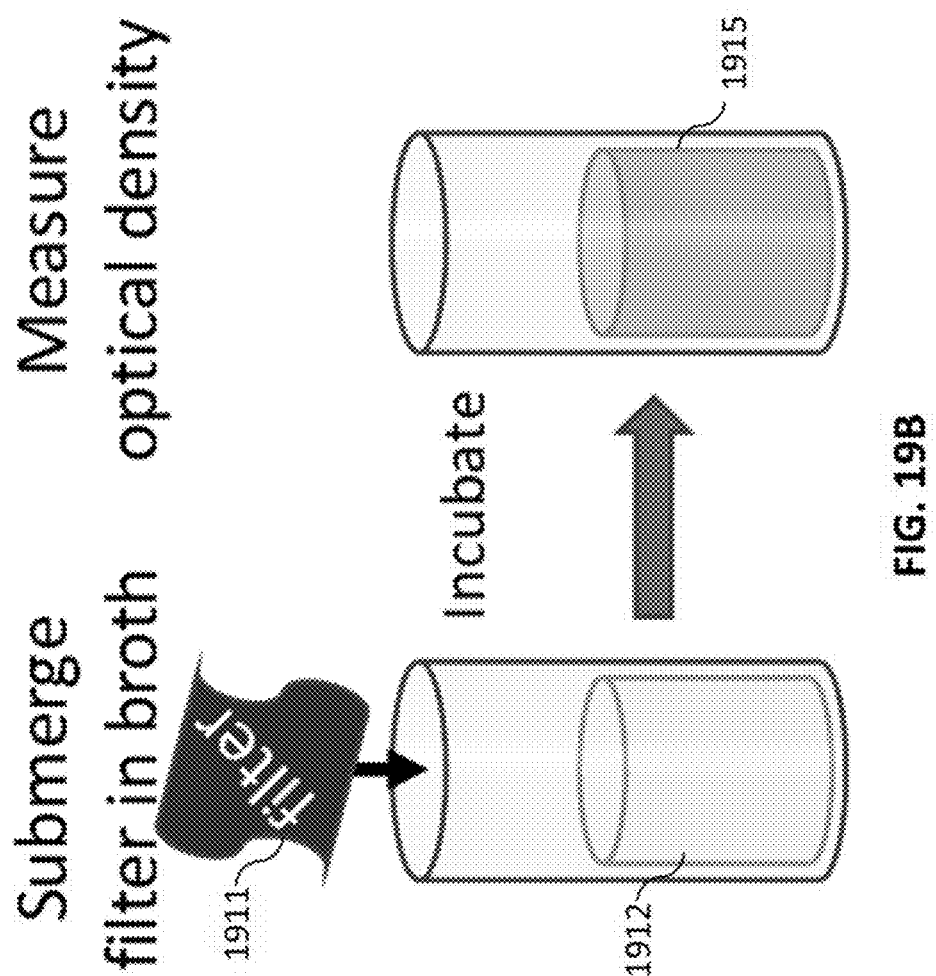

FIG. 19B is a schematic of the culturing procedure. The relevant filter 1911 was submerged in culture broth medium 1912, and, after incubation, optical density of resulting culture 1915 over time measurements were used to detect proliferation of bacteria.

Figure 19C:
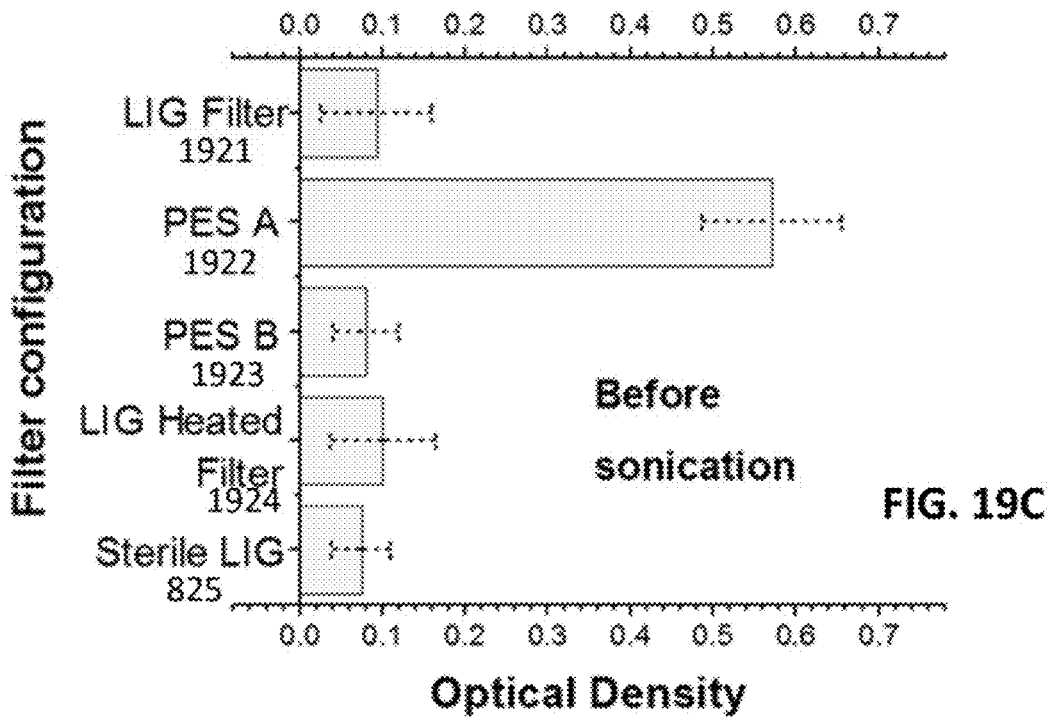

FIG. 19C is a bar graph of optical densities of the culture medium that the 90-h airflow filters were incubated in for 24 h. (The LIG filter, PES A, PES B, LIG heated filter, and sterile LIG are shown in bars 1921-1925, respectively). It was observed that none of the samples exhibited bacterial growth, with the exception of the PES control filter (PES A) that was subject to an equivalent flow rate and duration, indicating that there were bacteria present in the air.

Figure 19D:
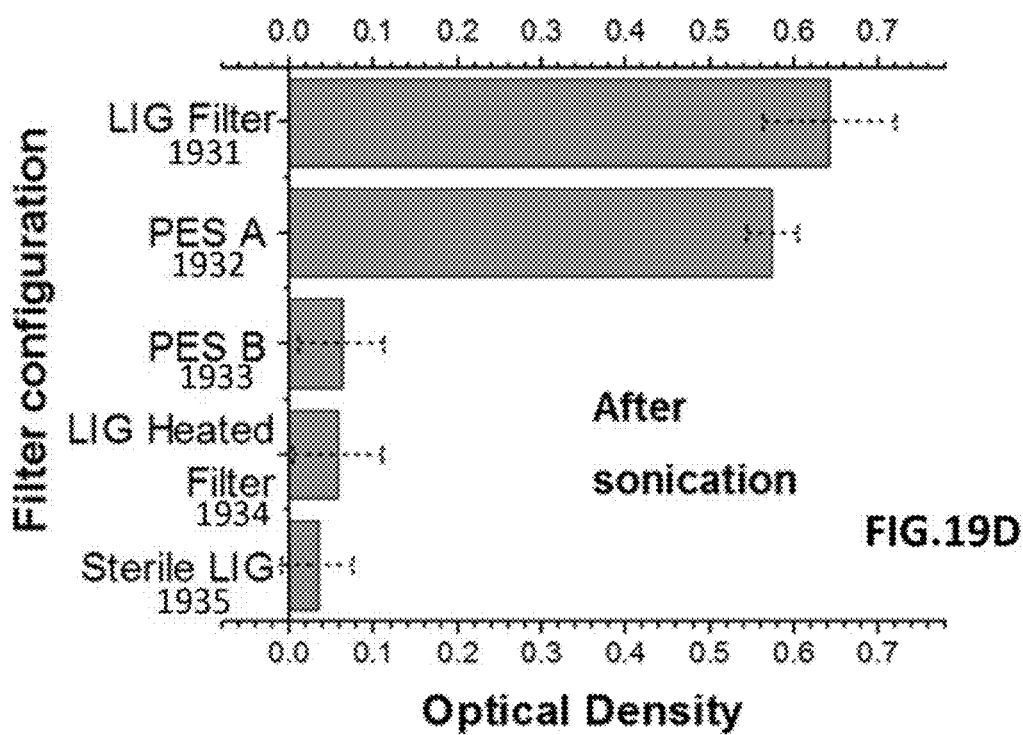

The experiment was repeated, but the filters are mildly sonicated for 2 min in the culture medium prior to 24 h of incubation. As shown in FIG. 19D (with the LIG filter, PES A, PES B, LIG heated filter, and sterile LIG are shown in bars 1931-1935, respectively), bacterial growth was then observed in both the PES A filter and the non-Joule-heated LIG filter. Thus, the bacteria that are captured by the LIG filter are inhibited from proliferating due to the antimicrobial encapsulating surface properties of LIG, even when the filter is immersed in culture medium. [Luong 2019; Singh 2017].

The lack of bacterial growth in the culture medium incubated with the PES test filter sample (PES B) that was in series with the LIG filter indicated that the LIG filter successfully prevented bacteria from reaching PES B and PES B remained sterile. No bacterial growth was observed on the sonicated Joule-heated LIG filter sample, indicating that Joule-heating at 300° C. successfully killed the bacteria.

It was also observed that between the four 24-h trials, the optical density of the culture medium containing the PES A filter was approximately the same, indicating that the gentle sonication did not kill the bacteria. In a subsequent trial, additional incubation of filters for greater than 130 h after the exponential phase was observed for PES A and the non-Joule-heated LIG filter reveals no bacteria proliferation from Joule-heated LIG or PES B, indicating that these filters are sterile within the limits of the experiment.

Polysaccharide Carbonization Demonstration

Bacterial endotoxins are typically lipopolysaccharides (LPS) that serve as structural components in outer leaflets of the outer membranes of gram-negative bacteria. They are emitted during bacteria death and are comprised of long chain glycan polymers, also known as O antigens, that are attached to a core oligosaccharide, which in turn is bonded to lipid A. [Rietschel 1994]. The main physiological immune responses to endotoxins, such as high fevers and septic shock, can be attributed to the lipid A moiety of LPS. Generally, endotoxins require extended heating above 250° C. to decompose. However, above 300° C., the rate of $\log_{10}$ decomposition is accelerated to the second timescale. [Tsuji 11978; Tsuji 111978].

Since the thermal stability of starch is comparable to the stability of the saccharide moieties of LPS, [Aggarwal 1998; Liu 2009], the carbonization of starch by Joule-heating of LIG is demonstrated to determine if the surface exceeds temperatures required to decompose LPS. When 1.10 W·cm$^2$ was supplied to the filter, the surface temperature reached 300° C. in <5 s, and the starch that is spread onto the surface of the filter rapidly decomposed in <1 min. Since the internal temperatures of heating elements are generally higher than surface temperatures, this indicated that the surface was sufficiently hot to carbonize polysaccharides. The previously demonstrated maximum stable extended period heating temperature of 380° C. was sufficient to degrade nearly all biological molecules in seconds, including prions, mycotoxins, endotoxins, exotoxins, teichoic acids, and nucleic acids, among others.

Capture and Destruction of Viruses

Figure 20:
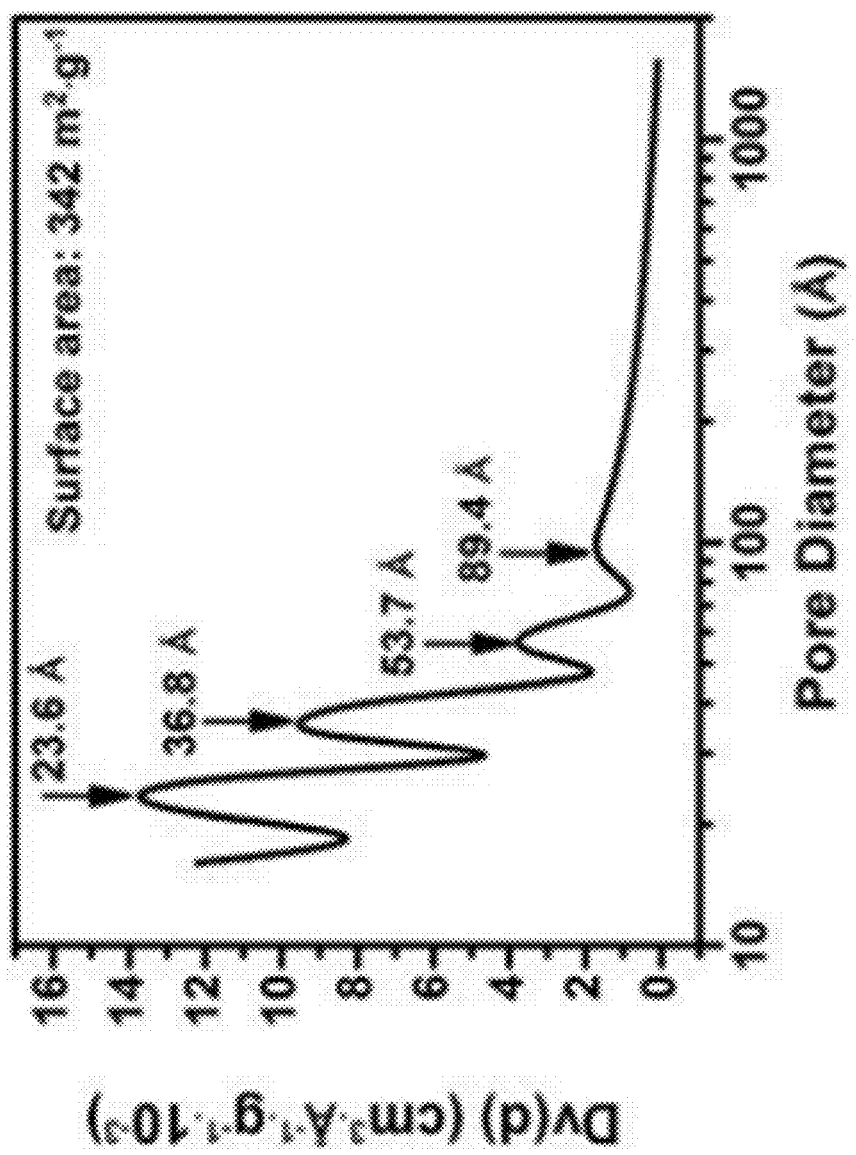
FIG. 20 is a graph showing BET surface area of a LIG filter material.

FIG. 20 shows the BET surface area of LIG-3.6 W. This shows that the LIG had a large surface area of ~342 m$^2$/g and an abundance of high tortuosity nanopores (pore sizes were distributed at 2.36 nm, 3.68 nm, 5.37 nm, and 8.94 nm). Thus, LIG is especially suitable for diffusion and adsorption capture of virions, along with aerosols resulting from coughing and sneezing that may contain virions or other pathogens. The subsequent Joule heating reaches temperatures well-sufficient for the destruction of components that comprise viruses, such as nucleic acids, proteins, lipids, and carbohydrates. Therefore, the same filter may also be used in face masks, personal protective equipment, and HVAC systems to prevent the spread of airborne infectious diseases.

Other materials are likewise suitable substrates for generation of LIG for filtration applications, including polyimide, PEEK, PES, paper, and cloth, in the form of films, membranes, sheets, foams, fibers, fabrics, and textiles.

LIG Filtration System

Figure 21A:
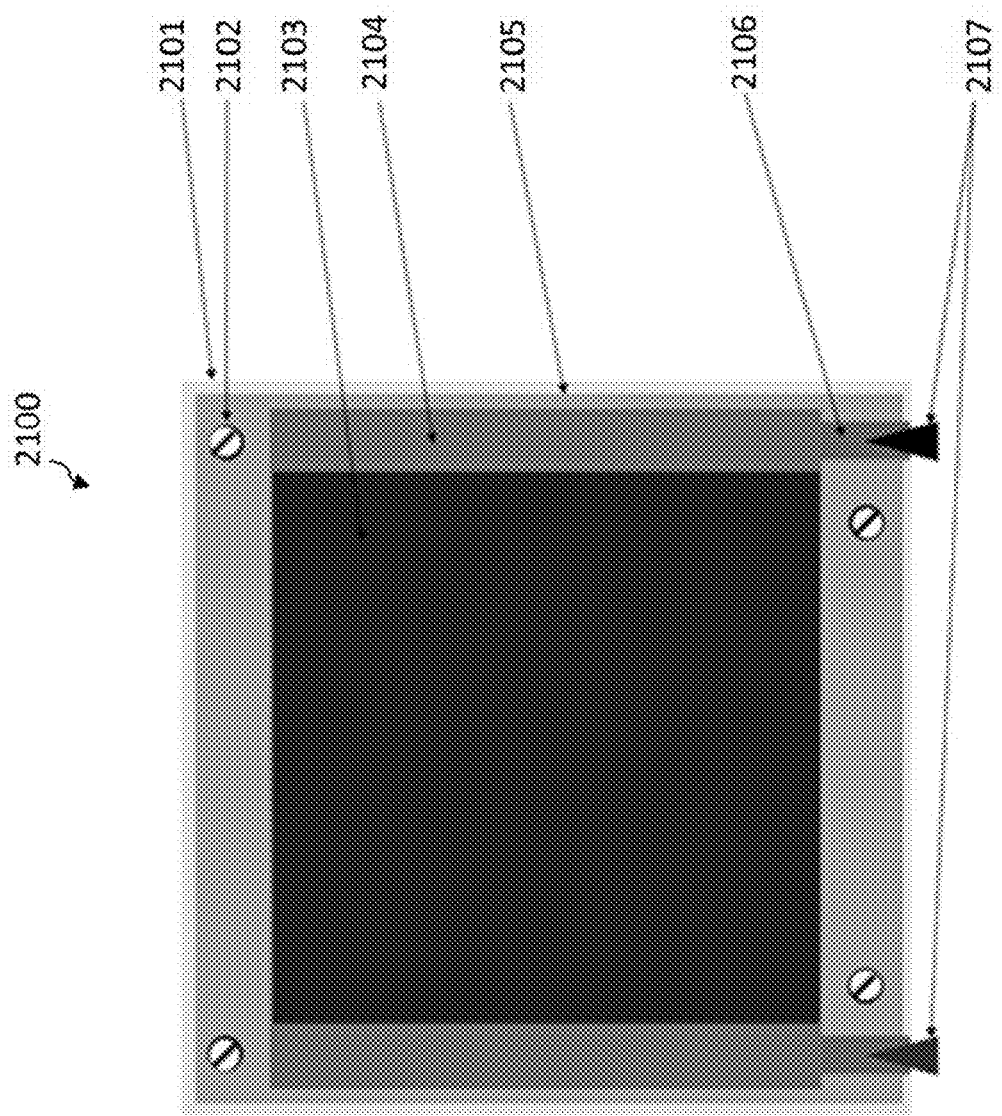
FIGS. 21A-21B are illustrations a top down view and side view, respectively, of a LIG filter for a filtration system.
Figure 21B:
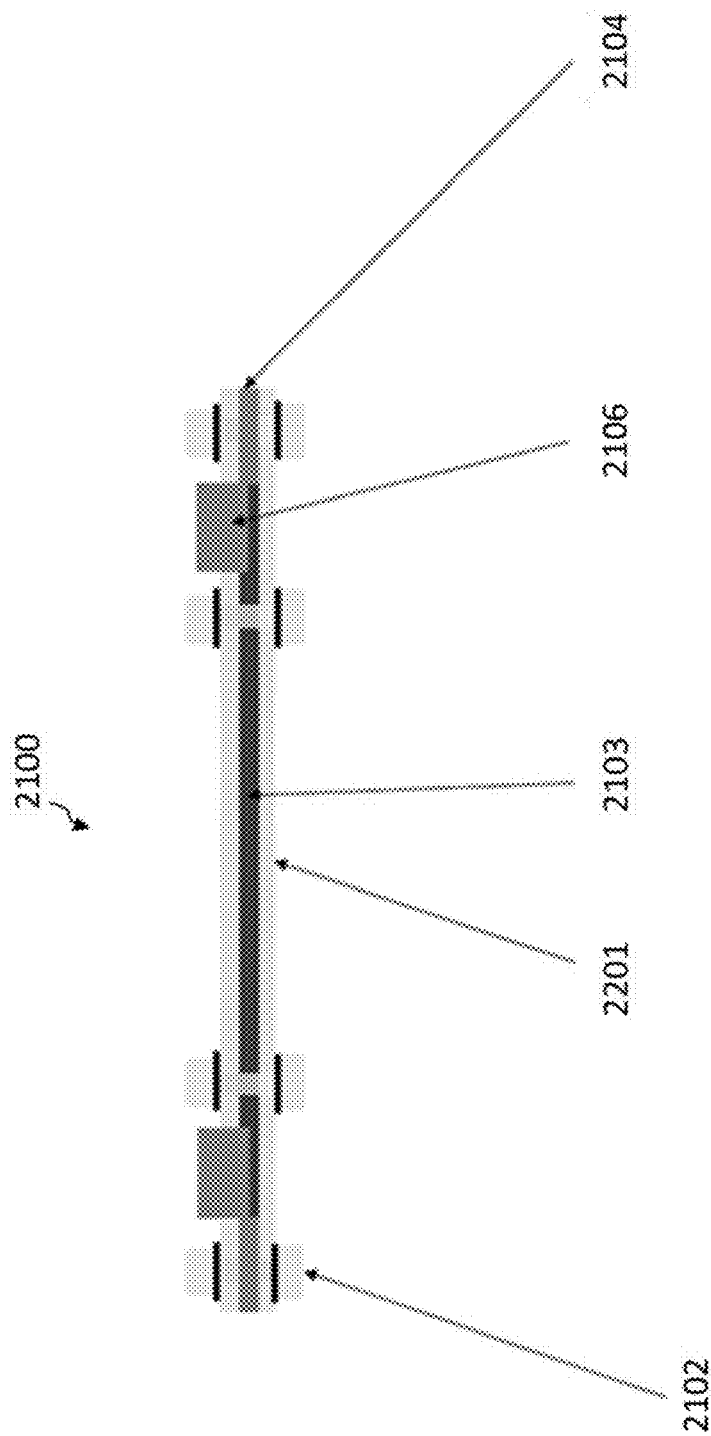
Figure 22A:
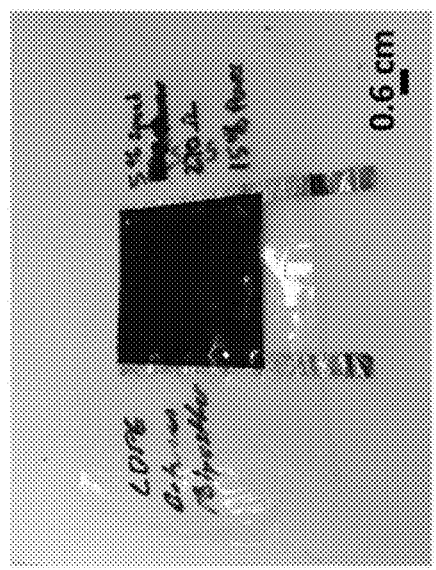
FIGS. 22A-22F are photographs of various LIG composites utilized to measure resistance (at 5% speed and 15% power).
Figure 22B:
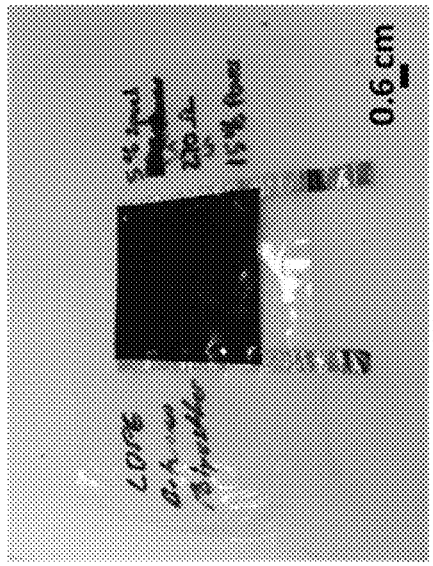
Figure 22C:
Figure 22D:
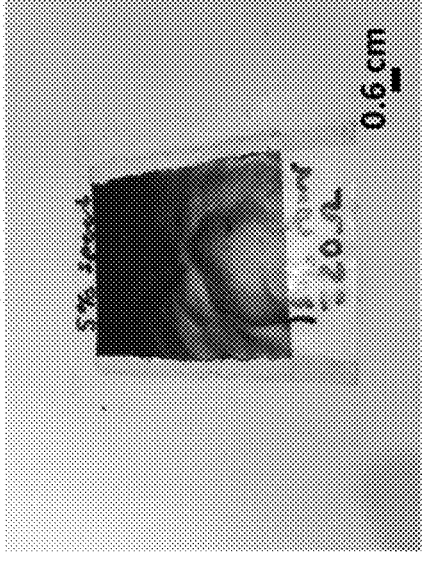
Figure 22F:
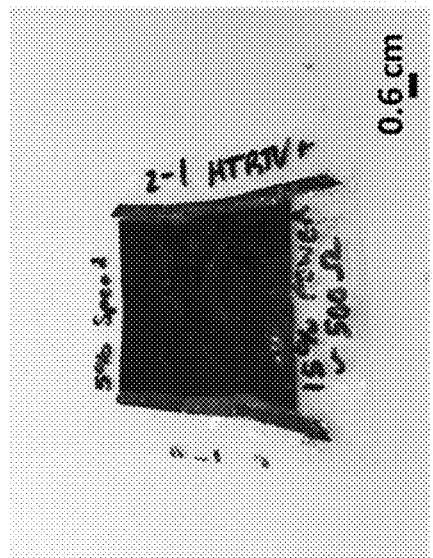
Figure 22E:
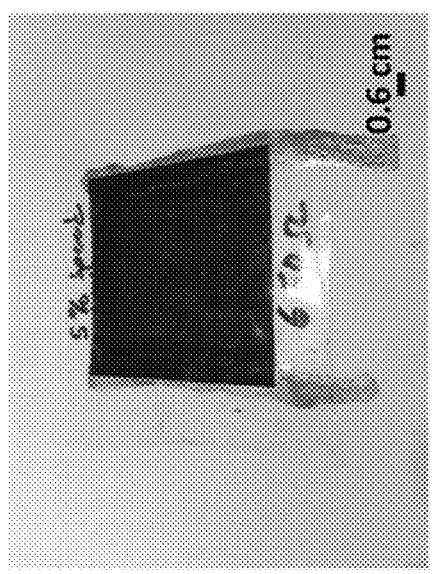

The frame shown in FIG. 21A-21B is a demonstration for LIG air filtration. FIGS. 21A-21B illustrate a top down view and side view, respectively, of an example of an LIG filter frame apparatus 2100 for a filtration system. FIG. 21A showing the placement of the glass frame 2101, nylon bolt and nut 2102 (with air tight gasket for nylon bolt and nut), LIG 2103, copper tape 2104 (under the glass), polyimide excess 2105, exposed copper tape 2106, and alligator clips 2107 (or other connectors for electrical contact). FIG. 21B shows an exposed electrode side view demonstrating the location for mating electrical contacts with exposed electrodes.

In LIG filter 2100, the filter traps and then anneals particulates trapped in the filter. For the graphene to anneal trapped particulates, the LIG needs electrodes. Using electrodes trapped between LIG filters and high temperature resistant insulator frames allows for a rigid body support of electrode to graphene. The nature of the graphene formed by LIG is fibrous and sensitive to touch. Using a flat electrode pressed against the graphene between the frame and LIG such as copper helps keep contact where other methods may dry out and crack or may be too thick causing separation during vibration from being inside an HVAC system. This method of electrode application is one method for annealing.

The LIG 2103 is lased to both sides of the chosen material with a desired pattern. The LIG 2103 is placed between two frames 2101 of chosen material with copper electrodes embedded to allow periodic annealing. The LIG 2103 is exposed to the elements in the center with the frames compressing the copper to the graphene. The nylon screws 2102 provide compression of the frames 2101 that assist in achieving an airtight seal and compression of the electrodes to the graphene. The frame 2101 has the ability to be used as a full glass face for a rigid variety of the LIG 2103 that is laminated with electrodes between low density polyethylene. This also demonstrates a rigid air filter that is designed for placement in air filtration vents. This is scalable so long as the glass can withstand the stress induced by assembly.

The various electrodes presented all have different resistance readings and achieve a similar benefit as the copper tape. These materials are applicable options given optimization and testing with a manufactured filter to fit desired performance.

Further electrode information pertaining to their application to LIF filters is found in the Tour '933 PCT Application, which is incorporated by reference herein.

Measured Resistance

FIGS. 22A-22F are photographs of various LIG composites utilized to measure resistance (at 5% speed and 15% power), which was started at 210 ohms prior to 1000 bend test). FIGS. 22A-22F are for the follow material with measure resistance: (a) copper—270Ω, (b) copper—268Ω, c) aluminum—650Ω, (d) silver Paint—320Ω, (e) hammered tin-lead solder—650Ω, and (f) 2-1 extra fine Graphite—High Temperature RTV—500Ω.

Uses

The LIG filter of the present invention is capable of capturing contaminants and microorganisms, and self-cleaning by Joule-heating. The filter is suitable, and can be used for hospitals for reduction of nosocomial infections transmitted through airborne, droplet, aerosol, and particulate-matter-transported modes. The LIG filter overcomes challenges of traditional HVAC filters and disinfection methods, in that self-sterilization by Joule-heating can prevent proliferation of microorganism on the filter and subsequent downstream contamination.

The LIG filter can capture bacteria and prevent proliferation even when submerged in culture medium. Through a periodic Joule-heating mechanism, the filter eliminates particles on the surface of the filter, destroys bacteria that are captured, and exceeds temperatures that thermally decompose compounds that sustain life, along with molecules that can cause adverse biological reactions and diseases such as pyrogens, pollutants, allergens, exotoxins, teichoic acids, endotoxins, mycotoxins, nucleic acids, and prions.

Such materials can be used in healthcare settings (such as hospitals), as infections caused by bacteria and endotoxins in hospitals affect around 5% of all patients hospitalized. It is believed that around 20% of hospital-acquired infections (HAIs) are airborne. [Kowalski 2016]. Much of the bacteria is transported from room-to-room through airducts. Traditional HEPA filters in air ducts require scrubbing or replacement once the filter is saturated. The LIG-based air filter of the present invention can be periodically Joule heated to incinerate trapped bacteria and endotoxins. This will destroy the trapped particulates thus reducing the transport of infectious species via air ducts.

Beyond use in healthcare settings, the LIG filter can be used in other applications in which it is desirable to incinerate airborne microorganisms for protection against airborne microbial biological warfare or terror agents. LIG filters are also suitable for reducing the risk of pathogen transmission in transportation systems, such as commercial aircraft, trains, and buses, in order to prevent long-distance spread and transfer of diseases carried and introduced by the high flux of passengers from various origins. Likewise, the filter may also be used to protect animals, plants, fungi, and other organisms from diseases in agricultural, veterinarian, zoological, and research settings. In the same manner, the filters can protect biological labs from contamination.

LIG air filters can be used to trap viruses, viruses in aerosolized droplets, and easily inactivate the viruses since their temperatures of deactivation are usually 3 s at 150° C. This includes Coronaviruses.

The geometry of the LIG air filter can be varied to provide the most efficient particulate capture for a given application. Additionally, tuning lasing parameters during the synthesis of LIG can alter the pore size distribution.

In some embodiment, there may be no need to use a dual sided LIG film. In this alternative embodiment, spaces can be cut into the PI film for air to pass through. But a mesh of LIG covering one or both sides and if the mesh is sufficiently thick, the microbial and virus capture can remain high.

Furthermore, other materials can be used upon which to make the LIG such as paper, wood, polysulfone, and a wide variety of chain growth, step growth, and living polymer systems, including condensation and vinyl polymers. Further, for example, the other materials can be selected from a group consisting of homopolymers, vinyl polymers, step-growth polymers, condensation polymers, polymers made through living polymer reactions, chain-growth polymers, block co-polymers, carbonized polymers, aromatic polymers, cyclic polymers, polyimide (PI), polyetherimide (PEI), polyether ether ketone (PEEK), polysulfones, elastomers, rubbers, recycle plastics, poly(ethylene terephthalate), polytetrafluoroethylene, polyethylene, polypropylene, low density polyethylene (LPE), linear low density polyethylene (LLDPE), high density polyethylene (HDPE), polybutadiene, poly(styrene butadiene), polystyrene, polycarbonates, polyamides, polyimides, polyurethanes, thermoplastics, thermosets, and combinations thereof.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or subranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described. The symbol "~" is the same as "approximately".

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1 of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

REFERENCES

Aggarwal, P., et al., "The effect of chemical modification on starch studied using thermal analysis," *Thermochimica Acta* 1998, 324, 1-8, doi:https://doi.org/10.1016/50040-6031(98)00517-6 ("Aggarwal 1998").

American Society of Mechanical Engineers, ASME AG-1a-2004, "Addenda to ASME AG-1-2003 Code on Nuclear Air and Gas Treatment, 2004 ("ASME 2004").

Augustowska, M. et al., "J. Variability Of Airborne Microflora In A Hospital Ward Within A Period Of One Year," *Ann. Agric. Environ. Med.* 2006, 13, 99-106 ("Augustowska 2006").

Beggs, C. B., "The Airborne Transmission of Infection in Hospital Buildings: Fact or Fiction?" *Indoor Built Environ.* 2003, 12, 9-13, doi:10.1177/1420326x03012001002 ("Beggs 2003").

Bolashikov, Z. D., et al., "Methods for air cleaning and protection of building occupants from airborne pathogens," *Build. Environ.*, 2009, 44, 1378-1385, doi:https://doi.org/10.1016/j.buildenv.2008.09.001 ("Bolashikov 2009").

Bonnevie Perrier, J.-C., et al., "Microbial Growth onto Filter Media Used in Air Treatment Devices" *Int. J. Chem. React. Eng.*, 2008, 6, doi:10.2202/1542-6580.1675 (2008) ("Bonnevie Perrier 2008").

Brigham et al., K. L., "Endotoxin and lung injury," *Am. Rev. Respir. Dis.* 1986, 133, 913-927 ("Brigham 1986").

Brown, R. C., *Air filtration: an integrated approach to the theory and applications of fibrous filters*, Pergamon Press, Oxford; New York 1993 ("Brown 1993").

Carvalho, A. F., et al., "Laser-Induced Graphene Strain Sensors Produced by Ultraviolet Irradiation of Polyimide," *Adv. Funct. Mater.* 2018, 28, 1805271, doi:10.1002/adfm.201805271 ("Carvalho 2018").

2017 National and State Healthcare-Associated Infections Progress Report, CDC National Center for Emerging and Zoonotic Infectious Diseases and Division of Healthcare Quality Promotion 2017 ("CDC 2017").

Chyan, Y., et al., "Laser-Induced Graphene by Multiple Lasing: Toward Electronics on Cloth, Paper, and Food," *ACS Nano* 2018, 12, 2176-2183, doi:10.1021/acsnano.7b08539 ("Chyan 2018").

da Roza, R. A., "Particle size for greatest penetration of HEPA filters—and their true efficiency," Report No. UCRL-53311; Other: ON: DE83008439 United States 10.2172/6241348 Other: ON: DE83008439 NTIS, PC A02/MF A01; 1. LLNL English, Medium: ED; Size: Pages: 17 (Lawrence Livermore National Lab., CA (USA)), 1982 ("da Roza 1982").

Danner, R. L., et al., "Endotoxemia in Human Septic Shock," *Chest* 1991, 99, 169-175, doi:https://doi.org/10.1378/chest.99.1.169 ("Danner 1991").

Dimiev, A. M., et al., "Chemical Mass Production of Graphene Nanoplatelets in ~100% Yield" *ACS Nano* 2016, 10, 274-279, doi:10.1021/acsnano.5b06840 ("Dimiev 2016").

Duy, L. X., et al., "Laser-induced graphene fibers," *Carbon* 2018, 126, 472-479, doi:https://doi.org/10.1016/j.carbon.2017.10.036 ("Duy 2018").

Eickhoff, T. C., "Airborne Nosocomial Infection: A Contemporary Perspective," *Infect. Control and Hosp. Epidemiol.* 1994, 15, 663-672, doi:10.2307/30145278 ("Eickhoff 1994").

Hadidane, R. et al., "Correlation between Alimentary Mycotoxin Contamination and Specific Diseases," *Hum. Toxicol.* 1985, 4, 491-501, doi:10.1177/096032718500400505 ("Hadidane 1985").

Hedayati, M. T., et al., "*Aspergillus flavus*: human pathogen, allergen and mycotoxin producer," Microbiology 2007, 153, 1677-1692, doi:doi:10.1099/mic.0.2007/007641-0 ("Hedayati 2007").

Jenneman, G. E., et al. "Effect of Sterilization by Dry Heat or Autoclaving on Bacterial Penetration through Berea Sandstone," *Appl. Environ. Microbiol.* 1986, 51, 39-43 ("Jenneman 1986").

Joe, Y. H., et al., "Methodology for Modeling the Microbial Contamination of Air Filters," PLoS ONE, 2014, 9, e88514, doi:10.1371/journal.pone.0088514 ("Joe 2014").

Kowalski, W. J., Hospital Airborne Infection Control; CRC Press, 2016 ("Kowalski 2016").

Kowalski, W. J., "Hospital airborne infection control," CRC Press, 2012 ("Kowalski 2012").

Kowalski, W. J., et al., "Mathematical Modeling of Ultraviolet Germicidal Irradiation for Air Disinfection," *Quant. Microbiol.* 2000, 2, 249-270, doi:10.1023/a:1013951313398 ("Kowalski 2000").

Kowalski, W. J., et al., "Filtration of airborne microorganisms: Modeling and prediction," American Society of Heating, Refrigerating and Air-Conditioning Engineers, Inc., Atlanta, GA (US); Pennsylvania State Univ., University Park, PA (US), 1999 ("Kowalski 1999").

Li, L., et al., "High-Performance Pseudocapacitive Microsupercapacitors from Laser-Induced Graphene," *Adv. Mater.* 2016, 28, 838-845, doi:10.1002/adma.201503333 ("Li 2016").

Lin, J., et al., "Laser-induced porous graphene films from commercial polymers," *Nat. Commun.* 2014, 5, 5714, doi:10.1038/ncomms6714 ("Lin 2014").

Liu, X., et al., "Thermal Decomposition of Corn Starch with Different Amylose/Amylopectin Ratios in Open and Sealed Systems," *Cereal Chem.* 2009, 86, 383-385, doi:10.1094/cchem-86-4-0383 ("Liu 2009").

Luong, D. X., et al., "Laser-Induced Graphene Composites as Multifunctional Surfaces," *ACS Nano* 2019, 13, 2579-2586, doi:10.1021/acsnano.8b09626 ("Luong 2019").

Luong, D. X., et al., "Laminated Object Manufacturing of 3D-Printed Laser-Induced Graphene Foams," *Adv. Mater.* 2018, 30, 1707416, doi:10.1002/adma.201707416 ("Luong 2018").

Magill, S. S., et al., "Changes in Prevalence of Health Care-Associated Infections in U.S. Hospitals," *N. Engl. J. of Med.* 2018, 379, 1732-1744, doi:10.1056/NEJMoa1801550 ("Magill 2018").

Peng, Z., et al., "Flexible and Stackable Laser-Induced Graphene Supercapacitors," *ACS Appl. Mater. Interfaces* 2015, 7, 3414-3419, doi:10.1021/am509065d ("Peng 2015").

Prusiner, S. B., et al., "Prion Protein Biology," *Cell* 1998, 93, 337-348, doi:10.1016/50092-8674(00)81163-0 ("Prusiner 1998").

Raetz, C. R. H., et al., "Lipopolysaccharide Endotoxins," 2002, 71, 635-700, doi:10.1146/annurev.biochem.71.110601.135414 ("Raetz 2002").

Reed, N. G., "The History of Ultraviolet Germicidal Irradiation for Air Disinfection, *Public Health Rep.,* 2010, 125, 15-27, doi:10.1177/003335491012500105 ("Reed 2010").

Rietschel, E. T., et al., "Bacterial endotoxin: molecular relationships of structure to activity and function," *The FASEB Journal* 1994, 8, 217-225, doi:10.1096/fasebj.8.2.8119492 ("Rietschel 1994").

Rudnik, E., et al., *J. Therm. Anal. Calorim.* 2006, 85, 267 ("Rudnik 2006").

Schlievert, P. M., et al., "Identification and Characterization of an Exotoxin from *Staphylococcus aureus* Associated with Toxic-Shock Syndrome," *J. Infect. Dis.* 1981, 143, 509-516, doi:10.1093/infdis/143.4.509 ("Schlievert 1981").

Sehulster, L M., et al., "Guidelines for Environmental Infection Control in Health-Care Facilities," U.S. Department of Health and Human Services Centers for Disease Control and Prevention; American Society for Healthcare Engineering/American Hospital Association, Chicago IL, 2019 ("Sehulster 2019").

Sehulster, L. M., in *Sterilisation of Biomaterials and Medical Devices*, (eds: S. Lerouge & A. Simmons), Woodhead Publishing, 2012, 261 ("Sehulster 2012").

Singh, S. P., et al., "Laser-Induced Graphene Layers and Electrodes Prevents Microbial Fouling and Exerts Antimicrobial Action," *ACS Appl. Mater. Interfaces* 2017, 9, 18238-18247, doi:10.1021/acsami.7b04863 ("Singh 2017").

Stanford, M. G., et al., "Laser-Induced Graphene for Flexible and Embeddable Gas Sensors," *ACS Nano* 2019, 13, 3474-3482, doi:10.1021/acsnano.8b09622 ("Stanford, I 2019").

Stanford, M. G., et al., "Laser-Induced Graphene Triboelectric Nanogenerators," *ACS Nano* 2019, doi:10.1021/acsnano.9b02596 ("Stanford II 2019").

Sublett, J. L., et al., "Air filters and air cleaners: Rostrum by the American Academy of Allergy, Asthma & Immunology Indoor Allergen Committee," *Journal of Allergy and Clinical Immunology* 2010, 125, 32-38, doi:https://doi.org/10.1016/j.jaci.2009.08.036 ("Sublett 2010").

Sun, B., et al., "Gas-Permeable, Multifunctional On-Skin Electronics Based on Laser-Induced Porous Graphene and Sugar-Templated Elastomer Sponges," *Adv. Mater.* 2018, 30, 1804327, doi:10.1002/adma.201804327 ("Sun 2018").

Tsuji, K., et al., "Dry-heat destruction of lipopolysaccharide: dry-heat destruction kinetics," *Appl. Environ. Microbiol.* 1978, 36, 710714 ("Tsuji 11978").

K. Tsuji, K., et al., "Dry-heat destruction of lipopolysaccharide: mathematical approach to process evaluation," *Appl. Environ. Microbiol.* 1978, 36, 715-719 ("Tsuji 111978").

von Wintersdorff, C. J. H., et al., "Dissemination of Antimicrobial Resistance in Microbial Ecosystems through Horizontal Gene Transfer," *Front. in Microbiol.* 2016, 7 doi:10.3389/fmicb.2016.00173 ("von Wintersdorff 2016")

"WHO infection control guidelines for transmissible spongiform encephalopathies," World Health Organization, Geneva, Switzerland 1999 ("WHO 1999").

Ye, R., et al., "Laser-Induced Graphene: From Discovery to Translation," *Adv. Mater.* 2019, 31, 1803621, doi:10.1002/adma.201803621 ("Ye 2019").

Ye, R., et al., "Laser-Induced Graphene," *Acc. Chem. Res.* 2018, 51, 1609-1620, doi:10.1021/acs.accounts.8b00084 ("Ye 2018").

Ye, R. et al., "Laser-Induced Graphene Formation on Wood," *Advanced Materials* 2017, 29, 1702211, doi:10.1002/adma.201702211 ("Ye 2017").

Yoon, D., et al., "Negative Thermal Expansion Coefficient of Graphene Measured by Raman Spectroscopy," *Nano Lett.* 2011, 11, 3227-3231, doi:10.1021/nl201488g ("Yoon 2011").

Zhang, J., et al., "In Situ Synthesis of Efficient Water Oxidation Catalysts in Laser-Induced Graphene," *ACS Energy Lett.* 2018, 3, 677-683, doi:10.1021/acsenergylett.8b00042 ("Zhang I 2018").

Zhang, J., et al., "Oxidized Laser-Induced Graphene for Efficient Oxygen Electrocatalysis," *Adv. Mater.* 2018, 30, 1707319, doi:10.1002/adma.201707319 ("Zhang II 2018").

What is claimed is:

1. A method of making a filter comprising LIG, wherein the method comprises the steps of:
   (a) exposing a first side of a sheet comprising a LIG precursor material to a first laser source, wherein
      (i) the exposing on the first side results in formation of LIG on the first side of the sheet,
      (ii) the LIG is derived from the LIG precursor material, and
      (iii) some of the LIG precursor material on the first side of the sheet is not exposed to the first laser source such that it remains LIG precursor material on the first side of the sheet; and
   (b) treating the second side of the sheet, wherein
      (i) the second side of the sheet is on the opposite side of the first side of the sheet,
      (ii) the step of treating the second side comprises exposing the second side of the sheet to a second laser source to form LIG on the second side of the sheet,
      (iii) the second laser source is (A) the first laser source or (B) a different laser source than the first laser source,
      (iv) the LIG on the first side of the sheet and the LIG on the second side of the sheet are adjacent and provide a porosity to the sheet such that the sheet is a LIG filter configured to allow a flow of air through the LIG from the first side of the sheet to the LIG on the second side of the sheet,
      (v) the LIG precursor material not formed into LIG by the exposing of the first laser source on the first side is a support of the LIG formed on the first side, and
      (vi) the LIG precursor material not formed into LIG by the exposing of the second laser source on the second side is a support of the LIG formed on the second side.

2. The method of claim 1, wherein the second laser source is the first laser source.

3. The method of claim 1, wherein the second laser source is the different laser source than the first laser source.

4. The method of claim 1, wherein the LIG filter is capable of capturing particles or molecules selected from a group consisting of viruses, airborne microorganisms, byproducts of microorganisms, microorganism-associated toxins, viruses, virus capsids, droplets of virus capsids, and combinations thereof.

5. The method of claim 1, wherein the LIG precursor material is selected from a group consisting of polymers, carbon-based precursors that comprise amorphous carbon, and compounds that are precursors to porous amorphous carbons.

6. The method of claim 1, wherein the LIG precursor material is a polymer.

7. The method of claim 1, wherein the LIG precursor material has a first pattern on the first side during the step of exposing the first side of the sheet comprising the LIG precursor material to the first laser source.

8. The method of claim 1, wherein the LIG filter is capable of generating heat when a voltage is applied across the LIG filter.

9. The method of claim 8, wherein the heat is capable of killing or decomposing captured particles selected from a group consisting of viruses, airborne microorganisms, byproducts of microorganisms, microorganism-associated toxins, viruses, virus capsids, droplets of virus capsids, and combinations thereof.

10. A method of making a filter comprising LIG, wherein the method comprises the steps of:
    (a) exposing a first side of a sheet comprising a LIG precursor material to a first laser source, wherein
       (i) the exposing on the first side results in formation of LIG on the first side of the sheet, and
       (ii) the LIG is derived from the LIG precursor material;
    (b) treating the second side of the sheet, wherein
       (i) the second side of the sheet is on the opposite side of the first side of the sheet,
       (ii) the LIG on the first side of the sheet and the step of treating on the second side provide a porosity to the sheet such that the sheet is configured to allow a flow of air through the LIG from the first side to the second side,
       (iii) at least some of the LIG precursor material on the first side of the sheet is not formed into LIG and is operable to support the LIG formed on the first side, and
       (iv) the LIG filter is capable of capturing particles or molecules selected from a group consisting of viruses, airborne microorganisms, byproducts of microorganisms, microorganism-associated toxins, viruses, virus capsids, droplets of virus capsids, and combinations thereof; and
    (c) decomposing the captured particles via Joule heating.

11. A method of making a filter comprising LIG, wherein the method comprises the steps of:
    (a) exposing a first side of a sheet comprising a LIG precursor material to a first laser source, wherein
       (i) the exposing on the first side results in formation of LIG on the first side of the sheet, and
       (ii) the LIG is derived from the LIG precursor material;
    (b) treating the second side of the sheet, wherein
       (i) the second side of the sheet is on the opposite side of the first side of the sheet,
       ii) the LIG on the first side of the sheet and the step of treating on the second side provide a porosity to the sheet such that the sheet is configured to allow a flow of air through the LIG from the first side to the second side,
       (iii) at least some of the LIG precursor material on the first side of the sheet is not formed into LIG and is operable to support the LIG formed on the first side,
       (iv) the LIG precursor material has a first pattern on the first side during the step of exposing the first side of the sheet comprising the LIG precursor material to the first laser source,
       (v) the step of treating the second side comprises exposing the second side of the sheet to a second laser source to form LIG on the second side of the sheet,
       (vi) the second laser source is the same or a different laser source than the first laser source,
       (vii) the LIG precursor material has a second pattern on the second side during the step of exposing the second side of the sheet to the second laser source,
       (viii) the first pattern is offset from the second pattern.

12. The method of claim 11, wherein the first pattern and the second pattern provide a 3-dimensional lattice for reinforcement and geometrical strengthening.

13. A LIG filter comprising:
(a) LIG, wherein
 (i) the LIG is on a first side of the LIG filter and is on a second side of the LIG filter, wherein the LIG on the first side of the LIG filter is adjacent the LIG on the second side of the LIG filter, and
 (ii) the LIG filter has a porosity such that the LIG filter is configured to allow a flow of air through the LIG on the first side of the LIG filter to the LIG on the second side of the LIG filter; and
(b) a LIG precursor material is on the first side of the LIG filter and is on the second side of the LIG filter, wherein
 (i) the LIG precursor material on the first side of the LIG filter is a support of the LIG on the first side of the LIG filter,
 (ii) the LIG precursor material on the second side of the LIG filter is a support of the LIG on the second side of the LIG filter, and
 (iii) the LIG filter is capable of capturing particles selected from a group consisting of virus particles, airborne microorganisms, byproducts of the microorganisms, microorganism-associated toxins, and combinations thereof.

14. The LIG filter of claim 13, wherein the LIG filter is capable of generating heat when a voltage is applied across the filter.

15. The LIG filter of claim 14, wherein the heat is capable of killing or decomposing captured particles selected from a group consisting of viruses, airborne microorganisms, byproducts of microorganisms, microorganism-associated toxins, viruses, virus capsids, droplets of virus capsids, and combinations thereof.

16. The LIG filter of claim 13, wherein the LIG precursor material is selected from a group consisting of polymers, carbon-based precursors that comprise amorphous carbon, and compounds that are precursors to porous amorphous carbons.

17. The LIG filter of claim 13, wherein the LIG precursor material is a polymer.

18. A LIG film that comprises LIG and a LIG precursor material, wherein
(a) the LIG film is a filter configured for filtering air by capturing particles in the air, wherein the LIG is a two-side LIG structure, wherein
 (i) the two-sided LIG structure has the LIG on both sides of the LIG film, where the LIG on both sides of the LIG film are adjacent to one another such that air can be filtered through the LIG of the two-sided LIG structure, and
 (ii) the two-sided LIG structure has LIG precursor material on both sides of the LIG film, wherein the LIG precursor material is a support of the LIG on both sides of the LIG film;

(b) the captured particles are selected from a group consisting of virus particles, airborne microorganisms, byproducts of microorganisms, microorganism-associated toxins, and combinations thereof;
(c) the LIG film is capable of generating heat when a voltage is applied across the LIG; and
(d) the generated heat is capable of killing or decomposing the particles.

19. The LIG film of claim 18, wherein the LIG precursor material is a polymer.

20. The LIG film of claim 19, wherein the LIG film comprises a support array made from an un-lased polymer material.

21. The LIG film of claim 18, wherein the LIG precursor material is polysulfone, paper, cotton, wood, or carbohydrate.

22. The LIG film of claim 18, wherein the captured particles are capable of causing hospital-acquired infections.

23. The LIG film of claim 18, wherein the captured particles are sources of sepsis or viruses.

24. The LIG film of claim 23, wherein the viruses are selected from a group consisting of Coronaviruses, SARS-CoV, MERS-CoV, SARS-CoV-1 and SARS-CoV-2.

25. The LIG film of claim 18, wherein the LIG film is capable of generating heat when a voltage is applied across the LIG to raise temperature of the LIG film to at least 70° C.

26. The LIG film of claim 18, wherein the captured particles comprise microorganisms selected from a group consisting of viruses, bacteria, fungi, and combinations thereof.

27. The LIG film of claim 18, wherein the captured particles comprise toxins that are endotoxins.

28. A LIG film that comprises LIG and a LIG precursor material, wherein
(a) the LIG film is a filter configured for filtering air by capturing particles in the air;
(b) the captured particles are selected from a group consisting of virus particles, airborne microorganisms, byproducts of microorganisms, microorganism-associated toxins, and combinations thereof;
(c) the LIG film is operable for generating heat when a voltage is applied across the LIG;
(d) the generated heat is operable for killing or decomposing the particles;
(e) the LIG precursor material is a polymer;
(f) the LIG film comprises a support array made from an un-lased polymer material; and
(g) the un-lased polymer material is a stack having at least two patterns.

29. The LIG film of claim 28, wherein the stack having at least two patterns is a 3-dimensional lattice for reinforcement and geometrical strengthening.

30. The LIG film of claim 21, wherein the polysulfone, paper, cotton, wood, or carbohydrate comprises a flame retarding additive.

* * * * *